United States Patent [19]

Bloomberg

[11] Patent Number: 5,065,437

[45] Date of Patent: Nov. 12, 1991

[54] IDENTIFICATION AND SEGMENTATION OF FINELY TEXTURED AND SOLID REGIONS OF BINARY IMAGES

[75] Inventor: Dan S. Bloomberg, Palo Alto, Calif.

[73] Assignee: Xerox Corporation, Rochester, N.Y.

[21] Appl. No.: 449,624

[22] Filed: Dec. 8, 1989

[51] Int. Cl.$^5$ .................... G06K 9/34

[52] U.S. Cl. .................... 382/9; 382/55; 358/456; 358/462

[58] Field of Search .................... 382/9, 54, 55; 358/462, 358/456

[56] References Cited

U.S. PATENT DOCUMENTS

| | | | |
|---|---|---|---|
| 4,414,685 | 11/1983 | Sternberg | 382/49 |
| 4,481,665 | 11/1984 | Ota | 382/48 |
| 4,503,556 | 3/1985 | Scherl et al. | 382/9 |
| 4,513,442 | 4/1985 | Scherl | 382/9 |
| 4,668,995 | 5/1987 | Chen et al. | 382/54 |
| 4,700,400 | 10/1987 | Ross | 382/27 |
| 4,718,101 | 1/1988 | Ariga et al. | 382/9 |
| 4,741,046 | 4/1988 | Matsunawa et al. | 382/9 |
| 4,742,558 | 5/1988 | Ishibashi et al. | 382/56 |
| 4,750,209 | 6/1988 | Shimura et al. | 382/9 |
| 4,760,605 | 7/1988 | David et al. | 382/47 |
| 4,786,976 | 11/1988 | Takao et al. | 382/53 |
| 4,791,679 | 12/1988 | Barski et al. | 382/55 |
| 4,805,031 | 2/1989 | Powell | 358/167 |
| 4,811,115 | 3/1989 | Lin et al. | 358/456 |
| 4,817,186 | 3/1989 | Goolsbey et al. | 382/9 |
| 4,827,330 | 5/1989 | Walsh et al. | 382/57 |
| 4,858,018 | 8/1989 | Tanaka | 358/456 |
| 4,893,188 | 1/1990 | Murakami et al. | 358/456 |

FOREIGN PATENT DOCUMENTS

| | | |
|---|---|---|
| 0287995 | 4/1988 | European Pat. Off. . |
| 0288266 | 4/1988 | European Pat. Off. . |
| 0308673 | 8/1988 | European Pat. Off. . |
| 61-225974 | 10/1986 | Japan . |

OTHER PUBLICATIONS

K. Y. Wong et al.; "Document Analysis System", IBM J. Res. Development, vol. 26, No. 6, Nov. 1982.

Stanley R. Sternberg, "Biomedical Image Processing", IEEE, Jan. 1983.

Petros Maragos, "Tutorial on Advances in Morphological Image Processing and Analysis", Optical Engineering, vol. 26, No. 7, Jul. 1987.

Robert M. Haralick et al., "Image Analysis Using Mathematical Morphology", IEEE, vol. PAM1-9, No. 4, Jul. 1987.

*Primary Examiner*—Leo H. Boudreau
*Assistant Examiner*—Barry Stellrecht
*Attorney, Agent, or Firm*—Townsend and Townsend

[57] ABSTRACT

A method of separating finely textured and solid regions in a binary image from other regions such as those containing text and line graphics. The image is subjected to a first set of operations (10) that eliminates OFF pixels that are near ON pixels, which tends to thicken text and lines and solidify textured regions. The image is then subjected to a second set of operations (12) that eliminates ON pixels that are near OFF pixels. This thins out and eliminates the previously thickened text and lines, but leaves the previously solidified textured regions substantially intact.

42 Claims, 14 Drawing Sheets

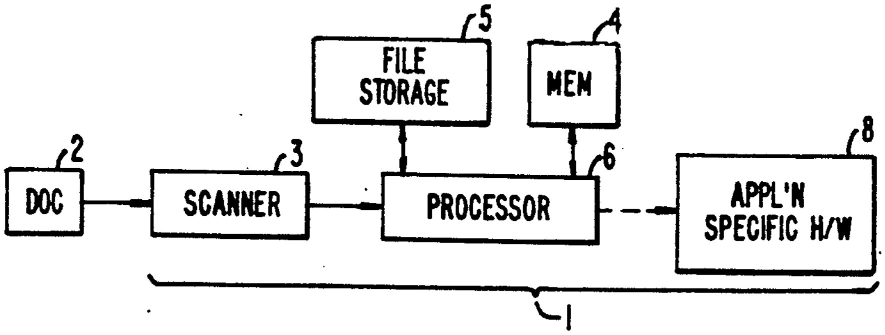
FIG._1A.
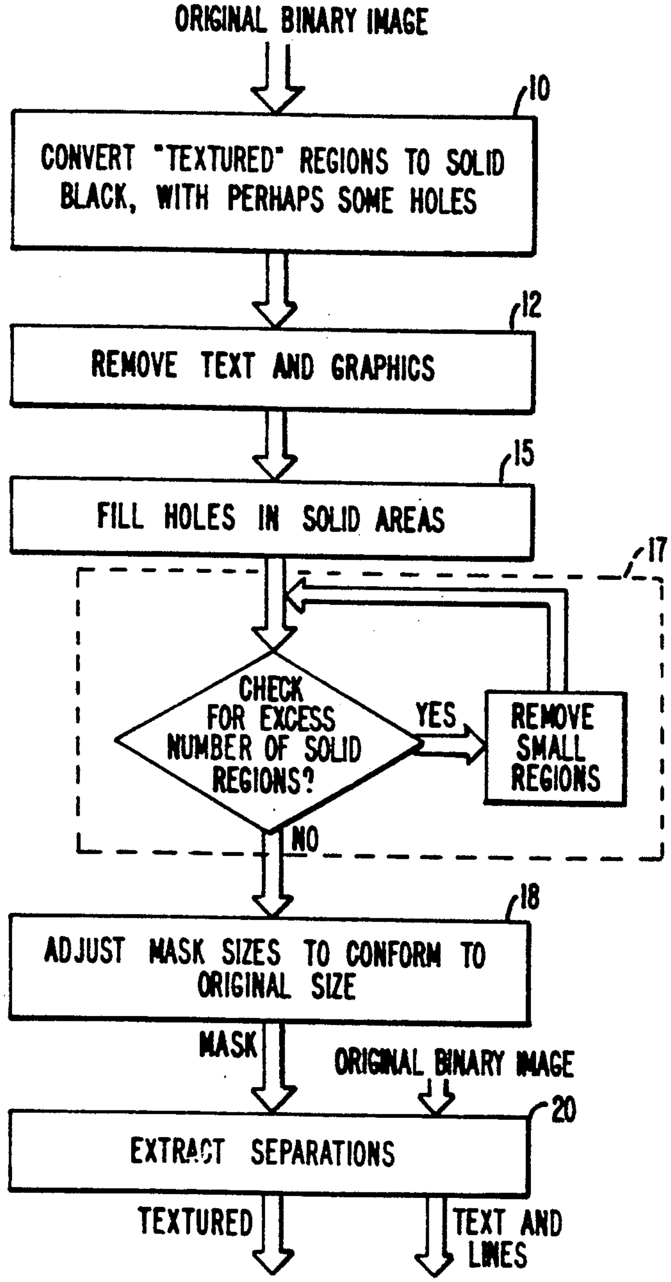
FIG._1B.

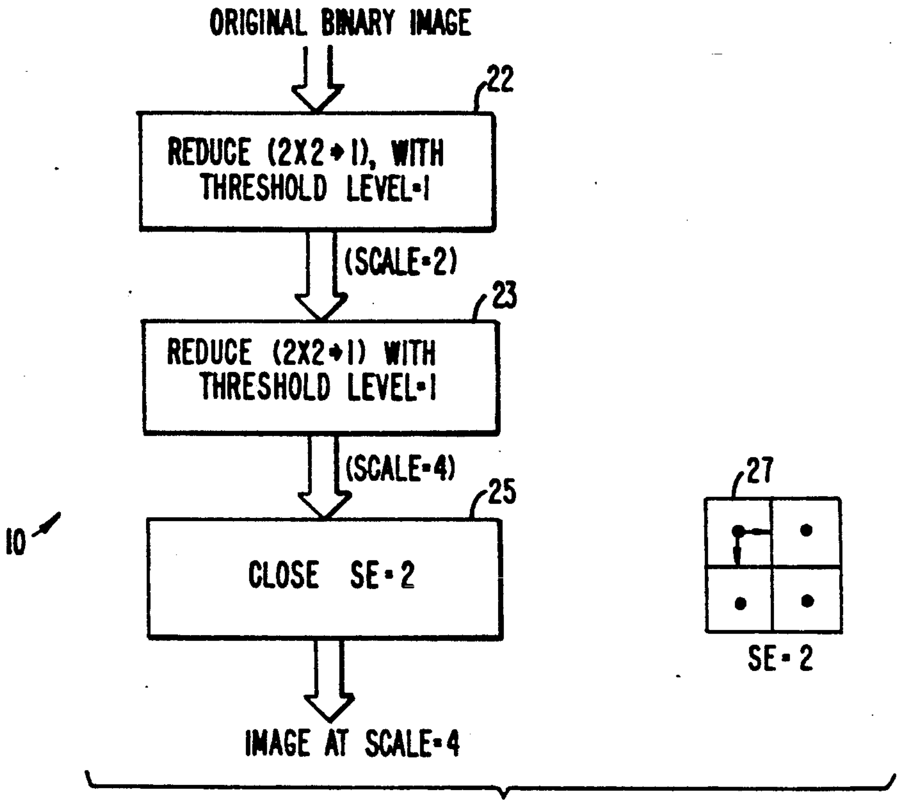
FIG._2A.
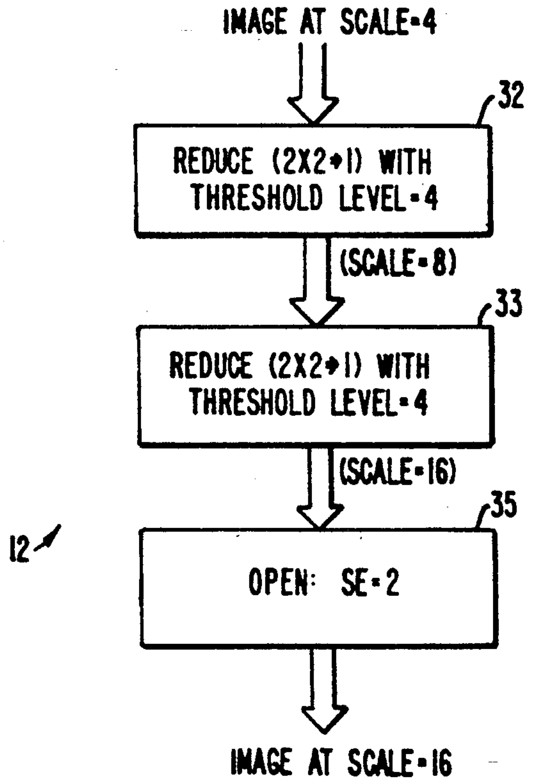
FIG._3A.

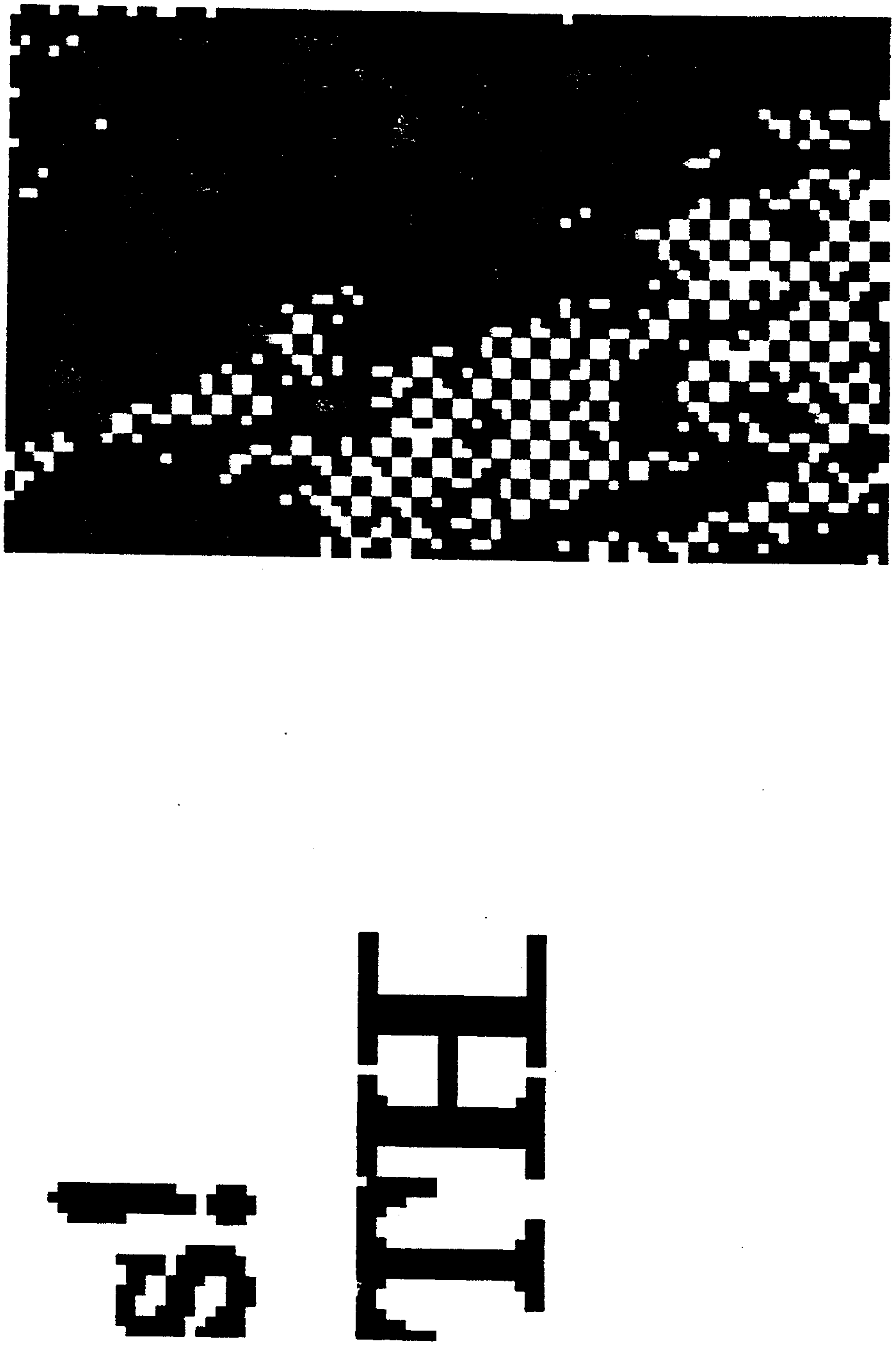
FIG._2B.

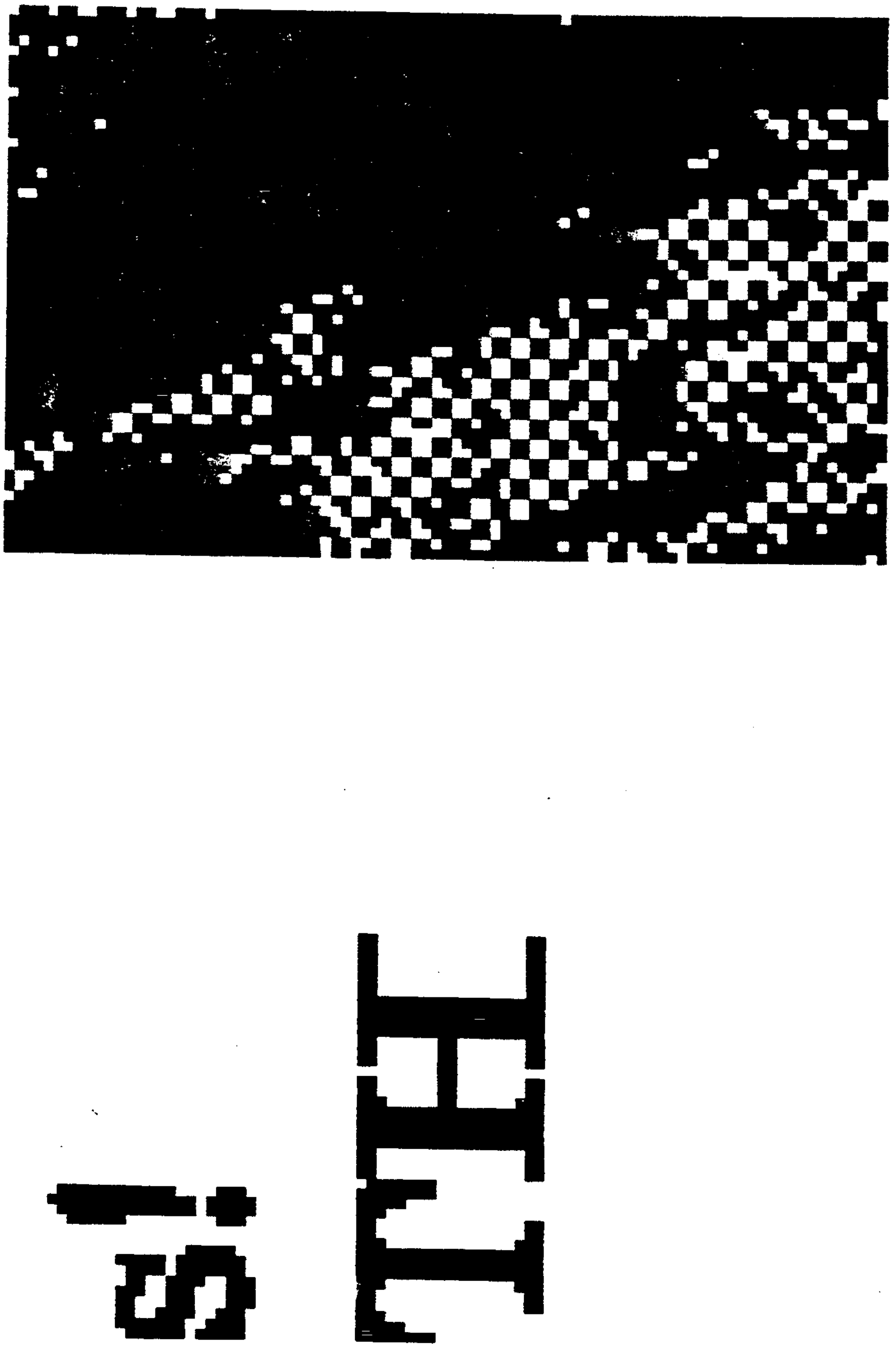
FIG._2B.

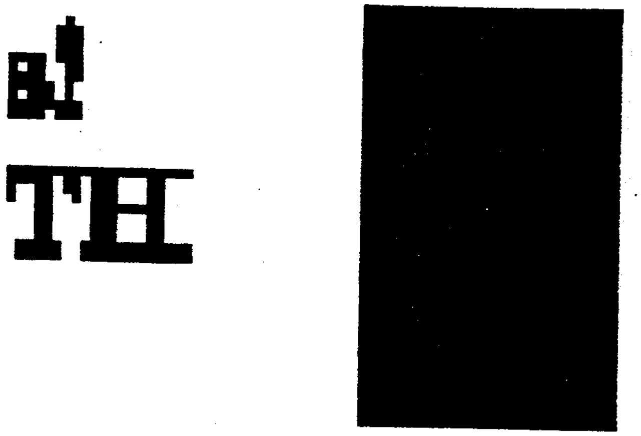
FIG._2C.
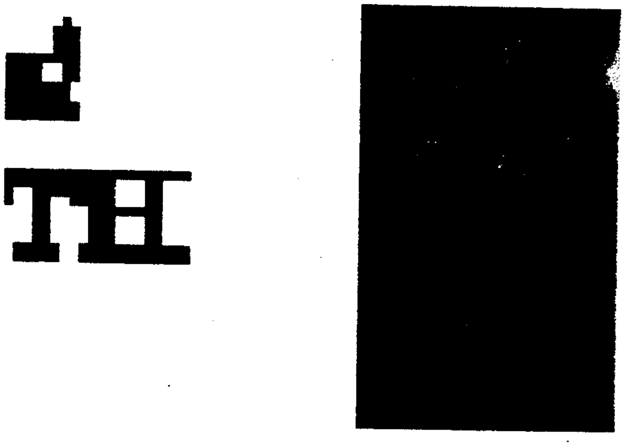
FIG._2D.
FIG._3B.
FIG._3C.
FIG._3D.

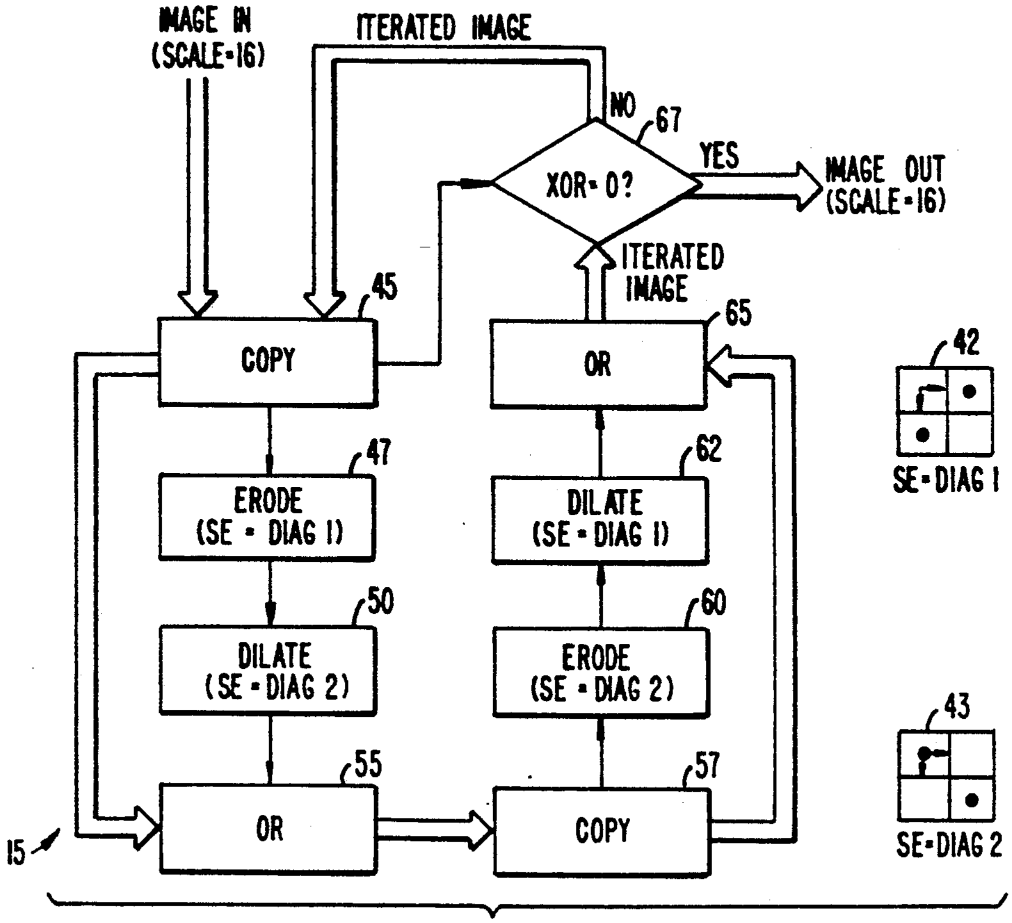
FIG._4.
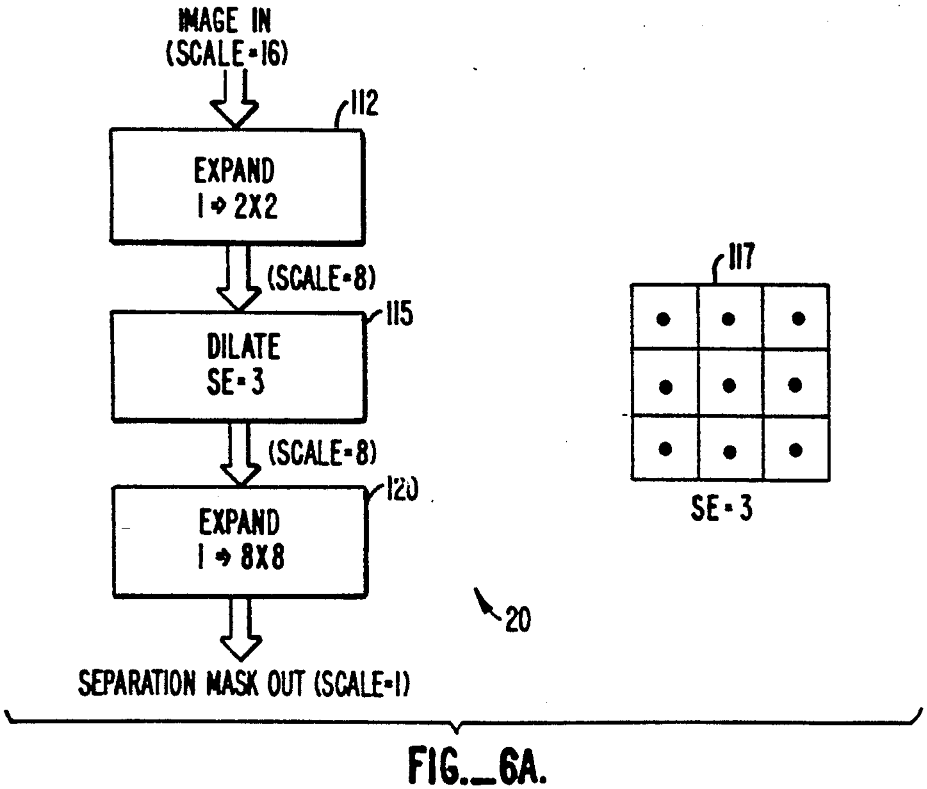
FIG._6A.

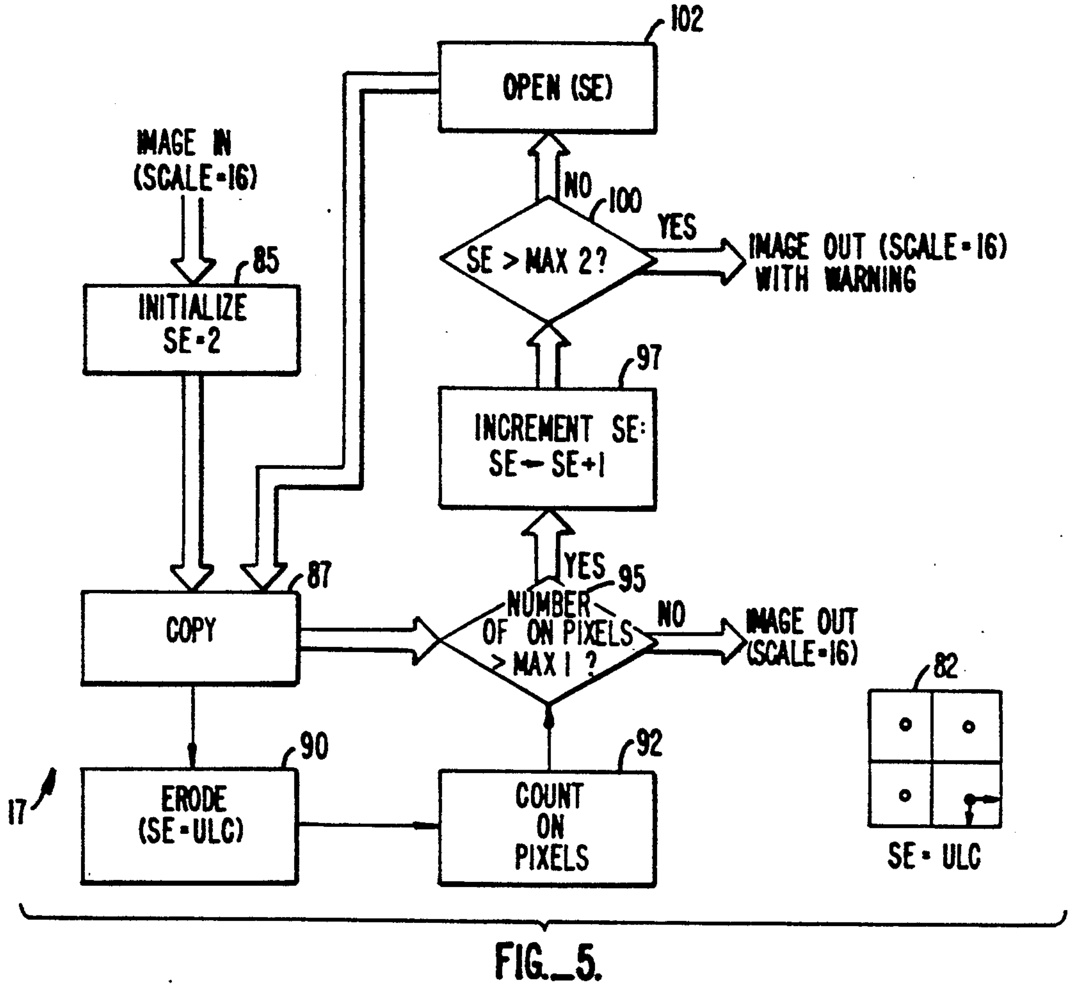
FIG._5.
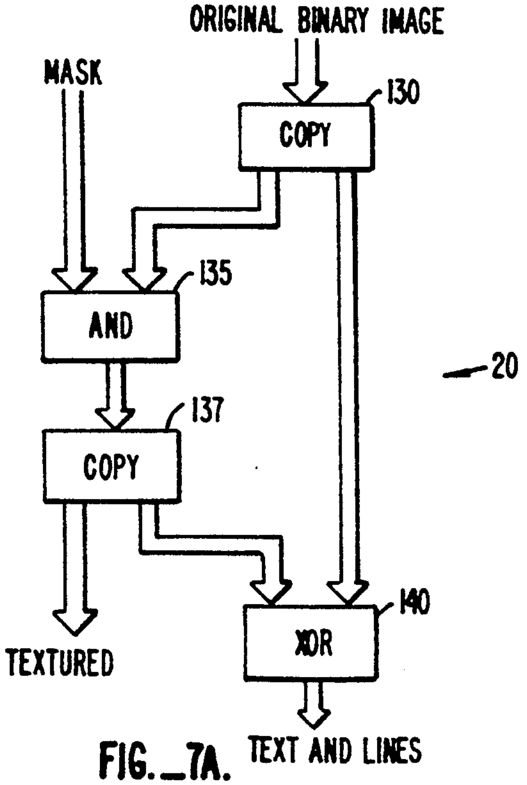
FIG._7A.

FIG._6B.

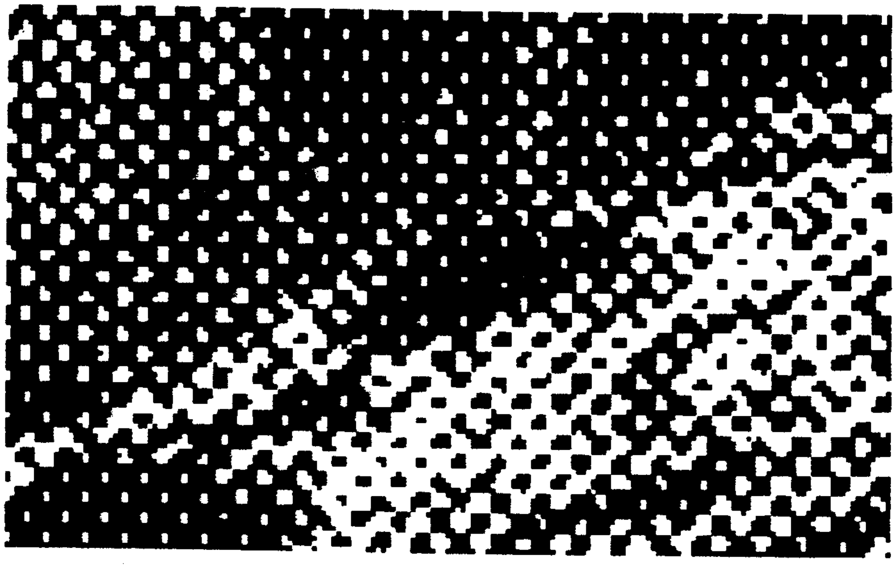
FIG._7B.

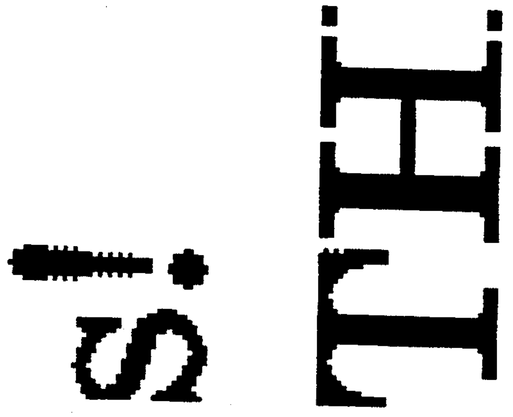
FIG._7C.

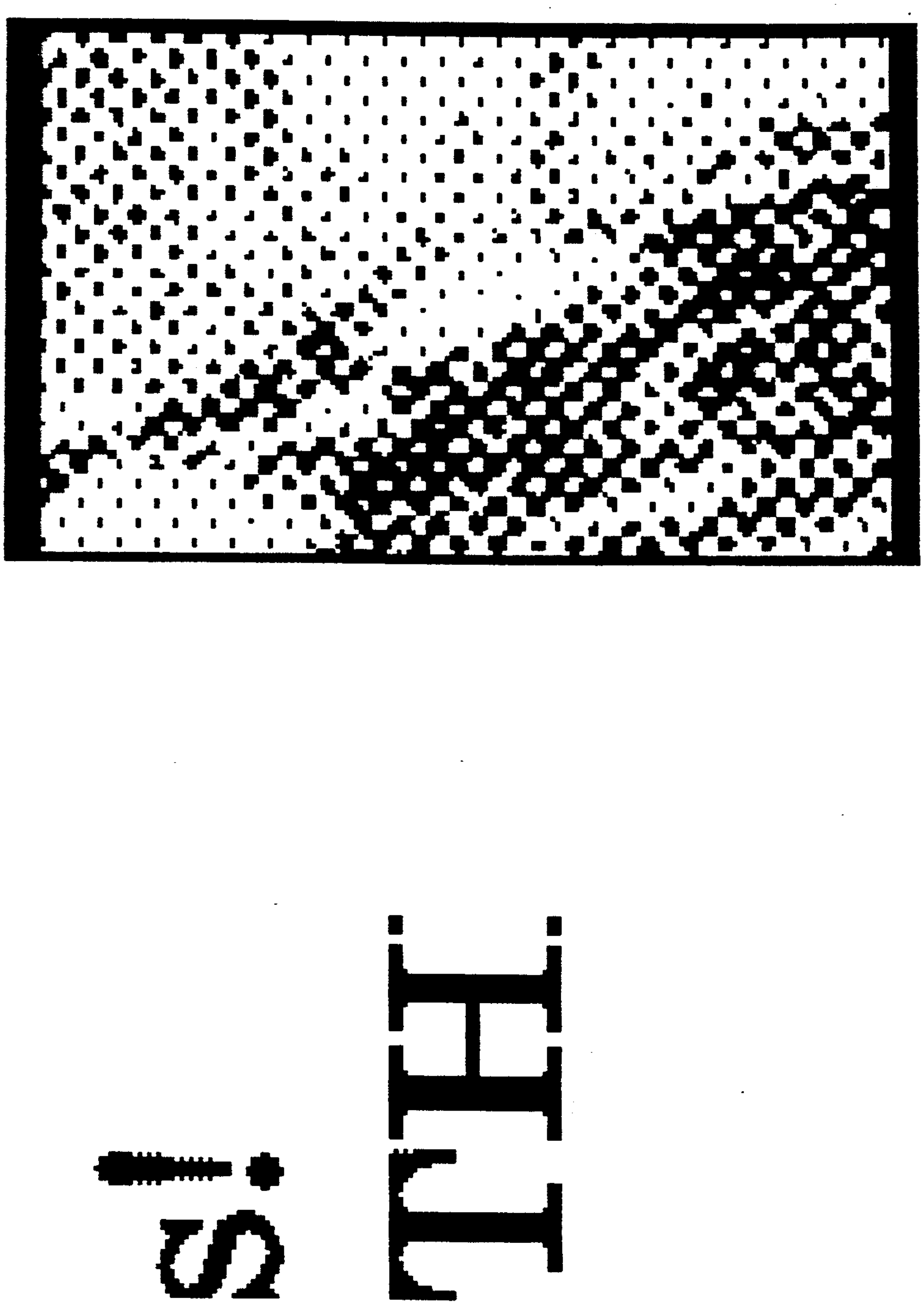
FIG._7D.

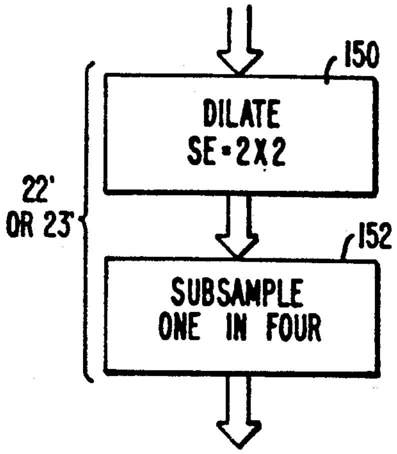
FIG._8A.
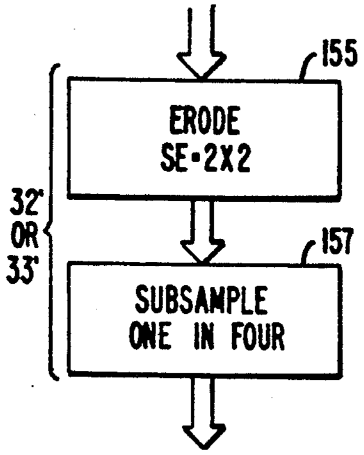
FIG._8B.
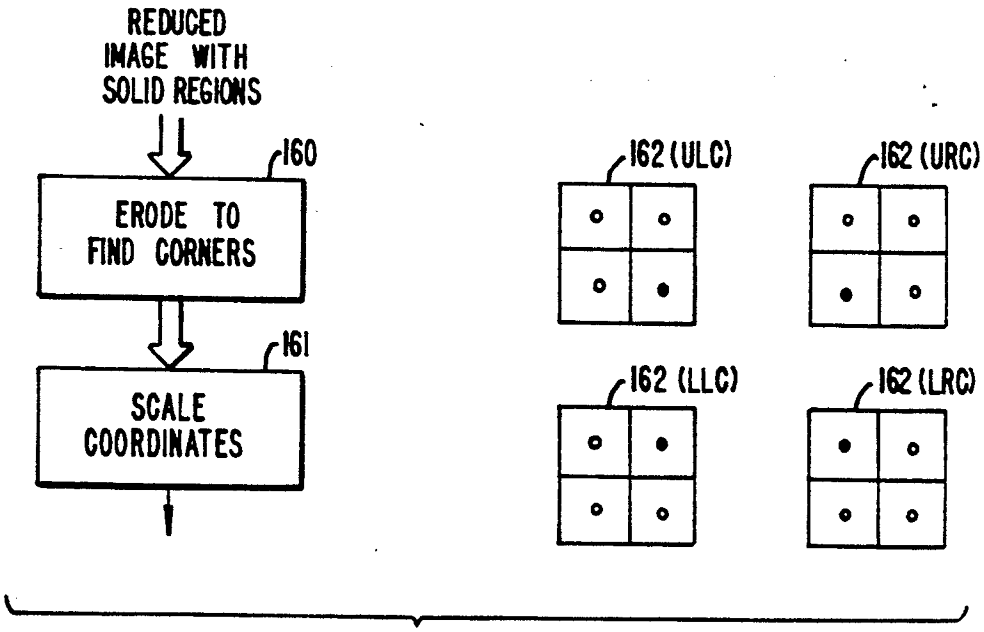
FIG._9.

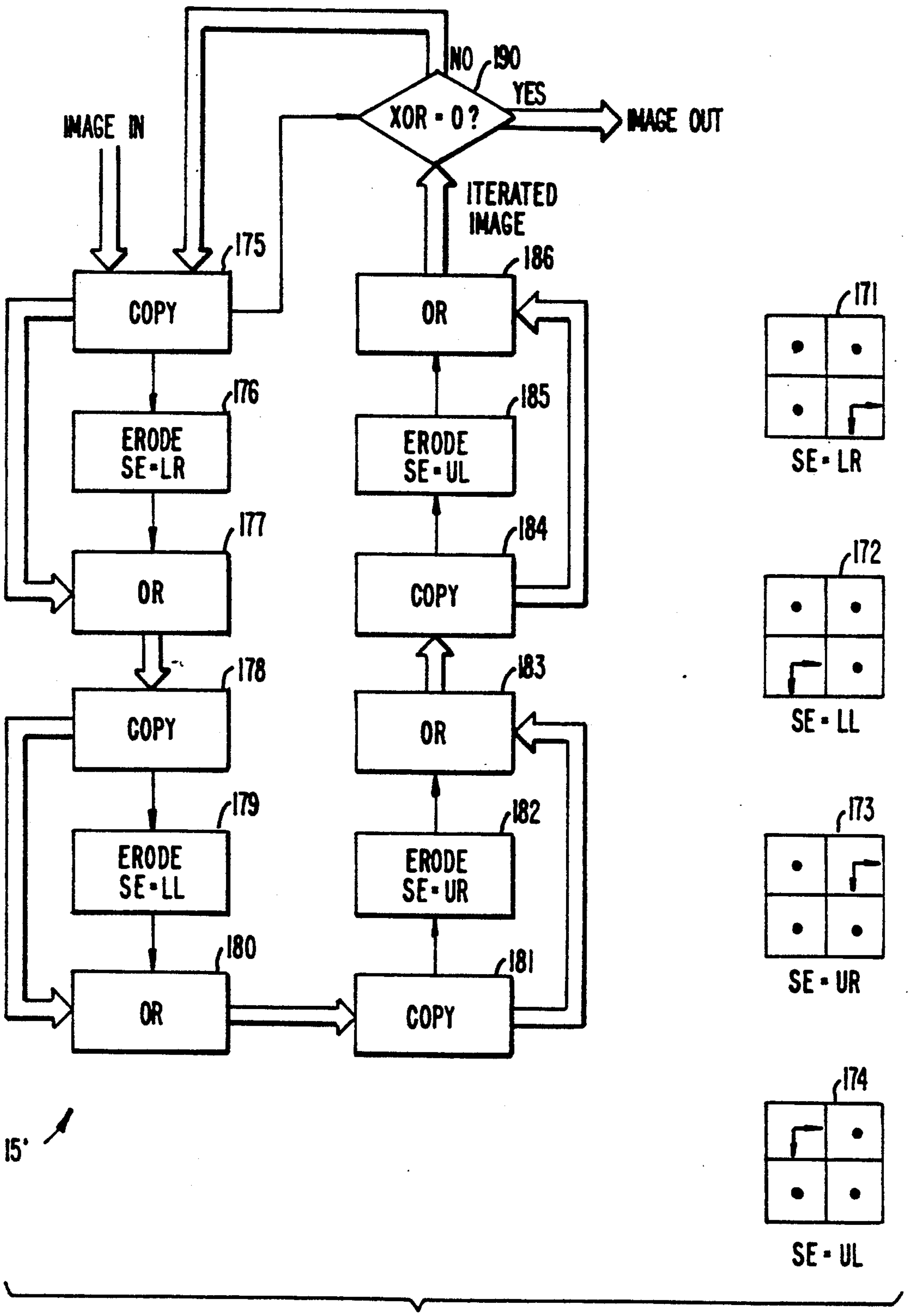
FIG._10.

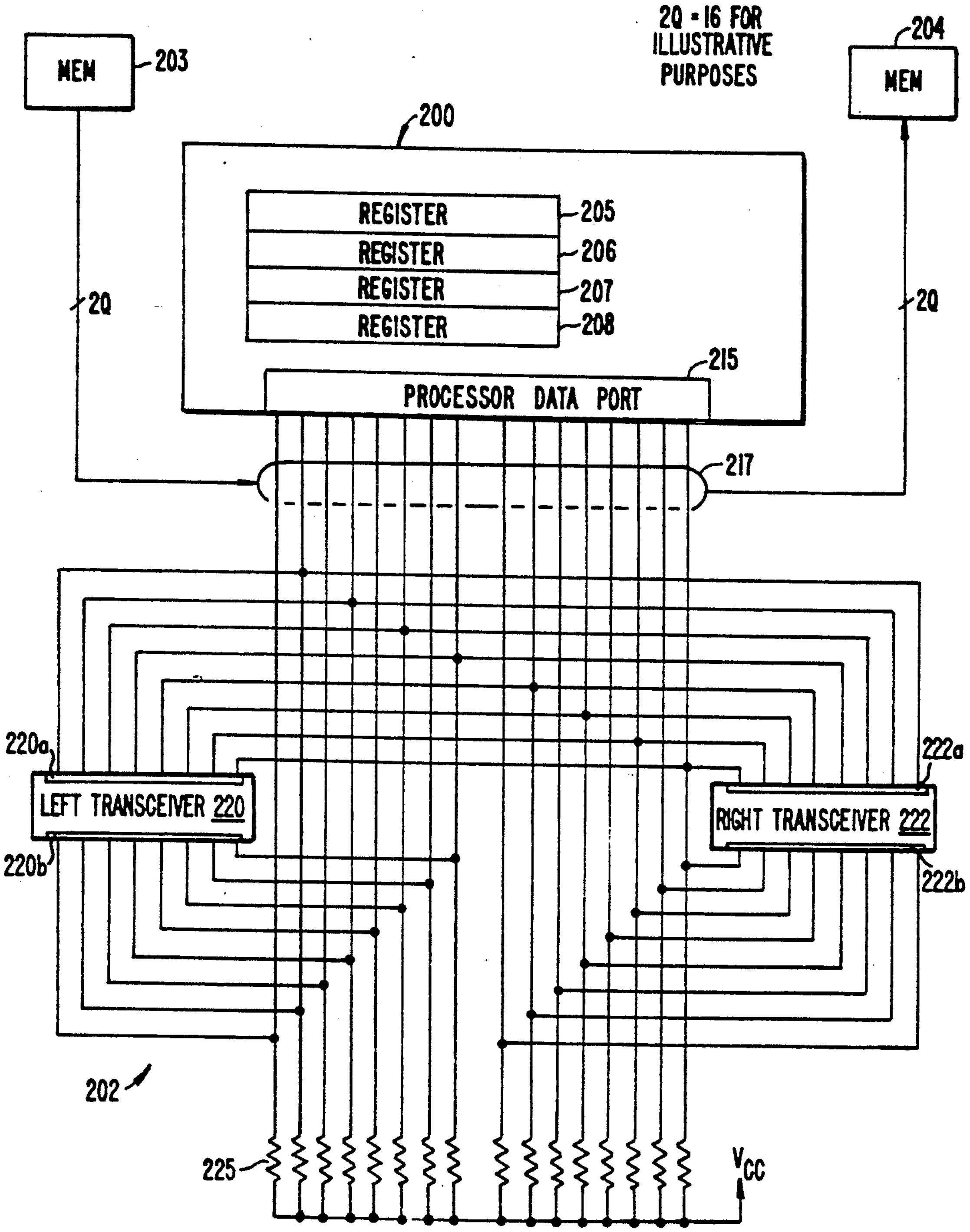
FIG._11.

IDENTIFICATION AND SEGMENTATION OF FINELY TEXTURED AND SOLID REGIONS OF BINARY IMAGES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The invention relates generally to image processing, and more specifically to a technique for discriminating between regions that are finely textured or solid and other regions such as those containing text or line graphics.

There are several applications where it is important to determine quickly whether an image contains regions of fine texture or regions that are fairly solidly dark. Such regions include halftones, stipples, and dark areas with light lettering.

For example, problems can arise with printers whose output is at a different resolution from the input scanner, since techniques for converting the resolution are sensitive to texture. A technique that works well on text will generally do poorly on halftones or stipples, and vice versa. If the halftone regions are identified, and if the frequency and screen angle are known, then appropriate techniques can be selected for different portions of the image, and the halftone regions can be resolution converted with an acceptably low level of aliasing artifacts.

Problems also arise for scanners. When scanning a halftoned binary image, beating can occur between the repeat frequency in the image and the size of an integral number of scanned pixels. The result is aliasing, in which a low frequency Moire pattern will be observed in the scanned image. In order to prevent this, it is desirable to use a gray scale scanner, and remove halftoning prior to thresholding. Techniques for removing halftone patterns work best if the halftone frequency and screen angle are known.

It is sometimes necessary for gross segmentation to occur prior to using some segmentation software. Some aspects of segmentation can be accomplished by building a connected component representation of the binary image, such as a line adjacency graph (LAG), and then processing that data structure. However, if one tried to build a LAG from a finely textured screen of appreciable size (say 2 inches square or larger), the storage requirements and computational time might well be excessive. Similarly, it is necessary for segmentation to occur prior to using recognition software. If a halftoned region of a binary image were sent to OCR or graphics vectorization software, it could break the program.

Depending on the threshold setting and resolution of the input scanners, and on the quality of the output printer and number of copy generations, a printed version of the binary image of a regular textured region may show little or none of the details of the texturing of the original binary image. Because of scanning and printing operations, the contrast at the 1-5 line pairs per mm size is often greatly increased, with dark textures becoming solid black, and light textures becoming much lighter or even white (perhaps with some random dot noise). Thus, in many situations, it cannot be assumed that evidence of the original texturing will remain in the binary image under analysis.

SUMMARY OF THE INVENTION

The present invention provides a robust and computationally efficient technique for identifying and separating regions that either have fine texture or are fairly solidly dark in a binary image. The invention properly separates halftones without requiring any knowledge of the frequency and screen angle, and works well on improperly thresholded halftones (too light or too dark).

In brief, the invention contemplates the use of a series of transformations, such as thresholded reduction operations and morphological operations to transform regions according to their texture.

Threshold reductions and morphological operations will be defined and discussed in detail below. A thresholded reduction entails mapping a rectangular array of pixels onto a single pixel, whose value depends on the number of ON pixels in the rectangular array and a threshold level. Morphological operations use a pixel pattern called a structuring element (SE) to erode, dilate open, or close an image.

A method according to one aspect of the invention comprises converting the finely textured and solid regions to solid ON (black) pixels, clearing the text and graphics regions, optionally filling the holes (if any) in the solid areas to provide a mask, and then, if necessary, adjusting the scale of the mask to conform to the original image or extracting relevant mask coordinates. The halftone separation is obtained by ANDing the mask and the original image while the remainder is obtained by XORing the halftone separation and the original image.

The image is subjected to a first set of operations that eliminates OFF pixels that are near ON pixels, which tends to thicken text and lines and solidify textured regions Solid regions remain solid. The first set of operations preferably includes a thresholded reduction with general darkening (threshold LEVEL=1), followed by a close operation.

The image is then subjected to a second set of operations that eliminates ON pixels that are near OFF pixels. This thins out and eliminates the previously thickened text and lines, but leaves the previously solidified textured regions substantially intact. The second set of operations preferably includes a thresholded reduction with general lightening (threshold LEVEL=4) followed by an open operation.

Filling the holes preferably includes an iterated series of erosions and dilations to fill 8-connected regions to the minimum enclosing rectangular regions. The method may be controlled by counting the number of filled regions, and performing a series of open operations to reduce the number of filled regions.

The present invention is computationally simple since the operations are essentially local. The invention is also fast. This is in part because the operations entail few computations per pixel, and in part because many of the operations are carried out on reduced images, which means there are fewer pixels to process.

A further understanding of the nature and advantages of the present invention may be realized by reference to the remaining portions of the specification and the drawings.

BRIEF DESCRIPTION OF THE DRAWINGS

FIG. 1A is a block diagram of an image scanning and processing system incorporating the present invention;

FIG. 1B is a high level flow diagram showing the method of separating finely textured and solid regions in an image;

FIG. 1C shows a representative binary image;

FIG. 2A is a flow diagram illustrating the filling of finely textured regions of the image;

FIGS. 2B–D show the results at different stages of the filling operation;

FIG. 3A is a flow diagram illustrating the removal of text and line graphics from the image;

FIGS. 3B–D show the results at different stages of the removal operation;

FIG. 4 is a flow diagram illustrating the filling of 8-connected regions in the mask;

FIG. 5 is a flow diagram of an optional procedure for testing and removing small rectangular areas in the mask;

FIG. 6A is a flow diagram illustrating the adjustment of the mask size to conform to the size of the original textured area;

FIG. 6B shows the full-size mask;

FIG. 7A is a flow diagram illustrating the use of the mask to obtain the separation of the textured and non-textured regions;

FIGS. 7B–D show the halftone separation, the text separation, and the mask coverage;

FIGS. 8A–B are flow diagrams illustrating alternatives to the thresholded reductions used to fill the finely textured regions and remove text and line graphics;

FIG. 9 is a flow diagram illustrating an alternative to expanding the mask;

FIG. 10 is a flow diagram illustrating the filling of 4-connected regions in the mask; and FIG. 11 is a block diagram of special purpose hardware for performing image reductions and expansions.

DESCRIPTION OF SPECIFIC EMBODIMENTS

Definitions and Terminology

The present discussion deals with binary images. In this context, the term "image" refers to a representation of a two-dimensional data structure composed of pixels. A binary image is an image where a given pixel is either "ON" or "OFF." Binary images are manipulated according to a number of operations wherein one or more source images are mapped onto a destination image. The results of such operations are generally referred to as images. The image that is the starting point for processing will sometimes be referred to as the original image.

Pixels are defined to be ON if they are black and OFF if they are white. It should be noted that the designation of black as ON and white as OFF reflects the fact that most documents of interest have a black foreground and a white background. While the techniques of the present invention could be applied to negative images as well, the discussion will be in terms of black on white.

A "solid region" of an image refers to a region extending many pixels in both dimensions within which substantially all the pixels are ON.

A "textured region" of an image refers to a region that contains a relatively fine-grained pattern. Examples of textured regions are halftoned or stippled regions.

"Text" refers to portions of a document or image containing letters, numbers, or other symbols including non-alphabetic linguistic characters.

"Line graphics" refers to portions of a document or image composed of graphs, figures, or drawings other than text, generally composed of horizontal, vertical, and skewed lines having substantial run length as compared to text. Graphics could range from horizontal and vertical lines in an organization chart to more complicated horizontal, vertical, and skewed lines in engineering drawings.

A "mask" refers to an image, normally derived from an original image, that contains substantially solid regions of ON pixels corresponding to regions of interest in the original image. The mask may also contain regions of ON pixels that don't correspond to regions of interest.

AND, OR, and XOR are logical operations carried out between two images on a pixel-by-pixel basis.

NOT is a logical operation carried out on a single image on a pixel-by-pixel basis.

"Expansion" is a scale operation characterized by a SCALE factor N, wherein each pixel in a source image becomes an NxN square of pixels, all having the same value as the original pixel.

"Reduction" is a scale operation characterized by a SCALE factor N and a threshold LEVEL M. Reduction with SCALE=N entails dividing the source image into NxN squares of pixels, mapping each such square in the source image to a single pixel on the destination image. The value for the pixel in the destination image is determined by the threshold LEVEL M, which is a number between 1 and $N^2$. If the number of ON pixels in the pixel square is greater or equal to M, the destination pixel is ON, otherwise it is OFF.

"Subsampling" is an operation wherein the source image is subdivided into smaller (typically square) elements, and each element in the source image is mapped to a smaller element in the destination image. The pixel values for each destination image element are defined by a selected subset of the pixels in the source image element. Typically, subsampling entails mapping to single pixels, with the destination pixel value being the same as a selected pixel from the source image element. The selection may be predetermined (e.g. upper left pixel) or random.

A "4-connected region" is a set of ON pixels wherein each pixel in the set is laterally or vertically adjacent to at least one other pixel in the set.

An "8-connected region" is a set of ON pixels wherein each pixel in the set is laterally, vertically, or diagonally adjacent to at least one other pixel in the set.

A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care", are ignored. The pixels defining the SE do not have to be adjacent each other. The center location need not be at the geometrical center of the pattern; indeed it need not even be inside the pattern.

A "solid" SE refers to an SE having a periphery within which all pixels are ON. For example, a solid 2×2 SE is a 2×2 square of ON pixels. A solid SE need not be rectangular.

A "hit-miss" SE refers to an SE that specifies at least one ON pixel and at least one OFF pixel.

"Erosion" is a morphological operation wherein a given pixel in the destination image is turned ON if and only if the result of superimposing the SE center on the corresponding pixel location in the source image results in a match between all ON and OFF pixels in the SE and the underlying pixels in the source image.

"Dilation" is a morphological operation wherein a given pixel in the source image being ON causes the SE to be written into the destination image with the SE center at the corresponding location in the destination image. The SE's used for dilation typically have no OFF pixels.

"Opening" is a morphological operation that consists of an erosion followed by a dilation. The result is to replicate the SE in the destination image for each match in the source image.

"Closing" is a morphological operation consisting of a dilation followed by an erosion The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

SYSTEM OVERVIEW

FIG. 1A is a block diagram of an image analysis system 1 within which the present invention may be embodied. The basic operation of system 1 is to extract or eliminate certain characteristic portions of a document 2. To this end, the system includes a scanner 3 which digitizes the document on a pixel basis, and provides a resultant data structure, typically referred to as an image. Depending on the application, the scanner may provide a binary image (a single bit per pixel) or a gray scale image (a plurality of bits per pixel). The image contains the raw content of the document, to the precision of the resolution of the scanner. The image may be sent to a memory 4 or stored as a file in a file storage unit 5, which may be a disk or other mass storage device.

A processor 6 controls the data flow and performs the image processing. Processor 6 may be a general purpose computer, a special purpose computer optimized for image processing operations, or a combination of a general purpose computer and auxiliary special purpose hardware. If a file storage unit is used, the image is transferred to memory 4 prior to processing. Memory 4 may also be used to store intermediate data structures and possibly a final processed data structure.

The result of the image processing, of which the present invention forms a part, can be a derived image, numerical data (such as coordinates of salient features of the image) or a combination. This information may be communicated to application specific hardware 8, which may be a printer or display, or may be written back to file storage unit 5.

OVERVIEW OF THE INVENTION

FIG. 1B is a high level flow diagram showing the major steps for creating a mask that covers textured and solid regions in an original binary image. The original binary image may include regions of fine texturing such as stippling or halftoning, solid black regions, and regions that are neither solid nor finely textured, such as those containing text and line graphics. As will be seen below, the image processing that occurs tends to leave originally solid regions of sufficient extent alone and the solid regions will appear as part of the mask. Thus the discussion below will sometimes be silent as to the solid regions. Non-textured regions that are not solid will sometimes be referred to as other regions.

FIG. 1C shows a representative binary image scanned at 300 dots/inch having text and halftone regions. Certain other views of the images at intermediate stages of processing are magnified 2× relative to FIG. 1B. References to magnification in the following discussion are relative to FIG. 1B and are not to be confused with the expansion and reduction scale operations.

In brief, the original binary image is subjected to a series of operations that may include logical, scale, and morphological operations. The image is first processed so that the textured regions are converted to solid black, with the possibility of some holes (step 10). Text and graphics regions are then cleared (step 12). The resulting image may then be subjected to a number of optional steps wherein any holes in the solid areas are filled (step 15). The process can be controlled (optionally) to determine if there are too many solid regions, and if so, to remove the small regions (step 17).

The solid regions are then used to characterize the halftone regions. One option is to expand the solid regions back to their original size, thus forming a mask for separation of finely textured regions from the rest of the image (step 18). The mask and the original binary image can then be combined to provide the separations of the textured and non-textured regions (step 20). Alternatively, the corner positions of the unexpanded solid regions can be scaled and used to determine the textured regions in the original binary image.

DETAILED DISCUSSION OF ONE EMBODIMENT

FIG. 2A is an expanded flow diagram illustrating the steps within step 10 (blackening textured regions). The original image is subjected to a set of operations that eliminate OFF pixels that are near ON pixels. While text and lines are thickened, they tend to retain their general character. However, as the small dots in the textured regions expand, they coalesce to form large masses and thereby solidify the formerly textured area. The solid regions remain solid. As will be seen below, subsequent processing can reverse thickening of the characters and lines, but not the solidification of the now solid regions.

The original binary image is twice reduced with SCALE=2 and LEVEL=1 (steps 22 and 23). Each reduction step entails dividing the image (original binary image for step 22 and reduced image for step 23) into 2×2 squares, each of which maps onto a single pixel in the destination image. The destination pixel is turned ON if one or more of the pixels in the square is ON, and turned OFF if no pixels in the square are ON. The result is now an image reduced by a linear factor of 4 and having the textured regions darkened.

This reduced image is then subjected to a close operation (step 25) to finish the solidification of the textured region. The close operation consists of a dilation and an erosion, preferably with a solid 2×2 SE (i.e., an SE that is a 2×2 square of ON pixels). The result of the close operation is invariant as to which of the pixels in the SE is designated the center.

FIGS. 2B and 2C show the results (at 2× magnification) of the two reductions with LEVEL=1. FIG. 2D shows the result (at 2× magnification) of the close operation. These two reductions and the close operation cause the textured and solid regions to fill. They also cause features in the other regions to fill somewhat However, the spatial extent of regions of ON pixels in the other regions is much smaller than the filled textured regions.

FIG. 3A is an expanded flow diagram illustrating the steps within step 12 (removing text and graphics). The image resulting from step 10 is subjected to a set of operations that eliminate ON pixels that are near OFF pixels. This thins and eliminates the previously thickened features in the other regions (text and lines), but does not materially affect the now solid regions.

The removal of text and graphics is accomplished by successive reductions (steps 32 and 33), again each with SCALE=2, but with LEVEL=4 (all four pixels must be ON to turn on the destination pixel). The resulting image, now reduced by a linear factor of 16, contains only a few isolated ON pixels within the other regions. This image is subjected to an open operation (step 35), preferably with the same solid 2×2 SE as in close operation 25.

FIGS. 3B and 3C show the results (at 2× magnification) of the two reductions with LEVEL=4. FIG. 3D shows the result (at 2× magnification) of the OPEN operation. The net result is to eliminate the text while leaving the filled textured region intact.

FIG. 4 is an expanded flow diagram illustrating the steps within step 15 (filling holes in solid areas). A presently preferred technique for filling holes within the remaining dark regions is to fill all 8-connected regions to the smallest possible enclosing rectangle. This is accomplished by an iterated sequence of erosions and dilations using two diagonal SE's 42 and 43. SE 42 has two ON pixels, one to the immediate right of the center and one immediately beneath the center. SE 43 has two ON pixels, one at the center and one diagonally down to the right.

The input image (reduced by a scale factor of 16 as described above) is copied (step 45), with one copy reserved for later use and one copy being a work copy subject to succeeding operations. The work copy is first eroded (step 47) with SE 42, and then dilated (step 50) with SE 43. The result of this erosion and dilation is subjected to a logical OR (step 55) with the copy reserved at copy step 45. The result of the logical OR is copied (step 57), with one copy being reserved for use and the other being a work copy. The work copy is eroded (step 60) with SE 42, dilated (step 62) with SE 43. The resulting image and the copy reserved at copy step 57 are subjected to a logical OR (step 65). The resultant iterated image and the copy of the input image reserved at step 45 are subjected to an exclusive OR. If the iterated image has not changed (the XOR of the two images contains no ON pixels), the process is complete. If the iterated image has changed (the XOR of the two images contains at least one ON pixel), the iterated image is communicated back and subjected to steps 45 through 67. The cycle repeats until the iterated image agrees with the last version reserved at copy step 45. In certain applications, it may be desired to perform a small number of iterations to effect only a partial fill.

FIG. 5 is an expanded flow diagram illustrating the steps within step 17 (removing excess solid regions). As noted above, step 17 is optional. In most cases it is not needed. There are, however, circumstances where very large characters or very dense line graphics will not be entirely removed by the preceding steps. Step 17 will remove such exceptional items and flag their existence for further processing.

The basic procedure entails determining whether the number of solid regions is greater than some maximum level Max1, and if so, attempting to remove the smaller of the regions. The number of solid rectangles is determined by looking for upper left corners. This is done by erosion with an SE 82 that consists of a 2×2 array of pixels with the center pixel being ON in the lower right corner and the three remaining pixels being OFF. Removal of excessive solid regions is carried out by open operations with increasingly large SE's consisting of square arrays with all pixels ON.

Upon entry into this procedure, the SE with solid ON pixels for possible removal of solid regions is initialized (step 85) at a 2×2 size. The input image is copied (step 87), with one copy reserved for possible output and the other transmitted for determination the solid areas. The number of solid areas is determined by an erosion (step 90) using SE 82. The effect of the erosion step is to produce a single ON pixel in the destination image at the location of the upper left corner of each solid rectangle in the source image. The ON pixels are counted (step 92), and the number compared to Max1 (step 95). In the event that the number of ON pixels, which corresponds to the number of solid regions in the original image is less than or equal to Max1, the original image reserved at copy step 87 is output.

Otherwise, further removal is effected as follows. The size of the SE is increased by 1 on a side (step 97), and the new SE size is compared to a predetermined maximum Max2 (step 100). If the size of the SE exceeds Max2, the image is output with a warning. Otherwise, the image is subjected to an OPEN operation (step 102) with the newly increased SE. The result of this is iterated until the number of solid regions is below Max1 or the SE has reached Max2.

FIG. 6A is an expanded flow diagram illustrating the steps within step 18 (expanding the mask to original size). The result of the previous operations is a mask at reduced scale. It is possible to expand the solid regions back to the original size to form the mask for separation of the finely textured (and solid) regions from the rest of the image. The result of step 12 (two reductions and an open) was to relatively reduce the size of the filled regions. This is compensated by first expanding the image with SCALE=2 (step 112), and then dilating the image (step 115) using a 3×3 SE 117 with the all pixels ON and the SE center in the middle. Dilating with SE 117 causes the boundary of each rectangle of ON pixels to be expanded outwardly by one pixel. The resulting image is then expanded with SCALE=8 (step 117), returning to full scale. FIG. 6B shows the mask at full scale.

FIG. 7A is an expanded flow diagram illustrating the steps within step 20 (image separation). With the mask thus produced, segmentation is easily accomplished. The original binary image is copied (step 130) and ANDed with the mask (step 135) to produce the "halftone separation" (i.e. the textured and solid parts of the image). This is copied (step 137) and the result is subjected to an exclusive OR (step 140) with a copy of the original binary image to produce the other parts of the image (text and line graphics). It is noted that the copying steps are not necessary if the result of the logical operation at any given stage is stored in a new array in memory rather than overwriting the operand.

FIG. 7B shows the halftone separation achieved by ANDing the mask and the original image and FIG. 7C shows the text separation achieved by XORing the halftone separation and the original image. FIG. 7D shows the result of XORing the mask and the halftone separation, which demonstrates the mask coverage.

DISCUSSION OF ILLUSTRATIVE ALTERNATIVES

FIG. 8A is an expanded flow diagram illustrating an alternative to the use of thresholded reductions with LEVEL=1 to fill the textured areas. More particularly, the image is dilated with a solid 2×2 SE (all pixels ON) (step 150) and the resultant image subsampled by choosing one pixel in each 2×2 square to form a reduced image (step 152). The sub-sampling may be accomplished on a row basis by discarding every other line, and on the column basis by use of a lookup table in a manner similar to that described below in connection with performing fast thresholded reductions.

In principle one could also use a series of close operations in an attempt to solidify a finely textured region. However, the use of one or more thresholded reductions (or dilation and subsampling) has at least two advantages. First, because the texture scale is not known a priori, it cannot be determined how large an SE to use in the close operation. An SE that is too small to bridge adjacent parts in the textured region would not change the image, and the close operation would fail. Thus, while the use of the close would be locally all or nothing, the use of a reduction with LEVEL=1 (or a dilation and subsampling) invariably results in a darkening of the texture. Second, the use of reductions before close allows the close operation to be carried out at a reduced scale. Comparable operations at full scale are much slower computationally than those at a reduced scale (roughly by the third power of the linear scale factor). Therefore, all subsequent operations at reduced scale are much faster.

FIG. 8B is an expanded flow diagram illustrating an alternative to the use of thresholded reductions with LEVEL=4 to remove text and line graphics. The image is first eroded with a solid 2×2 SE (step 155) and the resultant image sub-sampled by choosing one pixel in each 2×2 square to form a reduced image (step 157).

The above comments in connection with filling the textured regions apply to removing text and line features. In principle one could also use a series of open operations in an attempt to remove such features. However, the use of one or more thresholded reductions (or erosion and subsampling) has at least two advantages. First, because the feature scale is not known a priori, it cannot be determined how large an SE to use in the open operation. An SE that is too small to eliminate features in the textured region would not change the image, and the open operation would fail. Thus, while the use of the open would be locally all or nothing, the use of a reduction with LEVEL=4 (or an erosion and subsampling) invariably results in a removal or thinning of the feature. Second, the use of reductions before open allows the open operation to be carried out at a reduced scale.

The selection of a particular size for the SE is empirically based, taking into consideration such factors as scanner resolution. However, the decision tends to be rather straightforward, entailing a minimum amount of experimentation.

Although the thresholded reductions are considered advantageous for the filling and removal steps, the same result is likely to be achieved by doing a dilation with a solid 8×8 SE and an erosion with a solid 32×32 SE. However, the computation is likely to take much longer.

FIG. 9 is a flow diagram illustrating an alternative to expansion of the solid portions to form the mask. Instead of expanding the solid regions to form the mask, it is possible to extract the coordinates of the solid regions (step 160) and scale the coordinates to full size (step 161). This provides a compact representation that allows convenient storage of the mask information.

The locations of the corners of each solid rectangular portion can be extracted by eroding the copies of the mask with a series of four SE's 162(ULC), 162(URC), 162(LLC), and 162(LRC). SE 162(ULC) is the same as SE 82, and picks out the upper left corner when it is used to erode a rectangle. The other SE's pick out the other corners.

For rectangular regions, it is useful, but not necessary, to extract the corner coordinates in a known order; the coordinates alone dictate the association of corners with rectangular regions. However, for non-rectangular regions, where there are more than four corners for each connected region of the mask (and there may be holes), the corners must be maintained in the order they are encountered by tracing around the periphery. Although possible, this may be sufficiently complicated that it is preferable to use the mask itself.

FIG. 10 is an expanded flow diagram illustrating an alternative technique for filling holes in solid areas. The technique is to fill all 4-connected regions (rather than 8-connected regions as described above) to the smallest enclosing rectangle. This is accomplished by an iterated sequence of erosions and logical OR's using 4 SE's 171, 172, 173, and 174. Each of the SE's contains three ON pixels at three of the four corners of a 2×2 square with the remaining corner being a "don't care" position which also defines the center position of the SE. The input image (reduced by a scale factor of 16 as described above) is copied (step 175), with one copy reserved for later use and one copy being a work copy. The work copy is eroded (step 176) with SE 171, and then ORed (step 177) with the work copy. The resulting image is then copied (step 178) with one copy being reserved for use and the other being a work copy. The work copy is eroded (step 179) with SE 172, and the result is ORed (step 180) with the work copy. The sequence is repeated with copy step 181, erosion step 182 with SE 173 and logical OR step 183, followed by copy step 184, erosion step 185 with SE 174, and logical OR step 186. The result is an iterated image which is subjected to an exclusive OR (step 190) with the image input to copy step 175. If the iterated image is not changed (the XOR of the two images contains no ON pixels), the process is complete If the iterated image has changed (the XOR of the two images contains at least one ON pixel), the iterated image is communicated back and subjected to steps 175 through 186. The complete cycle repeats until the iterated image agrees with the last version reserved at copy step 175. In certain applications, it may be desired to perform a small number of iterations to effect only a partial fill.

Fast Thresholded Reduction (and Expansion) of Images

One requirement of efficient segmentation, is that thresholded reduction must be done quickly. Suppose it is desired to reduce an image by a factor of two in the vertical direction. One way to do this is to use a raster operation (bitblt—bit block transfer) to logically combine the odd and even rows, creating a single row of the reduced image for each pair of rows in the original. The same procedure can then be applied to the columns of the vertically squashed image, giving an image reduced by a factor of two in both directions.

The result, however, depends on the logical operations of the horizontal and vertical raster operations. Obtaining a result with LEVEL=1 or 4 is straightforward. If an OR is used for both raster operation orientations, the result is an ON pixel if any of the four pixels within the corresponding 2×2 square of the original were ON. This is simply a reduction with LEVEL=1. Likewise, if an AND for both raster operation orientators, the result is a reduction with LEVEL=4, where all four pixels must be ON.

A somewhat different approach is used to obtain a reduction with LEVEL=2 or 3. Let the result of doing a horizontal OR followed by a vertical AND be a reduced image R1, and let the result from doing a horizontal AND followed by a vertical OR be a reduced image R2. A reduction with LEVEL=2 is obtained by ORing R1 with R2, and a reduction with LEVEL=3 is obtained by ANDing R1 with R2.

The procedure may not be computationally efficient if implemented as described above. On some computers, such as Sun workstations, raster operations are done in software. The image is stored as a block of sequential data, starting with the first row of the image, moving left-to-right, then the second row, etc. Consequently, the raster operations between rows are fast, because 16 or 32 bits in two words can be combined in one operation. But to perform a raster operation between two columns, the corresponding bits must be found, two bits at a time (one from each column), before the logical operations can be done. It turns out that the time, per pixel, to do the vertical raster operations is at least 25 times greater than the horizontal ones. In fact, when the algorithm is implemented entirely with raster operations, over 90 percent of the time is devoted to the vertical operations.

Fortunately, there is a simple and very fast way to implement the logical operations between columns. Rather than use column raster operations, take 16 sequential bits, corresponding to 16 columns in one row. These 16 bits can be accessed as a short integer. These 16 bits are used as an index into a $2^{16}$-entry array (i.e. a lookup table) of 8-bit objects. The 8-bit contents of the array give the result of ORing the first bit of the index with the second, the third bit with the fourth . . . and on to the 15th bit with the 16th. Actually, two arrays are needed, one for ORing the 8 sets of adjacent columns, and one for ANDing the columns. It should be understood that the numerical example is just that, an example. It is also possible to implement this as a $2^8$-entry array of 4-bit objects, or any one of a number of other ways.

The use of lookup tables to implement column logical operations is about as fast, per pixel, as Sun's row raster operations. A 1000×1000 pixel image can be reduced on a Sun 3/260, with either LEVEL=1 or 4, to a 500×500 pixel image in 0.1 seconds. On a Sun 4/330, the operation takes about 0.04 second.

Special Hardware Configuration

As discussed above, 2×2 reductions require a first logical operation between rows followed by a second, possibly different, logical operation between columns. Moreover, some threshold levels require two intermediate reduced images which are then combined. The table lookup technique for column operations can become cumbersome if it is desired to have a very wide pixelword. Either the table becomes enormous or one needs special techniques of looking up parts of the wide pixelword in multiple parallel tables. The latter, while clearly superior, does require some way to use portions of the data word as memory addresses, which may not otherwise be necessary.

FIG. 10 is a logic schematic of specialized hardware for performing a logical operation between vertically adjacent 2Q-bit pixelwords and a pairwise bit reduction of the resulting 2Q-bit pixelword (bits 0 through 2Q−1). Although the drawing shows a 16-pixel word, the benefits of this hardware would become manifest for much longer pixelwords where the lookup table technique has become cumbersome. A 512-bit pixelword is contemplated, since a line of image would represent only a few pixelwords.

The reduction of the two pixelwords occurs in two stages, designated 200 and 202. In the first stage, a vertically adjacent pair of pixelwords is read from a first memory 203, and the desired first logical operation is carried out between them. The desired second logical operation is then carried out between the resulting pixelword and a version of the pixelword that is shifted by one bit. This provides a processed pixelword having the bits of interest (valid bits) in every other bit position. In the second stage, the valid bits in the processed pixelword are extracted and compressed, and the result stored in a second memory 204. Memory 203 is preferably organized with a word size corresponding to the pixelword size. Memory 204 may be organized the same way.

The preferred implementation for stage 200 is an array of bit-slice processors, such as the IDT 49C402 processor, available from Integrated Device Technology. This specific processor is a 16-bit wide device, each containing 64 shiftable registers. Thirty-two such devices would be suitable for a 512-bit pixelword. For simplification, a 16-bit system with four registers 205, 206, 207, and 208 is shown. Among the processor's operations are those that logically combine the contents of first and second registers, and store the result in the first. The processor has a data port 215, which is coupled to a data bus 217.

Second stage 202 includes first and second latched transceivers 220 and 222, each half as wide as the pixelword. Each transceiver has two ports, designated 220*a* and 220*b* for transceiver 220 and 222*a* and 222*b* for transceiver 222. Each transceiver is half as wide as the pixelword. Ports 220*a* and 222*a* are each coupled to the odd bits of data bus 217, which correspond to the bits of interest. Port 220*b* is coupled to bits 0 through (Q−1) of the data bus, while port 222*b* is coupled to bits Q through (2Q−1). The bus lines are pulled up by resistors 125 so that undriven lines are pulled high.

Consider the case of a 2×2 reduction with LEVEL=2. The sequence of operations requires that (a) a vertically adjacent pair of pixelwords be ANDed to form a single 2Q-bit pixelword, adjacent pairs of bits be ORed to form a Q-bit pixelword, and the result be stored; (b) the vertically adjacent pair of pixelwords be ORed, adjacent bits of the resultant 2Q-bit pixelword be ANDed, and the resultant Q-bit pixelword be stored; and (c) the two Q-bit pixelwords be ORed.

To effect this, a pair of vertically adjacent pixelwords are read from first memory 203 onto data bus 217 and into registers 205 and 206. Registers 205 and 206 are ANDed and the result stored in registers 207 and 208. The content of register 208 is shifted one bit to the right, registers 207 and 208 are ORed, and the result is stored in register 208. Registers 205 and 206 are ORed, and the result stored in registers 206 and 207. The content of register 207 is right shifted by one bit, registers 206 and 207 are ANDed, and the result stored in register 207.

At this point, register 207 contains the result of ORing the two pixelwords and ANDing pairs of adjacent bits, while register 208 contains the result of ANDing the pixelwords and ORing pairs of adjacent bits. However, registers 207 and 208 contain the valid bits in the odd bit positions 1, 3, . . . $(2Q-1)$. For a reduction with LEVEL=2, registers 207 and 208 are ORed and the result is made available at processor data port 215 which is coupled to data bus 217.

The odd bits of the data bus are latched into transceiver 220 through port 220*a*, resulting in a Q-bit pixelword with the valid bits in adjacent positions. Although this Q-bit entity could be read back onto the bus and transferred to memory 204, it is preferable to use both latches. Thus, two new pixelwords (horizontally adjacent to the first two) are processed at stage 200 as described above, the result is made available at processor data port 215, and is latched into transceiver 222 through port 222*a*. The contents of the two transceivers are then read out through ports 220*b* and 222*b* onto data bus 217 in order to provide a 2Q-bit pixelword that represents the reduction of four 2Q-bit pixelwords. The result is transferred to second memory 204. This overall sequence continues until all the pixelwords in the pair of rows has been processed. Once the pair of rows has been processed, subsequent pairs are similarly processed.

As mentioned above each bit-slice processor has 64 registers. Accordingly, since memory accesses are more efficient in a block mode, faster operation is likely to result if 8 pairs of pixelwords are read from memory 203 in a block, processed as discussed above, stored in the processor's registers, and written to memory 204 in a block.

Image enlargement is similar, but the steps are executed in the reverse order. First, the processor reads a pixelword and sends the left half through port 220*b* of transceiver 220. This is read onto the bus through port 220*a*. Only every other pixel in the resulting word on the bus will initially be valid, so the processor will need to validate all the pixels using a sequence of shifts and logic operations. Since resistors 225 pull up all the bus lines that are not driven, each undriven line, all the even bits in this case, will be 1's. This expanded pixelword, which alternates 1's with valid data, is read into two registers, the content of one register is shifted one place, and the registers are logically ANDed. Everywhere there was a 0 in an odd bit, there will be 00 in an even-/odd pair. None of the other bits will be affected This pixelword is then written to two vertically adjacent words in the expanded image. This process is repeated for the right half of the pixelword using the transceiver 222. The processor expands the entire row one pixelword at a time and the entire image one row at a time.

DISCUSSION OF THE SOFTWARE

A current embodiment of the invention is implemented in software on a digital computer. Appendix 1 (© 1988, Unpublished Work, Xerox Corporation) provides a source code program for implementation of this embodiment. The program is in the "C" language, well known to those of skill in the art. The program has been demonstrated on a Sun Workstation, although it will be apparent to those of skill in the art that a wide variety of programming languages and hardware configurations could readily be used based on this disclosure without departing from the scope of the invention.

CONCLUSION

In conclusion it can be seen that the invention provides efficient and effective separation of textured regions from non-textured regions in an image.

While the above is a complete description of the preferred embodiment of the invention, various modifications are possible. The above discussion of alternatives to certain steps is representative of the flexibility of the invention. Furthermore, all the above operations could be done on an image that is first reduced. Thus, much of the image computation would occur at a further reduced scale. Moreover, while the specific original image illustrated above was derived from a document scanned at 300 pixels/inch, the invention applies to documents scanned at any other resolution.

Therefore the above description and illustrations should not be taken as limiting the scope of the invention, which is defined by the claims.

```
/*****************************************************************
 *  Copyright (c) 1988, Xerox Corporation.  All rights reserved. *
 *  Copyright protection claimed includes all forms and matters  *
 *  of copyrightable material and information now allowed by     *
 *  statutory or judicial law or hereafter granted, including    *
 *  without limitation, material generated from the software     *
 *  programs which are displayed on the screen such as icons,    *
 *  screen display looks, etc.                                    *
 *****************************************************************/
```

```
/*
 *  halftoneScripts.c
 */
```

```
#include <stdio.h>
#include <llama.h>
#include <imageReps.h>
#include "alpaca.h"
#include "morph.h"
#include "strelGlobals.h"
#include "graphA.h"

static char     message[50];


/*
 *  segHT1():
 */
segHT1()
{
int                 origFactor;

            /* obtain the halftone area as a solid rectangular mask
               * at some reduced level:
               *           genHalftoneMask1()
               *           count regions; AND with original, etc...  */
            /* start from top level if scaleFactor not 1 or 2 */
        if (scaleFactor >= 4)
        {
            scaleFactor = 1;
            moveToSF(scaleFactor);
        }
        origFactor = scaleFactor;
        setAllSelectedCanvases(0);   /* initialize */

        genHalftoneMask1(origFactor);

            /*  Construct: original in 1, halftones in 3, non-halftones
             *    in 2, mask-over-original in 5, mask in 6. */
            /*  AND the original with the mask: halftone separation to pw3 */
        opPrPr(pr3, pr6, COPY);
        opPrPr(pr3, pr1, INTERSECTION);
        opPrPw(pw3, pr3, COPY);
            /* XOR the original with the halftone separation:
             *   other stuff to pw2 */
        logOp(pr2, pr1, pr3, XOR);
        opPrPw(pw2, pr2, COPY);
            /* XOR the original with the mask: mask over original to pw5 */
        logOp(pr5, pr1, pr6, XOR);
        opPrPw(pw5, pr5, COPY);
}


/*
 *  genHalftoneMask1():  obtain the halftone/stipple/solid area as
 *                          a solid rectangular mask at some reduced level:
 *          REDUCE(lev 1) to 4; CLOSE 2 to solidify HTs;
 *          REDUCE(lev 4) to 16; OPEN 2 to remove text/graphics;
 *              fill8 (completion);
 *          EXPAND to 8; DILATE 3 to resize mask;
 *          EXPAND to 1;
 */
```

```
genHalftoneMask1(origFactor)
int           origFactor;
{
int           numRegions;
BOXES        *maskToBoxes();
POLYS        *maskToPolys();

        /* use level=1 reduction to factor = 4: solidify halftones */
    togSelectedCanvases(1);
    selectiveReduce(1);
    selectiveReduce(1);
    togSelectedCanvases(1);
        /* close pr1; result to pw2: solidify halftones */
    closePr(pr2, pr1, strel2);
    opPrPw(pw2, pr2, COPY);  /*  show it */
        /* reduce with level=4 to factor = 16: weaken text */
    togSelectedCanvases(2);
    selectiveReduce(4);
    selectiveReduce(4);
    togSelectedCanvases(2);
        /* open to pw3: complete the removal of text/graphics */
    openPr(pr3, pr2, strel2);
    opPrPw(pw3, pr3, COPY);  /*  show it */
        /* fill8 to completion (max 10 iter); result to pw4 */
    fill8(pr4, pr3, TO_COMPLETION, 10);
    opPrPw(pw4, pr4, COPY);  /* show it */
        /* expand to factor = 8: need to resize with symmetric
         *    strel3 at this factor */
    togSelectedCanvases(4);
    selectiveExpand(TRUE, 1);
    togSelectedCanvases(4);
        /* dilate; to pw5: final resize of mask before expansion */
    dilate(pr5, pr4, strel3);
    opPrPw(pw5, pr5, COPY);  /* show it */
        /*  determine the number of halftone regions */
    Boxes1 = maskToBoxes(pr5);
    numRegions = Boxes1->n;
    sprintf(message, "\n Number of regions = %d\n", numRegions);
    printBoxes(Boxes1);
    displayBoxes(pr7, Boxes1);
    opPrPw(pw2, pr7, COPY);
    Polys1 = maskToPolys(pr5, scaleFactor);
    printPolys(Polys1);
    displayPolys(pr8, Polys1);
    opPrPw(pw3, pr8, COPY);
        /* copy to pw6 and expand to factor = 1 */
    opPrPw(pw6, pr5, COPY);
    togSelectedCanvases(6);
    selectiveExpand(FALSE, origFactor);
    togSelectedCanvases(6);
    textsw_insert(mainTextSw, message, strlen(message));
}
```

```
/*****************************************************************
 *  Copyright (c) 1988, Xerox Corporation.  All rights reserved. *
 *  Copyright protection claimed includes all forms and matters  *
 *  of copyrightable material and information now allowed by     *
 *  statutory or judicial law or hereafter granted, including    *
 *  without limitation, material generated from the software     *
 *  programs which are displayed on the screen such as icons,    *
 *  screen display looks, etc.                                   *
 *****************************************************************/

/*
 *  morph.h:  defined constants and STREL
 */

#include <stdio.h>
#include <llama.h>

#define  UNION             1     /* [a] OR [b] */
#define  INTERSECTION      2     /* [a] AND [b] */
#define  XOR               3
#define  SUBTRACT          4     /* [a] AND (NOT[b]) */
#define  COPY              5
#define  INVERT            6

#define  HIT               1
#define  MISS              2

#define  OP_HU             PIX_SRC | PIX_DST
#define  OP_HI             PIX_SRC & PIX_DST
#define  OP_HC             PIX_SRC
#define  OP_MU             PIX_NOT(PIX_SRC) | PIX_DST
#define  OP_MI             PIX_NOT(PIX_SRC) & PIX_DST
#define  OP_MC             PIX_NOT(PIX_SRC)
#define  OP_XOR            PIX_SRC ^ PIX_DST

#define  OFF_PIXELS        0
#define  ON_PIXELS         1

#define  OFF               0
#define  ON                1

#define  PIXELS            0
#define  WORDS             1

#define  HORIZ             1
#define  VERT              2
#define  BOTH              3

#define  LEFT              0
#define  RIGHT             1

#define  UP                0
#define  DOWN              1

#define  FIRST             1
#define  LAST              2

#define  FIXED_ITERATIONS      1
#define  TO_COMPLETION         2
```

```
#define  N_STREL       50
#define  N_HTL_FILT    50
#define  N_HT_FILT     50

#define  TO_ABLATION      1
#define  TO_ONE_PIXEL     2
#define  FOUR_CONNECT     3
#define  EIGHT_CONNECT    4

struct structEl
{
    int           nx, ny;
    int           cx, cy;
    short int   **data;
};
typedef struct structEl STREL;

/*****************************************************************
 *  Copyright (c) 1988, Xerox Corporation.  All rights reserved. *
 *  Copyright protection claimed includes all forms and matters  *
 *  of copyrightable material and information now allowed by     *
 *  statutory or judicial law or hereafter granted, including    *
 *  without limitation, material generated from the software     *
 *  programs which are displayed on the screen such as icons,    *
 *  screen display looks, etc.                                   *
 *****************************************************************/

/*
 *  alpaca.h--SunWindows include files and globals
 */

#include <pixrect/pixrect_hs.h>
#include <sunwindow/window_hs.h>
#include <suntool/sunview.h>
#include <suntool/gfxsw.h>
#include <suntool/panel.h>
#include <suntool/canvas.h>
#include <suntool/text.h>
#include <suntool/scrollbar.h>


/***************************************
 *      Data Structures                *
 ***************************************/
struct Coords
{
    int              n;         /* number of points */
    int              *x, *y;    /* arrays of integers */
};
typedef struct Coords COORDS;

struct Boxes
{
    int                  n;         /* number of boxes */
    struct Rectangle   **rect;      /* array of pointers to RECTs */
};
typedef struct Boxes BOXES;
```

```
struct Polys
{
    int                 n;          /* number of closed polygons */
    struct Poly       **poly;       /* pointer to array of pointers to POLYs,
                                     *  with each POLY representing the
                                     *  boundary of a polygon */
};
typedef struct Polys POLYS;

struct Poly
{
    struct Coords     *coords;   /* pointer to COORDS structure giving the data
                                  *   pts at "corners" of the polygon boundary */
    int                origScale;   /* original scale factor at which
                                     * polygon boundary "corners" are
                                     * was created  */
    int                scale;       /* present scale factor, to which
                                     * polygon boundary "corners" are
                                     * have been transformed */
    struct Rectangle  *bbox;     /* minimal bounding box for polygon */
    int                x, y;     /* coordinates of one point within
                                  * (and not on) the polygon boundary */
};
typedef struct Poly POLY;

struct Holo
{
    int                nbits;       /* number of bits */
    int                nerrors;     /* number of errors */
    struct Coords     *coords;      /* data coordinates */
    unsigned char     *bitArray;    /* data array (as read) */
    unsigned char     *errorArray;  /* array of read errors */
    unsigned char     *data;        /* packed as a string */
};
typedef struct Holo HOLO;

struct PrTile
{
    Pixrect         ***tile;        /* ptr to array of pixrects */
    int                nx, ny;      /* number of tiles in x and y directions */
    int                w, h;        /* size of each tile */
    int                halftones;   /* true or false */
    int                i, j;        /* index of best tile */
    Pixrect           *best;        /* pixrect of tile with largest
                                       number of transitions */
};
typedef struct PrTile PRTILE;

struct strelArray
{
    int                 n;          /* number of strels */
    char              **name;       /* array of strel names */
    struct structEl   **strels;     /* array of pointers to strels  */
};
typedef struct strelArray STAR;

/****************************************
 *        Defined Constants             *
 ****************************************/
```

```
#define  NO_CHANGE          -1
#define  NOT_FOUND          -1
#define  ERROR              -666

#define  NUM_ENTRIES        50
#define  NSCALES            6

#define  DEFAULT            0       /* for atomic pixwin ops */
#define  SAME               1       /*        "      */
#define  DIFFERENT          2       /*        "      */


/****************************************
 *         Global Vars                  *
 ****************************************/
    /*  environment globals */
EXTERN char               *Arch;               /* sun3 or sun4 */
EXTERN char               *BaseDirectory;      /* root of alpaca sources */
EXTERN char               *ImageDirectory;     /* default image directory */
EXTERN char               *SourceDirectory;    /* .strel sources, etc.  */
    /*  file names */
EXTERN char     *Hardcopy;
EXTERN char     *HardcopyRot;
EXTERN char     *Hardcopy2;
EXTERN char     *Hardcopy4;
EXTERN char     *HardcopyAlp;
EXTERN char     *HardcopyAlpRot;
EXTERN char     *HardcopyAlp2;
EXTERN char     *HardcopyAlp4;
EXTERN char     *Filename;     /* tail part of filename */

    /*  sunview globals  */
EXTERN Frame     mainFrame;
EXTERN Textsw    mainTextSw;
EXTERN Panel     mainControlPanel;
EXTERN Canvas    canvas1, canvas2, canvas3, canvas4, canvas5, canvas6;

EXTERN Pixwin          *pw1, *pw2, *pw3, *pw4, *pw5, *pw6;
EXTERN Pixwin          *pW[7];
EXTERN struct pixrect *pR0[6], *pR1[6], *pR2[6], *pR3[6],
                       *pR4[6], *pR5[6], *pR6[6], *pR7[6],
                       *pR8[6], *pR9[6], *pR10[6], *pR11[6],
                       *pR12[6], *pR13[6];
EXTERN struct pixrect *pr0, *pr1, *pr2, *pr3, *pr4, *pr5, *pr6,
                       *pr7, *pr8, *pr9, *pr10, *pr11, *pr12, *pr13;
EXTERN struct pixrect *pR[14];

EXTERN struct Coords      *Coords1, *Coords2, *Coords3, *Coords4,
                          *Coords5, *Coords6;
EXTERN struct Boxes       *Boxes1, *Boxes2, *Boxes3, *Boxes4, *Boxes5, *Boxes6;
EXTERN struct Polys       *Polys1, *Polys2, *Polys3, *Polys5, *Polys5, *Polys6;
EXTERN struct Holo        *Holo1, *Holo2, *Holo3, *Holo4, *Holo5, *Holo6;
EXTERN struct PrTile      *Prtile1, *Prtile2, *Prtile3, *Prtile4,
                          *Prtile5, *Prtile6;
EXTERN struct strelArray *Star1, *Star2, *Star3, *Star4, *Star5,
                          *Star6, *Star7, *Star8, *Star9, *Star10;

EXTERN Scrollbar      sbV1, sbH1, sbV2, sbH2, sbV3, sbH3;
```

```
EXTERN Scrollbar      sbV4, sbH4, sbV5, sbH5, sbV6, sbH6;

    /*  scale globals */
EXTERN int                 scaleFactor;
EXTERN struct Image      **scaledImage;
EXTERN int                 scaledWidth[NSCALES];
EXTERN int                 scaledHeight[NSCALES];
EXTERN struct Image       *sourceImage;
EXTERN struct Image       *auxImage;
EXTERN struct Rectangle   *readRect;

EXTERN Frame               writeFrame;
EXTERN Panel               writePanel;
EXTERN Canvas              writeCanvas;
EXTERN struct Rectangle   *writeRect;
EXTERN struct Image       *writeImage;
EXTERN int                 writeFileFormat;

EXTERN Frame               readFrame;
EXTERN Panel               readPanel;
EXTERN Canvas              chosenCanvas;
EXTERN Pixwin             *chosenPixwin;
EXTERN Pixrect            *chosenPixrect;
EXTERN int                 selectedCanvases[7];

EXTERN struct structEl    *chosenStrel, *prevChosenStrel;
EXTERN struct structEl    *prev2ChosenStrel, *prev3ChosenStrel;
EXTERN struct structEl    *selectedStrels[7];
EXTERN struct structEl    *chosenFilt, *prevChosenFilt;
EXTERN int                 activeChoose;

    /*  globals for interactive atomics */
EXTERN int                 SourceDestPwMode;
EXTERN Pixwin             *SourcePixwin;
EXTERN Pixwin             *DestPixwin;

    /*  initialized to zero by default */
EXTERN int                 totBorderLeftTop;
EXTERN int                 totBorderRight;
EXTERN int                 totBorderBottom;

    /*  globals used by morphological operators */
EXTERN int                 thresholdLevel;
EXTERN int                 numIterations;
EXTERN int                 iterMode;
EXTERN int                 thinConstraint;
EXTERN int                 thinVersion;
EXTERN int                 thinDirection;
EXTERN int                 thickConstraint;
EXTERN int                 thickVersion;
EXTERN int                 thickDirection;
EXTERN int                 lineLength;

/************************************************************
 *  Copyright 1988, Xerox Corporation.  All rights reserved. *
 ************************************************************/
/*
 * "$Log:      strelGlobals.h,v $
 * Revision 1.0  88/09/15  18:05:18  bloomber
```

```
 * Initial revision
 * "
 *
 */

/*
 *  strelGlobals.h:  global names for structuring elements
 */

#include <stdio.h>
#include <llama.h>


EXTERN STREL   **strelArray;
EXTERN STREL   **HTLFiltArray, **HTFiltArray;

    /* linear elements */
EXTERN STREL    *strel2h, *strel2hR, *strel3h, *strel4h, *strel5h;
EXTERN STREL    *strel6h, *strel7h, *strel8h, *strel9h;
EXTERN STREL    *strel2v, *strel2vB, *strel3v, *strel4v, *strel5v;
EXTERN STREL    *strel6v, *strel7v, *strel8v, *strel9v;
EXTERN STREL    *strel10h, *strel10v, *strel11h, *strel11v;
EXTERN STREL    *strel13h, *strel13v, *strel15h, *strel15v;
EXTERN STREL    *strel20h, *strel20v, *strel25h, *strel25v;
EXTERN STREL    *strel30h, *strel30v, *strel35h, *strel35v;
EXTERN STREL    *strel40h, *strel40v, *strel45h, *strel45v;
EXTERN STREL    *strel50h, *strel50v;

    /*  diagonal elements */
EXTERN STREL    *strel3dp, *strel3dn, *strel4dp, *strel4dn;
EXTERN STREL    *strel5dp, *strel5dn, *strel6dp, *strel6dn;
EXTERN STREL    *strel7dp, *strel7dn, *strel9dp, *strel9dn;
EXTERN STREL    *strel11dp, *strel11dn, *strel13dp, *strel13dn;
EXTERN STREL    *strel15dp, *strel15dn;
EXTERN STREL    *strel5hdp, *strel5hdn, *strel5vdp, *strel5vdn;
EXTERN STREL    *strel9hdp, *strel9hdn, *strel9vdp, *strel9vdn;
EXTERN STREL    *strel13hdp, *strel13hdn, *strel13vdp, *strel13vdn;

    /*  broken linear elements */
EXTERN STREL    *strelF10h, *strelF10v, *strelF15h, *strelF15v;
EXTERN STREL    *strelF20h, *strelF20v, *strelF25h, *strelF25v;
EXTERN STREL    *strelF30h, *strelF30v, *strelF35h, *strelF35v;
EXTERN STREL    *strelF40h, *strelF40v, *strelF45h, *strelF45v;
EXTERN STREL    *strelF50h, *strelF50v;

    /*  square elements */
EXTERN STREL    *strel1, *strel2, *strel3, *strel4, *strel5;

EXTERN STREL    *strel2dp, *strel2dm;

EXTERN STREL    *strel2ule, *strel2uld, *strel2ure, *strel2urd;
EXTERN STREL    *strel2lle, *strel2lld, *strel2lre, *strel2lrd;

    /* use for b.b. corners */

EXTERN STREL    *strel2tl, *strel2tr, *strel2bl, *strel2br;
EXTERN STREL    *strel7tl, *strel7tr, *strel7bl, *strel7br;
EXTERN STREL    *strel8tl, *strel8tr, *strel8bl, *strel8br;
EXTERN STREL    *strel9tl, *strel9tr, *strel9bl, *strel9br;
```

```
EXTERN STREL    *strellltl, *strellltr, *strelllbl, *strelllbr;

EXTERN STREL    *strel3ve, *strel4ve, *strel2vd;

EXTERN STREL    *strel3h1, *strel3h2, *strel3v1, *strel3v2;
EXTERN STREL    *strel4h1, *strel4h2, *strel4v1, *strel4v2;
EXTERN STREL    *strel5h1, *strel5h2, *strel5v1, *strel5v2;

EXTERN STREL    *strel3ht1, *strel3ht2;

    /* use for separating characters */
EXTERN STREL    *strel5gap;

    /* use for segmenting italic typefaces */
EXTERN STREL    *strelItal1, *strelItal2, *strelItal3, *strelItal4;
EXTERN STREL    *strelItal5, *strelItal6, *strelItal7, *strelItal8;

    /* use for detecting inverted text */
EXTERN STREL    *strel180a, *strel180b, *strel180c, *strel180d;
EXTERN STREL    *strel180e, *strel180f, *strel180g, *strel180h;

    /* use for thinning to ablation */
EXTERN STREL    *strel2hl, *strel2hr, *strel2vt, *strel2vb;

    /* use for thinning to one pixel */
EXTERN STREL    *strel3hl, *strel3hr, *strel3vt, *strel3vb;

    /* use for 4-connect thinning */
EXTERN STREL    *strel3la4, *strel3lb4, *strel3lc4, *strel3ld4;
EXTERN STREL    *strel3le4, *strel3lf4, *strel3lg4, *strel3lh4;
EXTERN STREL    *strel3ra4, *strel3rb4, *strel3rc4, *strel3rd4;
EXTERN STREL    *strel3re4, *strel3rf4, *strel3rg4, *strel3rh4;
EXTERN STREL    *strel3ta4, *strel3tb4, *strel3tc4, *strel3td4;
EXTERN STREL    *strel3te4, *strel3tf4, *strel3tg4, *strel3th4;
EXTERN STREL    *strel3ba4, *strel3bb4, *strel3bc4, *strel3bd4;
EXTERN STREL    *strel3be4, *strel3bf4, *strel3bg4, *strel3bh4;

    /* use for 8-connect thinning */
EXTERN STREL    *strel3la8, *strel3lb8, *strel3lc8, *strel3ld8;
EXTERN STREL    *strel3le8, *strel3lf8, *strel3lg8, *strel3lh8;
EXTERN STREL    *strel3ra8, *strel3rb8, *strel3rc8, *strel3rd8;
EXTERN STREL    *strel3re8, *strel3rf8, *strel3rg8, *strel3rh8;
EXTERN STREL    *strel3ta8, *strel3tb8, *strel3tc8, *strel3td8;
EXTERN STREL    *strel3te8, *strel3tf8, *strel3tg8, *strel3th8;
EXTERN STREL    *strel3ba8, *strel3bb8, *strel3bc8, *strel3bd8;
EXTERN STREL    *strel3be8, *strel3bf8, *strel3bg8, *strel3bh8;

    /* use for spiral thinning */
EXTERN STREL    *strel3Se, *strel3Sne, *strel3Sn, *strel3Snw;
EXTERN STREL    *strel3Sw, *strel3Ssw, *strel3Ss, *strel3Sse;

    /* use for anti-aliasing */
EXTERN STREL    *strelHTR, *strelHTL, *strelHBR, *strelHBL;
EXTERN STREL    *strelVLT, *strelVLB, *strelVRT, *strelVRB;

EXTERN STREL    *strel3s1ul, *strel3s1ll, *strel3s1ur, *strel3s1lr;
EXTERN STREL    *strel3s2ul, *strel3s2ll, *strel3s2ur, *strel3s2lr;
```

```
    /*  use for reading slanted font digital data */
EXTERN STREL    *strel3Sp, *strel3Sn, *strel4Sp, *strel4Sn;
EXTERN STREL    *strel5Sp, *strel5Sn, *strel6Sp, *strel6Sn;
EXTERN STREL    *strel7Sp, *strel7Sn, *strel8Sp, *strel8Sn;

    /*  use for temporary SEs during program development */
EXTERN STREL    *strelT1, *strelT2, *strelT3, *strelT4, *strelT5;
EXTERN STREL    *strelT6, *strelT7, *strelT8, *strelT9, *strelT10;
EXTERN STREL    *strelT11, *strelT12, *strelT13, *strelT14, *strelT15;
EXTERN STREL    *strelT16, *strelT17, *strelT18, *strelT19, *strelT20;

            /**************************
            *Halftone spatial filters *
            **************************/
    /*  Horizontal, 0 degrees */
EXTERN STREL    *filtH8p2c0d, *filtH8p3c0d;

    /*  Solid, 1 cycle, 0 degrees  */
EXTERN STREL    *filtS4p1c0d, *filtS4p1c0dI;
EXTERN STREL    *filtS6p1c0d;
EXTERN STREL    *filtS8p1c0d;

    /*  Solid, 1.5 cycle, 0 degrees  */
EXTERN STREL    *filtS8p15c0d;

    /*  Cruciform, 1 cycle, 8 pix/cycle, 30 degrees  */
EXTERN STREL    *filtC8p1c30d;

    /*  Cruciform, 3 cycle, 8 pix/cycle  */
EXTERN STREL    *filtC8p3c0d;

    /*  Cruciform, 2 cycle, 4 pix/cycle  */
EXTERN STREL    *filtC4p2c0d, *filtC4p2c0dI;
EXTERN STREL    *filtC4p2c14d;
EXTERN STREL    *filtC4p2c27d;
EXTERN STREL    *filtC4p2c27dI;
EXTERN STREL    *filtC4p2c45d;

    /*  Cruciform, 2 cycle, 5 pix/cycle  */
EXTERN STREL    *filtC5p2c0d;
EXTERN STREL    *filtC5p2c22d;
EXTERN STREL    *filtC5p2c37d;

    /*  Cruciform, 2 cycle, 6 pix/cycle  */
EXTERN STREL    *filtC6p2c0d;
EXTERN STREL    *filtC6p2c18d;
EXTERN STREL    *filtC6p2c31d;
EXTERN STREL    *filtC6p2c45d;

    /*  Cruciform, 2 cycle, 7 pix/cycle  */
EXTERN STREL    *filtC7p2c0d;
EXTERN STREL    *filtC7p2c27d;
EXTERN STREL    *filtC7p2c34d;
EXTERN STREL    *filtC7p2c45d;

    /*  Cruciform, 2 cycle, 8 pix/cycle  */
EXTERN STREL    *filtC8p2c0d;
EXTERN STREL    *filtC8p2c23d;
```

```
EXTERN STREL    *filtC8p2c30d;
EXTERN STREL    *filtC8p2c45d;

    /*  Light, 1 cycle, period = 3 */
EXTERN STREL    *filtL3p1c18d;
EXTERN STREL    *filtL3p1c45d;

    /*  Light, 1 cycle, period = 4 */
EXTERN STREL    *filtL4p1c0d;
EXTERN STREL    *filtL4p1c27d;
EXTERN STREL    *filtL4p1c45d;

    /*  Light, 1 cycle, period = 5 */
EXTERN STREL    *filtL5p1c0d;
EXTERN STREL    *filtL5p1c11d;

    /*  Light, 1 cycle, period = 6 */
EXTERN STREL    *filtL6p1c0d;
EXTERN STREL    *filtL6p1c18d;
EXTERN STREL    *filtL6p1c31d;
EXTERN STREL    *filtL6p1c45d;

    /*  Light, 1 cycle, period = 7 */
EXTERN STREL    *filtL7p1c8d;
EXTERN STREL    *filtL7p1c34d;
EXTERN STREL    *filtL7p1c45d;

    /*  Light, 1 cycle, period = 8 */
EXTERN STREL    *filtL8p1c0d;
EXTERN STREL    *filtL8p1c14d;
EXTERN STREL    *filtL8p1c23d;
EXTERN STREL    *filtL8p1c45d;


            /***************************
             *Textline spatial filters *
             ***************************/
    /*  4 cycle, white */
EXTERN STREL    *filtV20p4cW, *filtV25p4cW, *filtV30p4cW;
EXTERN STREL    *filtV35p4cW, *filtV40p4cW;
    /*  3 cycle, black&white */
EXTERN STREL    *filtV20p3cBW, *filtV25p3cBW, *filtV30p3cBW;
EXTERN STREL    *filtV35p3cBW, *filtV40p3cBW;
    /*  2 cycle, black&white */
EXTERN STREL    *filtV20p2cBW, *filtV25p2cBW, *filtV30p2cBW;
EXTERN STREL    *filtV35p2cBW, *filtV40p2cBW;
    /*  2 cycle, black&white, center at top */
EXTERN STREL    *filtV20p2ctBW, *filtV25p2ctBW, *filtV30p2ctBW;
EXTERN STREL    *filtV35p2ctBW, *filtV40p2ctBW;
    /*  2 cycle, black&white, center at bottom */
EXTERN STREL    *filtV20p2cbBW, *filtV25p2cbBW, *filtV30p2cbBW;
EXTERN STREL    *filtV35p2cbBW, *filtV40p2cbBW;

/***************************************************************
 *  Copyright 1988, Xerox Corporation.  All rights reserved. *
 ***************************************************************/
/*
 * "$Log:       graphA.h,v $
 * Revision 1.0  88/09/15  18:04:24  bloomber
```

```
 * Initial revision
 * "
 *
 */

/*
 *  graphA.h
 */

/*******************************************
 *  The following files must be included: *
 *    #include <stdio.h>                  *
 *    #include <math.h>                   *
 *    #include <suntool/sunview.h>        *
 *    #include <suntool/panel.h>          *
 *    #include <suntool/textsw.h>         *
 *    #include <suntool/canvas.h>         *
 *    #include <suntool/scrollbar.h>      *
 *******************************************/

#include <math.h>

#define   XAXIS             1
#define   YAXIS             2
#define   POINTS            1
#define   CURVE             2
#define   HISTOGRAM         3
#define   GRAPH_ARRAY_SIZE  1500

/*****************************
 * globals for graph frame   *
 *****************************/
EXTERN Frame           graphFrame;
EXTERN Panel           graphMessagePanel;
EXTERN Panel           graphControlPanel;
EXTERN Canvas          graphCanvas;
EXTERN Pixwin         *graphPw;
EXTERN struct Data    *graphData;
EXTERN int             graphCanvasWidth, graphCanvasHeight;

EXTERN Frame           graphInputFrame;
EXTERN Panel           graphInputPanel;
EXTERN int             graphAutoScale;

/*****************************
 *     data structures       *
 *****************************/
struct Data
{
    int                 x[GRAPH_ARRAY_SIZE], y[GRAPH_ARRAY_SIZE];
    int                 n;     /* beginning of unused data */
    int                 maxX, minX, maxY, minY;
    float               scaleX, scaleY;
    int                 origX, origY;
    int                 type;
    char               *title;
};
typedef struct Data DATA;
```

```
/************************************************************
 * Copyright (c) 1989, Xerox Corporation.  All rights reserved. *
   Copyright protection claimed includes all forms and matters
   of copyrightable material and information now allowed by
   statutory or judicial law or hereafter granted, including
   without limitation, material generated from the software
   programs which are displayed on the screen such as icons,
   screen display looks, etc.
************************************************************/

/*
 *  morphOpsAlpl.c--morphological and logical procedures.
 *      basic:
 *                  dilate()   minkowsky add (dilate with hits only)
 *                  dilateB()  generalized dilate using hits and misses
 *                  dilateI()   minkowsky add by spatially inverted strel
 *                  erode()      generalized erode using hits and misses
 *                  erodeH()     erose using hits only
 *                  erodeI()     generalized erode by spatially inverted strel
 *                  openPr()  [pr9] erosion followed by dilation (strel)
 *                  openPrA()
 *                  closePr() [pr9] dilateB followed by erodeH
 *                  closePrA()
 *                  erodeDilate() [pr9]
 *                  erodeDilateA()
 *                  dilateAdd()
 *                  dilateSepar()  [pr9]   dilation by a separable strel
 *                  dilateSeparA()
 *                  erodeSepar() [pr9]  erosion by a separable strel
 *                  erodeSeparA()
 *                  openSepar() [pr9]  open by a separable strel
 *                  openSeparA()
 *                  closeSepar() [pr9]  close by a separable strel
 *                  closeSeparA()
 *                  clearPw()
 *                  clearPr()
 *                  opPrPr() [pr10]  six operations: union, intersect, xor,
 *                                    subtraction, copy, invert
 *                  opPrPrA()
 *                  opPrPw() [pr10]          ...
 *                  opPrPwA()                ...
 *                  opPwPr() [pr10]          ...
 *                  opPwPrA()                ...
 *                  bltOp()   basic rasterops between prs
 *                  logOp()   five operations between 2 pr; result to
 *                                    a third pr.
 *      composite:
 *                  edge() [pr7]           boundary pixels
 *                  edgeA()
 *                  line() [pr9]
 *                  lineA()
 *                  lineF() [pr9]        fast version of line
 *                  lineFA()
 *      iterative composites and script-like subroutines:
 *                  fill8() [pr7, pr8]
 *                  fill8A()
 *                  fill4() [pr7, pr8]
 *                  fill4A()
```

```
 *                  fillClip() [pr7, pr8]
 *                  corner() [pr7]
 *                  cornerA()
 */

#include <stdio.h>
#include <llama.h>
#include <imageReps.h>
#include "alp.h"
#include "morph.h"
#include "alpStrels.h"

#define   WARNING     1      /* if non-zero, warning messages issued when
                              * temporary pixrects are created.       */

/*
 *  dilate():  dilates a pixrect by hits in a structElem.
 *             Result to a pixrect.
 *             The coordinates (cx,cy) give the 'hot point' of the
 *                structElem, with respect to the UL corner.
 *                Alternatively, they give the reference point for the
 *                full image blts.
 *             Note:  this is the usual version of dilation, that is
 *                restricted to hits.  It ignores the misses.
 *             Note:  dilation is the same as Minkowsky addition.
 */
dilate(pixrD, pixrS, strel)
Pixrect        *pixrD, *pixrS;
STREL          *strel;
{
int             i, j, nx, ny, cx, cy, first;
static char     procName[] = "dilate";

    if (!isPrDefined(pixrD, procName))
        return;
    if (!isPrDefined(pixrS, procName))
        return;

    first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, i - cx, j - cy, COPY);
                    first = FALSE;
                }
            }
            else if (strel->data[j][i] == 1)
                bltOp(pixrD, pixrS, HIT, i - cx, j - cy, UNION);
}
```

```
/*
 *  dilateB():  dilates a pixrect by hits/misses in a structElem.
 *              Result to a pixrect.
 *              The coordinates (cx,cy) give the 'hot point' of the
 *                 structElem, with respect to the UL corner.
 *                 Alternatively, they give the reference point for the
 *                 full image blts.
 *              Note:  this is an unorthodox version, that dilates by ORing
 *                 shifted bit-inverted images for misses!!  It is the
 *                 dual to the hit/miss generalized erode.
 */
dilateB(pixrD, pixrS, strel)
Pixrect      *pixrD, *pixrS;
STREL        *strel;
{
int            i, j, nx, ny, cx, cy, first;
static char    procName[] = "dilateB";

    if (!isPrDefined(pixrD, procName))
        return;
    if (!isPrDefined(pixrS, procName))
        return;

    first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, i - cx, j - cy, COPY);
                    first = FALSE;
                }
                else if (strel->data[j][i] == 2)  /* copy inverted image */
                {
                    bltOp(pixrD, pixrS, MISS, i - cx, j - cy, COPY);
                    first = FALSE;
                }
            }
            else if (strel->data[j][i] == 1)
                bltOp(pixrD, pixrS, HIT, i - cx, j - cy, UNION);
            else if (strel->data[j][i] == 2)
                bltOp(pixrD, pixrS, MISS, i - cx, j - cy, UNION);
}


/*
 *  dilateI():  dilates a pixrect by a spatially inverted STREL.
 *              Result to a pixrect.
 *              Note:  because dilation is Minkowsky addition,
 *                dilation by an inverted STREL is the same as Minkowsky
 *                addition by an inverted STREL.  The misses in the STREL
 *                are ignored.
 */
```

```
dilateI(pixrD, pixrS, strel)
Pixrect      *pixrD, *pixrS;
STREL        *strel;
{
int            i, j, nx, ny, cx, cy, first;
static char   procName[] = "dilateI";
    if (!isPrDefined(pixrS, procName))
        return;
    if (!isPrDefined(pixrD, procName))
        return;

    first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, -i + cx, -j + cy, COPY);
                    first = FALSE;
                }
            }
            else if (strel->data[j][i] == 1)
                bltOp(pixrD, pixrS, HIT, -i + cx, -j + cy, UNION);
}


/*
 *  erode():  erodes a pixrect by a hit/miss STREL.
 *            Result to a pixrect.
 *            The coordinates (cx,cy) give the 'hot point' of the
 *              structElem, with respect to the UL corner.
 *              Alternatively, they give the reference point for the
 *              full image blts.
 *            Note: this is a hit/miss transform for general STRELs.
 */
erode(pixrD, pixrS, strel)
Pixrect      *pixrD, *pixrS;
STREL        *strel;
{
int            i, j, nx, ny, cx, cy, first;
static char   procName[] = "erode";

    if (!isPrDefined(pixrS, procName))
        return;
    if (!isPrDefined(pixrD, procName))
        return;

    first = TRUE;
    nx = strel->nx;
    ny = strel->ny;
    cx = strel->cx;
    cy = strel->cy;
    for (j = 0; j < ny; j++)
```

```
        for (i = 0; i < nx; i++)
            if (first == TRUE)  /* no blits yet */
            {
                if (strel->data[j][i] == 1)  /* copy image */
                {
                    bltOp(pixrD, pixrS, HIT, -i + cx, -j + cy, COPY);
                    first = FALSE;
                }
                else if (strel->data[j][i] == 2)  /* copy inverted image */
                {
                    bltOp(pixrD, pixrS, MISS, -i + cx, -j + cy, COPY);
                    first = FALSE;
                }
            }
            else if (strel->data[j][i] == 1)
                bltOp(pixrD, pixrS, HIT, -i + cx, -j + cy, INTERSECTION);
            else if (strel->data[j][i] == 2)
                bltOp(pixrD, pixrS, MISS, -i + cx, -j + cy, INTERSECTION);
}


/*
 *  erodeH():  erodes a pixrect by the hits in a STREL.
 *             Result to a pixrect.
 *             The coordinates (cx,cy) give the 'hot point' of the
 *               structElem, with respect to the UL corner.
 *               Alternatively, they give the reference point for the
 *               full image blts.
 */
erodeH(pixrD, pixrS, strel)
Pixrect       *pixrD, *pixrS;
STREL         *strel;
{
int            i, j, nx, ny, cx, cy, first;
static char    procName[] = "erodeH";

    if (!isPrDefined(pixrS, procName))
        return;
    if (!isPrDefined(pixrD, procName))
        return;

    first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, -i + cx, -j + cy, COPY);
                    first = FALSE;
                }
            }
            else if (strel->data[j][i] == 1)
                bltOp(pixrD, pixrS, HIT, -i + cx, -j + cy, INTERSECTION);
```

```
}


/*
 *  erodeI():  erodes a pixrect by a spatially inverted STREL.
 *               Result to a pixrect.
 *             The coordinates (cx,cy) give the 'hot point' of the
 *               structElem, with respect to the UL corner.
 *               Alternatively, they give the reference point for the
 *               full image blts.
 *             Note:  because erosion is Minkowsky subtraction by the
 *               inverted STREL, erosion by an inverted STREL is just
 *               Minkowsky subtraction.  This operation, however, is
 *               the generalized erosion (hit/miss).
 */
erodeI(pixrD, pixrS, strel)
Pixrect      *pixrD, *pixrS;
STREL        *strel;
{
int           i, j, nx, ny, cx, cy, first;
static char   procName[] = "erodeI";

    if (!isPrDefined(pixrS, procName))
        return;
    if (!isPrDefined(pixrD, procName))
        return;

    first = TRUE;
    nx = strel->nx;
    ny = strel->ny;
    cx = strel->cx;
    cy = strel->cy;
    for (j = 0; j < ny; j++)
        for (i = 0; i < nx; i++)
            if (first == TRUE)  /* no blits yet */
            {
                if (strel->data[j][i] == 1)  /* copy image */
                {
                    bltOp(pixrD, pixrS, HIT, i - cx, j - cy, COPY);
                    first = FALSE;
                }
                else if (strel->data[j][i] == 2)  /* copy inverted image */
                {
                    bltOp(pixrD, pixrS, MISS, i - cx, j - cy, COPY);
                    first = FALSE;
                }
            }
            else if (strel->data[j][i] == 1)
                bltOp(pixrD, pixrS, HIT, i - cx, j - cy, INTERSECTION);
            else if (strel->data[j][i] == 2)
                bltOp(pixrD, pixrS, MISS, i - cx, j - cy, INTERSECTION);
}


/*
 *  openPr():  Erosion followed by dilation, using the same structElem.
 *               Input from pixrect; output to pixrect
 *               Input and output pixrects can be the same.
```

```
 *              N.B.  "open()" is restricted name! (a system call)
 */
openPr(pixrD, pixrS, strel)
Pixrect      *pixrS, *pixrD;
STREL        *strel;
{
static char   procName[] = "openPr";
Pixrect     *prtemp;

    if (!isPrDefined(pixrS, procName))
        return;
    if (!isPrDefined(pixrD, procName))
        return;

    if (!pr9)
    {
#if WARNING
        printf(" Warning in openPr: Creating a temporary pixrect!\n");
#endif WARNING
        prtemp = mem_create(pixrS->pr_size.x, pixrS->pr_size.y, 1);
        erode(prtemp, pixrS, strel);
        dilate(pixrD, prtemp, strel);
        pr_close(prtemp);
    }
    else
    {
        erode(pr9, pixrS, strel);
        dilate(pixrD, pr9, strel);
    }
}


/*
 *  openPrA():  Erosion followed by dilation, using the same structElem.
 *               Input from pixrect; output to pixrect
 *               Input and output pixrects can be the same.
 *               Special version for Alp, requiring spec. of intermediate pr.
 */
openPrA(pixrD, pixrS, pixrI, strel)
Pixrect      *pixrS, *pixrD, *pixrI;
STREL        *strel;
{
static char   procName[] = "openPrA";

    if (!isPrDefined(pixrS, procName))
        return;
    if (!isPrDefined(pixrD, procName))
        return;
    if (!isPrDefined(pixrI, procName))
        return;

    erode(pixrI, pixrS, strel);
    dilate(pixrD, pixrI, strel);
}


/*
 *  closePr():  Dilation followed by erosion, using the same structElem.
```

```
 *              Input from a pixrect; output to a pixrect.
 *              Input and output pixrects can be the same.
 *              N.B.:  "close()" is a restricted name! (a system call).
 */
closePr(pixrD, pixrS, strel)
Pixrect      *pixrD, *pixrS;
STREL        *strel;
{
Pixrect      *prtemp;
static char   procName[] = "closePr";

    if (!isPrDefined(pixrS, procName))
        return;
    if (!isPrDefined(pixrD, procName))
        return;

    if (!pr9)
    {
#if WARNING
        printf(" Warning in closePr: Creating a temporary pixrect!\n");
#endif WARNING
        prtemp = mem_create(pixrS->pr_size.x, pixrS->pr_size.y, 1);
        dilateB(prtemp, pixrS, strel);
        erodeH(pixrD, prtemp, strel);
        pr_close(prtemp);
    }
    else
    {
        dilateB(pr9, pixrS, strel);
        erodeH(pixrD, pr9, strel);
    }
}


/*
 *  closePrA():  Dilation followed by erosion, using the same STREL.
 *               Input from a pixrect; output to a pixrect.
 *               Input and output pixrects can be the same.
 *               Special version for Alp, requiring spec. of intermediate pr.
 */
closePrA(pixrD, pixrS, pixrI, strel)
Pixrect      *pixrD, *pixrS, *pixrI;
STREL        *strel;
{
static char   procName[] = "closePrA";

    if (!isPrDefined(pixrS, procName))
        return;
    if (!isPrDefined(pixrD, procName))
        return;
    if (!isPrDefined(pixrI, procName))
        return;

    dilateB(pixrI, pixrS, strel);
    erodeH(pixrD, pixrI, strel);
}
```

```
/*
 *  erodeDilate():    Erosion followed by dilation, using in general
 *                    different structuring elements.  Result to pixrect.
 *                    Input and output pixrects can be the same.
 */
erodeDilate(pixrD, pixrS, strelE, strelD)
Pixrect       *pixrD, *pixrS;
STREL         *strelE, *strelD;
{
Pixrect       *prtemp;
static char    procName[] = "erodeDilate";

    if (!isPrDefined(pixrS, procName))
        return;
    if (!isPrDefined(pixrD, procName))
        return;

    if (!pr9)
    {
#if WARNING
        printf(" Warning in erodeDilate: Creating a temporary pixrect!\n");
#endif WARNING
        prtemp = mem_create(pixrS->pr_size.x, pixrS->pr_size.y, 1);
        erode(prtemp, pixrS, strelE);
        dilate(pixrD, prtemp, strelD);
        pr_close(prtemp);
    }
    else
    {
        erode(pr9, pixrS, strelE);
        dilate(pixrD, pr9, strelD);
    }
}


/*
 *  erodeDilateA():    Erosion followed by dilation, using in general
 *                    different structuring elements.  Result to pixrect.
 *                    Input and output pixrects can be the same.
 *               Special version for Alp, requiring spec. of intermediate pr.
 */
erodeDilateA(pixrD, pixrS, pixrI, strelE, strelD)
Pixrect       *pixrD, *pixrS, *pixrI;
STREL         *strelE, *strelD;
{
static char    procName[] = "erodeDilateA";

    if (!isPrDefined(pixrS, procName))
        return;
    if (!isPrDefined(pixrD, procName))
        return;
    if (!isPrDefined(pixrI, procName))
        return;

    erode(pixrI, pixrS, strelE);
    dilate(pixrD, pixrI, strelD);
}
```

```
/*
 *  dilateAdd():  dilates a pixrect by a structElem.  Then adds the
 *                  result to the destination pixrect.  This differs from
 *                  the usual dilate(), which simply puts the dilated
 *                  result in the destination.
 */
dilateAdd(pixrD, pixrS, strel)
Pixrect        *pixrD, *pixrS;
STREL          *strel;
{
int             i, j, nx, ny, cx, cy;
static char     procName[] = "dilateAdd";

    if (!isPrDefined(pixrS, procName))
        return;
    if (!isPrDefined(pixrD, procName))
        return;

    nx = strel->nx;
    ny = strel->ny;
    cx = strel->cx;
    cy = strel->cy;
    for (j = 0; j < ny; j++)
        for (i = 0; i < nx; i++)
            if (strel->data[j][i] == 1)
                bltOp(pixrD, pixrS, HIT, i - cx, j - cy, UNION);
            else if (strel->data[j][i] == 2)
                bltOp(pixrD, pixrS, MISS, i - cx, j - cy, UNION);
}


/*
 *  dilateSepar():  dilates a pr by a separable strel; result to a pr.
 *                    the separable strel is decomposed into the two
 *                       linear strels: strel_1, strel_2
 *                    strel_1 is used before strel_2
 *                  Uses pr9 as temp. storage.
 *                  The source and destination pr can be the same.
 */
dilateSepar(pixrD, pixrS, strel_1, strel_2)
Pixrect        *pixrD, *pixrS;
STREL          *strel_1, *strel_2;
{
static char     procName[] = "dilateSepar";
Pixrect        *prtemp;

    if (!isPrDefined(pixrS, procName))
        return;
    if (!isPrDefined(pixrD, procName))
        return;

    if (!pr9)
    {
#if WARNING
        printf(" Warning in dilateSepar: Creating a temporary pixrect!\n");
#endif WARNING
        prtemp = mem_create(pixrS->pr_size.x, pixrS->pr_size.y, 1);
        dilate(prtemp, pixrS, strel_1);
```

```
        dilate(pixrD, prtemp, strel_2);
        pr_close(prtemp);
    }
    else
    {
        dilate(pr9, pixrS, strel_1);
        dilate(pixrD, pr9, strel_2);
    }

}


/*
 *  dilateSeparA():  dilates a pr by a separable strel; result to a pr.
 *                    the separable strel is decomposed into the two
 *                       linear strels: strel_1, strel_2
 *                    strel_1 is used before strel_2
 *                  The source and destination pr can be the same.
 *              Special version for Alp, requiring spec. of intermediate pr.
 */
dilateSeparA(pixrD, pixrS, pixrI, strel_1, strel_2)
Pixrect      *pixrD, *pixrS, *pixrI;
STREL        *strel_1, *strel_2;
{
static char   procName[] = "dilateSeparA";

    if (!isPrDefined(pixrS, procName))
        return;
    if (!isPrDefined(pixrD, procName))
        return;
    if (!isPrDefined(pixrI, procName))
        return;

    dilate(pixrI, pixrS, strel_1);
    dilate(pixrD, pixrI, strel_2);
}


/*
 *  erodeSepar(): Erodes a pr by a separable strel; result to a pr.
 *                  the separable strel is decomposed into the two
 *                     linear strels: strel_1, strel_2
 *                  strel_1 is used before strel_2
 *                Uses pr9 as temp. storage.
 *                The source and destination pr can be the same.
 */
erodeSepar(pixrD, pixrS, strel_1, strel_2)
Pixrect      *pixrD, *pixrS;
STREL        *strel_1, *strel_2;
{
static char   procName[] = "erodeSepar";
Pixrect      *prtemp;

    if (!isPrDefined(pixrS, procName))
        return;
    if (!isPrDefined(pixrD, procName))
        return;
```

```
    if (!pr9)
    {
#if WARNING
        printf(" Warning in erodeSepar: Creating a temporary pixrect!\n");
#endif WARNING
        prtemp = mem_create(pixrS->pr_size.x, pixrS->pr_size.y, 1);
        erode(prtemp, pixrS, strel_1);
        erode(pixrD, prtemp, strel_2);
        pr_close(prtemp);
    }
    else
    {
        erode(pr9, pixrS, strel_1);
        erode(pixrD, pr9, strel_2);
    }
}


/*
 *  erodeSeparA(): Erodes a pr by a separable strel; result to a pr.
 *                    the separable strel is decomposed into the two
 *                       linear strels: strel_1, strel_2
 *                    strel_1 is used before strel_2
 *                  The source and destination pr can be the same.
 *                 Special version for Alp, requiring spec. of intermediate pr.
 */
erodeSeparA(pixrD, pixrS, pixrI, strel_1, strel_2)
Pixrect      *pixrD, *pixrS, *pixrI;
STREL        *strel_1, *strel_2;
{
static char   procName[] = "erodeSeparA";

    if (!isPrDefined(pixrS, procName))
        return;
    if (!isPrDefined(pixrD, procName))
        return;
    if (!isPrDefined(pixrI, procName))
        return;

    erode(pixrI, pixrS, strel_1);
    erode(pixrD, pixrI, strel_2);
}


/*
 *  openSepar():  Open a pr with separable struct elems; result to a pr.
 *                    Use strel_1 first; then strel_2.
 *                The source and destination pr can be the same.
 *                Uses pr9 implicitly for temp. storage.
 */
openSepar(pixrD, pixrS, strel_1, strel_2)
Pixrect      *pixrD, *pixrS;
STREL        *strel_1, *strel_2;
{
static char   procName[] = "openSepar";

    if (!isPrDefined(pixrS, procName))
        return;
```

```
    if (!isPrDefined(pixrD, procName))
        return;

    erodeSepar(pixrD, pixrS, strel_1, strel_2);
    dilateSepar(pixrD, pixrD, strel_1, strel_2);
}


/*
 *  openSeparA():  Open a pr with separable struct elems; result to a pr.
 *                     Use strel_1 first; then strel_2.
 *                 The source and destination pr can be the same.
 *                 Special version for Alp, requiring spec. of intermediate pr.
 */
openSeparA(pixrD, pixrS, pixrI, strel_1, strel_2)
Pixrect      *pixrD, *pixrS, *pixrI;
STREL        *strel_1, *strel_2;
{
static char   procName[] = "openSeparA";

    if (!isPrDefined(pixrS, procName))
        return;
    if (!isPrDefined(pixrD, procName))
        return;
    if (!isPrDefined(pixrI, procName))
        return;

    erodeSeparA(pixrD, pixrS, pixrI, strel_1, strel_2);
    dilateSeparA(pixrD, pixrD, pixrI, strel_1, strel_2);
}


/*
 *  closeSepar(): Close a pr with separable struct elems; result to a pr.
 *                    Use strel_1 first; then strel_2.
 *                The source and destination pr can be the same.
 *                Uses pr9 implicitly for temp. storage.
 */
closeSepar(pixrD, pixrS, strel_1, strel_2)
Pixrect      *pixrD, *pixrS;
STREL        *strel_1, *strel_2;
{
static char   procName[] = "closeSepar";

    if (!isPrDefined(pixrS, procName))
        return;
    if (!isPrDefined(pixrD, procName))
        return;

    dilateSepar(pixrD, pixrS, strel_1, strel_2);
    erodeSepar(pixrD, pixrD, strel_1, strel_2);
}


/*
 *  closeSeparA(): Close a pr with separable struct elems; result to a pr.
 *                     Use strel_1 first; then strel_2.
 *                 The source and destination pr can be the same.
```

```
 *              Special version for Alp, requiring spec. of intermediate pr.
 */
closeSeparA(pixrD, pixrS, pixrI, strel_1, strel_2)
Pixrect      *pixrD, *pixrS, *pixrI;
STREL        *strel_1, *strel_2;
{
static char   procName[] = "closeSeparA";

    if (!isPrDefined(pixrS, procName))
        return;
    if (!isPrDefined(pixrD, procName))
        return;
    if (!isPrDefined(pixrI, procName))
        return;

    dilateSeparA(pixrD, pixrS, pixrI, strel_1, strel_2);
    erodeSeparA(pixrD, pixrD, pixrI, strel_1, strel_2);
}


clearPw(pixw)
Pixwin       *pixw;
{
    initRectDisplay();  /* to clear out any rect around */
    pw_writebackground(pixw, 0, 0, scaledWidth[0], scaledHeight[0], PIX_CLR);
}


clearPr(pixr)
Pixrect      *pixr;
{
    pr_rop(pixr, 0, 0, pixr->pr_size.x, pixr->pr_size.y,
           PIX_CLR, NULL, 0, 0);
}


/*
 *  opPrPr():  Does one of six operations between a source pixrect and
 *                a destination pixrect, and puts the result in the
 *                destination pixrect.
 *             For set subtraction, the source (second) set is subtracted from
 *                the destination (first) set.
 *             N.B.  uses pr10 for set SUBTRACTion.
 */
opPrPr(pixrD, pixrS, op)
Pixrect      *pixrD, *pixrS;
int           op;
{
int           w, h;
static char   procName[] = "opPrPr";

    if (!isPrDefined(pixrS, procName))
        return;
    if (!isPrDefined(pixrD, procName))
        return;

    w = pixrS->pr_size.x;
    h = pixrS->pr_size.y;
    if (op == UNION)
```

```
        pr_rop(pixrD, 0, 0, w, h, OP_HU, pixrS, 0, 0);
    else if (op == INTERSECTION)
        pr_rop(pixrD, 0, 0, w, h, OP_HI, pixrS, 0, 0);
    else if (op == XOR)
        pr_rop(pixrD, 0, 0, w, h, OP_XOR, pixrS, 0, 0);
    else if (op == SUBTRACT)
    {  /* pixrD setminus pixrS */
        if (!pr10)
        {
            printf(" Error in opPrPr: pr10 not defined\n");
            return;
        }
        pr_rop(pr10, 0, 0, w, h, OP_MC, pixrS, 0, 0);
        pr_rop(pixrD, 0, 0, w, h, OP_HI, pr10, 0, 0);
    }
    else if ((op == COPY) && (pixrS != pixrD))
        pr_rop(pixrD, 0, 0, w, h, OP_HC, pixrS, 0, 0);
    else if (op == INVERT)
        pr_rop(pixrD, 0, 0, w, h, OP_MC, pixrS, 0, 0);
    else
        printf(" Warning in opPrPr: No operation performed\n");
}
/*
 *  opPrPrA():  Does one of six operations between a source pixrect and
 *                 a destination pixrect, and puts the result in the
 *                 destination pixrect.
 *              For set subtraction, the source (second) set is subtracted from
 *                 the destination (first) set.
 *              Special version for Alp, requiring specification of
 *                 of intermediate pixrect for set subtraction.
 */
opPrPrA(pixrD, pixrS, pixrI, op)
Pixrect      *pixrD, *pixrS, *pixrI;
int           op;
{
int           w, h;
static char   procName[] = "opPrPrA";

    if (!isPrDefined(pixrS, procName))
        return;
    if (!isPrDefined(pixrD, procName))
        return;
    if (!isPrDefined(pixrI, procName))
        return;

    w = pixrS->pr_size.x;
    h = pixrS->pr_size.y;
    if (op == UNION)
        pr_rop(pixrD, 0, 0, w, h, OP_HU, pixrS, 0, 0);
    else if (op == INTERSECTION)
        pr_rop(pixrD, 0, 0, w, h, OP_HI, pixrS, 0, 0);
    else if (op == XOR)
        pr_rop(pixrD, 0, 0, w, h, OP_XOR, pixrS, 0, 0);
    else if (op == SUBTRACT)
    {  /* pixrD setminus pixrS */
        pr_rop(pixrI, 0, 0, w, h, OP_MC, pixrS, 0, 0);
        pr_rop(pixrD, 0, 0, w, h, OP_HI, pixrI, 0, 0);
    }
```

```
    else if ((op == COPY) && (pixrS != pixrD))
        pr_rop(pixrD, 0, 0, w, h, OP_HC, pixrS, 0, 0);
    else if (op == INVERT)
        pr_rop(pixrD, 0, 0, w, h, OP_MC, pixrS, 0, 0);
    else
        printf(" Warning in opPrPrA: no operation performed\n");
}


/*
 *  opPrPw():   N.B.  uses pr10 for set SUBTRACTion.
 */
opPrPw(pixwD, pixrS, op)
Pixwin        *pixwD;
Pixrect       *pixrS;
int            op;
{
int            w, h;
static char    procName[] = "opPrPw";

    if (!isPrDefined(pixrS, procName))
        return;

    w = pixrS->pr_size.x;
    h = pixrS->pr_size.y;
    if (isPrTemp(pixrS) == FALSE)
    {  /* only save if not temporary pixrect!! */
        displayedPrNum = getPrNum(pixrS);
        displayedPr = pixrS;
    }
    if (op == UNION)
        pw_rop(pixwD, 0, 0, w, h, OP_HU, pixrS, 0, 0);
    else if (op == INTERSECTION)
        pw_rop(pixwD, 0, 0, w, h, OP_HI, pixrS, 0, 0);
    else if (op == XOR)
        pw_rop(pixwD, 0, 0, w, h, OP_XOR, pixrS, 0, 0);
    else if (op == SUBTRACT)
    {  /* pixwD setminus pixrS */
        if (!pr10)
        {
            printf(" Error in opPrPw: pr10 not defined\n");
            return;
        }
        pr_rop(pr10, 0, 0, w, h, OP_MC, pixrS, 0, 0);
        pw_rop(pixwD, 0, 0, w, h, OP_HI, pr10, 0, 0);
    }
    else if (op == COPY)
        pw_rop(pixwD, 0, 0, w, h, OP_HC, pixrS, 0, 0);
    else if (op == INVERT)
        pw_rop(pixwD, 0, 0, w, h, OP_MC, pixrS, 0, 0);
    else
        printf(" Warning in opPrPw:  no operation performed\n");
}


/*
 *  opPrPwA():   Special version for Alp, requiring specification of
 *                of intermediate pixrect for set subtraction.
 */
```

```
opPrPwA(pixwD, pixrS, pixrI, op)
Pixwin        *pixwD;
Pixrect       *pixrS, *pixrI;
int            op;
{
int            w, h;
static char    procName[] = "opPrPwA";

    if (!isPrDefined(pixrS, procName))
        return;
    if (!isPrDefined(pixrI, procName))
        return;

    w = pixrS->pr_size.x;
    h = pixrS->pr_size.y;
    if (isPrTemp(pixrS) == FALSE)
    {  /* only save if not temporary pixrect!! */
        displayedPrNum = getPrNum(pixrS);
        displayedPr = pixrS;
    }
    if (op == UNION)
        pw_rop(pixwD, 0, 0, w, h, OP_HU, pixrS, 0, 0);
    else if (op == INTERSECTION)
        pw_rop(pixwD, 0, 0, w, h, OP_HI, pixrS, 0, 0);
    else if (op == XOR)
        pw_rop(pixwD, 0, 0, w, h, OP_XOR, pixrS, 0, 0);
    else if (op == SUBTRACT)
    {  /* pixwD setminus pixrS */
        pr_rop(pixrI, 0, 0, w, h, OP_MC, pixrS, 0, 0);
        pw_rop(pixwD, 0, 0, w, h, OP_HI, pixrI, 0, 0);
    }
    else if (op == COPY)
        pw_rop(pixwD, 0, 0, w, h, OP_HC, pixrS, 0, 0);
    else if (op == INVERT)
        pw_rop(pixwD, 0, 0, w, h, OP_MC, pixrS, 0, 0);
    else
        printf(" Warning in opPrPwA: no operation performed\n");
}


/*
 *  opPwPr():  N.B. uses pr10 for set SUBTRACTion
 */
opPwPr(pixrD, pixwS, op)
Pixrect       *pixrD;
Pixwin        *pixwS;
int            op;
{
int            w, h;
static char    procName[] = "opPwPr";

    if (!isPrDefined(pixrD, procName))
        return;

    w = pixrD->pr_size.x;
    h = pixrD->pr_size.y;
    if (op == UNION)
        pw_read(pixrD, 0, 0, w, h, OP_HU, pixwS, 0, 0);
```

```
    else if (op == INTERSECTION)
        pw_read(pixrD, 0, 0, w, h, OP_HI, pixwS, 0, 0);
    else if (op == XOR)
        pw_read(pixrD, 0, 0, w, h, OP_XOR, pixwS, 0, 0);
    else if (op == SUBTRACT)
    {  /* pixrD setminus pixwS */
        if (!pr10)
        {
            printf(" Error in opPwPr: pr10 not defined\n");
            return;
        }
        pw_read(pr10, 0, 0, w, h, OP_MC, pixwS, 0, 0);
        pr_rop(pixrD, 0, 0, w, h, OP_HI, pr10, 0, 0);
    }
    else if (op == COPY)
        pw_read(pixrD, 0, 0, w, h, OP_HC, pixwS, 0, 0);
    else if (op == INVERT)
        pw_read(pixrD, 0, 0, w, h, OP_MC, pixwS, 0, 0);
    else
        printf(" Error in opPwPr:  unknown op\n");
}


/*
 *  opPwPrA():   Special version for Alp, requiring specification of
 *                of intermediate pixrect for set subtraction.
 */
opPwPrA(pixrD, pixwS, pixrI, op)
Pixrect       *pixrD, *pixrI;
Pixwin        *pixwS;
int            op;
{
int            w, h;
static char    procName[] = "opPwPr";

    if (!isPrDefined(pixrD, procName))
        return;
    if (!isPrDefined(pixrI, procName))
        return;

    w = pixrD->pr_size.x;
    h = pixrD->pr_size.y;
    if (op == UNION)
        pw_read(pixrD, 0, 0, w, h, OP_HU, pixwS, 0, 0);
    else if (op == INTERSECTION)
        pw_read(pixrD, 0, 0, w, h, OP_HI, pixwS, 0, 0);
    else if (op == XOR)
        pw_read(pixrD, 0, 0, w, h, OP_XOR, pixwS, 0, 0);
    else if (op == SUBTRACT)
    {  /* pixrD setminus pixwS */
        pw_read(pixrI, 0, 0, w, h, OP_MC, pixwS, 0, 0);
        pr_rop(pixrD, 0, 0, w, h, OP_HI, pixrI, 0, 0);
    }
    else if (op == COPY)
        pw_read(pixrD, 0, 0, w, h, OP_HC, pixwS, 0, 0);
    else if (op == INVERT)
        pw_read(pixrD, 0, 0, w, h, OP_MC, pixwS, 0, 0);
    else
```

```
        printf(" Error in opPwPrA:  unknown op\n");
}

/*
 *  bltOp():  performs appropriate blt between pixrects.
 */
bltOp(pixrD, pixrS, value, i, j, type)
Pixrect         *pixrS, *pixrD;
int              value, i, j, type;
{
int              w, h;
static char      procName[] = "bltOp";

    if (!isPrDefined(pixrS, procName))
        return;
    if (!isPrDefined(pixrD, procName))
        return;

    w = pixrS->pr_size.x;
    h = pixrS->pr_size.y;
    if (value == HIT)
    {
        if (type == UNION)
            pr_rop(pixrD, i, j, w, h, OP_HU, pixrS, 0, 0);
        else if (type == INTERSECTION)
            pr_rop(pixrD, i, j, w, h, OP_HI, pixrS, 0, 0);
        else if (type == COPY)
            pr_rop(pixrD, i, j, w, h, OP_HC, pixrS, 0, 0);
        else
        {
            printf(" Error in bltOp: unknown operation type\n");
            return;
        }
    }
    else if (value == MISS)
    {
        if (type == UNION)
            pr_rop(pixrD, i, j, w, h, OP_MU, pixrS, 0, 0);
        else if (type == INTERSECTION)
            pr_rop(pixrD, i, j, w, h, OP_MI, pixrS, 0, 0);
        else if (type == COPY)
            pr_rop(pixrD, i, j, w, h, OP_MC, pixrS, 0, 0);
        else
        {
            printf(" Error in bltOp: unknown operation type\n");
            return;
        }
    }
    else
    {
        printf(" Error in bltOp: unknown operation value\n");
        return;
    }
}

/*
```

```
 *  logOp():  performs appropriate logical operation between pixrects.
 */
logOp(pixrD, pixrS1, pixrS2, op)
Pixrect          *pixrD, *pixrS1, *pixrS2;
int              op;
{
int              w, h;
static char      procName[] = "logOp";

    if (!isPrDefined(pixrS1, procName))
        return;
    if (!isPrDefined(pixrS2, procName))
        return;
    if (!isPrDefined(pixrD, procName))
        return;

    w = pixrS1->pr_size.x;
    h = pixrS1->pr_size.y;
    if (op == UNION)
    {  /* 'OR' the bitmaps */
        pr_rop(pixrD, 0, 0, w, h, PIX_SRC, pixrS1, 0, 0);
        pr_rop(pixrD, 0, 0, w, h, OP_HU, pixrS2, 0, 0);
    }
    else if (op == INTERSECTION)
    {  /* 'AND' the bitmaps */
        pr_rop(pixrD, 0, 0, w, h, PIX_SRC, pixrS1, 0, 0);
        pr_rop(pixrD, 0, 0, w, h, OP_HI, pixrS2, 0, 0);
    }
    else if (op == XOR)
    {  /* 'XOR' the bitmaps */
        pr_rop(pixrD, 0, 0, w, h, PIX_SRC, pixrS1, 0, 0);
        pr_rop(pixrD, 0, 0, w, h, OP_XOR, pixrS2, 0, 0);
    }
    else
    {
        printf(" Error in logOp:  unknown type of operation\n");
        return;
    }
}


/*
 *  edge():    Returns the boundary (edge) pixels.
 *             Type specifies whether the off-pixels or the on-pixels
 *                at the boundary are displayed.
 *             Uses pr7 explicitly.
 */
edge(pixrD, pixrS, strel, type)
Pixrect       *pixrD, *pixrS;
STREL         *strel;
int            type;
{
Pixrect       *prtemp;
static char    procName[] = "edge";

    if (!isPrDefined(pixrS, procName))
        return;
    if (!isPrDefined(pixrD, procName))
        return;
```

```
        /* use 'dilate' to get boundary pixels constituting
         *   the off-pixels at the background;
         * use 'erode' to get boundary pixels within
         *   the on-pixels at the boundary */
    if (!pr7)
    {
#if WARNING
        printf(" Warning in edge: Creating a temporary pixrect!\n");
#endif WARNING
        prtemp = mem_create(pixrS->pr_size.x, pixrS->pr_size.y, 1);
        if (type == OFF_PIXELS)
            dilate(prtemp, pixrS, strel);
        else if (type == ON_PIXELS)
            erode(prtemp, pixrS, strel);
        else
        {
            printf(" Error in edge: unknown type of edge pixels!\n");
            pr_close(prtemp);
            return;
        }
        pr_close(prtemp);
    }
    else
    {
        if (type == OFF_PIXELS)
            dilate(pr7, pixrS, strel);
        else if (type == ON_PIXELS)
            erode(pr7, pixrS, strel);
        else
        {
            printf(" Error in edge: unknown type of edge pixels!\n");
            return;
        }
    }

        /* XOR with source */
    logOp(pixrD, pixrS, pr7, XOR);
}


/*
 *  edgeA():    Returns the boundary (edge) pixels.
 *             Type specifies whether the off-pixels or the on-pixels
 *                at the boundary are displayed.
 *             Special version for Alp, that requires specification of
 *                intermediate pixrect.
 */
edgeA(pixrD, pixrS, pixrI, strel, type)
Pixrect       *pixrD, *pixrS, *pixrI;
STREL         *strel;
int            type;
{
static char   procName[] = "edgeA";

    if (!isPrDefined(pixrS, procName))
        return;
    if (!isPrDefined(pixrD, procName))
        return;
```

```
    if (!isPrDefined(pixrI, procName))
        return;

        /* use 'dilate' to get boundary pixels constituting
         *   the off-pixels at the background;
         * use 'erode' to get boundary pixels within
         *   the on-pixels at the boundary */
    if (type == OFF_PIXELS)
        dilate(pixrI, pixrS, strel);
    else if (type == ON_PIXELS)
        erode(pixrI, pixrS, strel);
    else
    {
        printf(" Error in edgeA: unknown type of edge pixels!\n");
        return;
    }

        /* XOR with source */
    logOp(pixrD, pixrS, pixrI, XOR);
}


/*
 *  line():  Returns either the horizontal or vertical lines
 *                 of given min. length
 *           Robust version, without subsampling of line.
 *           N.B.:  openPr uses pr9.
 */
line(pixrD, pixrS, orient, length)
Pixrect      *pixrD, *pixrS;
int           orient, length;
{
STREL        *strel;
static char   procName[] = "line";

    if (!isPrDefined(pixrS, procName))
        return;
    if (!isPrDefined(pixrD, procName))
        return;

    if (orient == HORIZ)
    {
        if (length <= 10) strel = strel10h;
        else if (length <= 15) strel = strel15h;
        else if (length <= 20) strel = strel20h;
        else if (length <= 25) strel = strel25h;
        else if (length <= 30) strel = strel30h;
        else if (length <= 35) strel = strel35h;
        else if (length <= 40) strel = strel40h;
        else if (length <= 45) strel = strel45h;
        else if (length <= 50) strel = strel50h;
        else
        {
            printf(" Error in line: length too long!\n");
            return;
        }
    }
    else if (orient == VERT)
```

```
    {
        if (length <= 10) strel = strel10v;
        else if (length <= 15) strel = strel15v;
        else if (length <= 20) strel = strel20v;
        else if (length <= 25) strel = strel25v;
        else if (length <= 30) strel = strel30v;
        else if (length <= 35) strel = strel35v;
        else if (length <= 40) strel = strel40v;
        else if (length <= 45) strel = strel45v;
        else if (length <= 50) strel = strel50v;
        else
        {
            printf(" Error in line: length too long!\n");
            return;
        }
    }
    else
    {
        printf(" Error in line: unknown orientation!\n");
        return;
    }

    openPr(pixrD, pixrS, strel);
}


/*
 *  lineA():  Returns either the horizontal or vertical lines
 *                of given min. length
 *            Robust version, without subsampling of line.
 *            Special version for Alp, that requires specification of
 *                intermediate pixrect for openPrA.
 */
lineA(pixrD, pixrS, pixrI, orient, length)
Pixrect      *pixrD, *pixrS, *pixrI;
int           orient, length;
{
STREL        *strel;
static char   procName[] = "lineA";

    if (!isPrDefined(pixrS, procName))
        return;
    if (!isPrDefined(pixrD, procName))
        return;
    if (!isPrDefined(pixrI, procName))
        return;

    if (orient == HORIZ)
    {
        if (length <= 10) strel = strel10h;
        else if (length <= 15) strel = strel15h;
        else if (length <= 20) strel = strel20h;
        else if (length <= 25) strel = strel25h;
        else if (length <= 30) strel = strel30h;
        else if (length <= 35) strel = strel35h;
        else if (length <= 40) strel = strel40h;
        else if (length <= 45) strel = strel45h;
        else if (length <= 50) strel = strel50h;
```

```
        else
        {
            printf(" Error in lineA: length too long!\n");
            return;
        }
    }
    else if (orient == VERT)
    {
        if (length <= 10) strel = strel10v;
        else if (length <= 15) strel = strel15v;
        else if (length <= 20) strel = strel20v;
        else if (length <= 25) strel = strel25v;
        else if (length <= 30) strel = strel30v;
        else if (length <= 35) strel = strel35v;
        else if (length <= 40) strel = strel40v;
        else if (length <= 45) strel = strel45v;
        else if (length <= 50) strel = strel50v;
        else
        {
            printf(" Error in lineA: length too long!\n");
            return;
        }
    }
    else
    {
        printf(" Error in lineA: unknown orientation!\n");
        return;
    }

    openPrA(pixrD, pixrS, pixrI, strel);
}


/*
 *  lineF():  Returns either the horizontal or vertical lines
 *                 of given min. length
 *            Fast version, with subsampling of line.
 *            N.B.:  openPr uses pr9.
 */
lineF(pixrD, pixrS, orient, length)
Pixrect       *pixrD, *pixrS;
int            orient, length;
{
STREL         *strel;
static char    procName[] = "lineF";

    if (!isPrDefined(pixrS, procName))
        return;
    if (!isPrDefined(pixrD, procName))
        return;

    if (orient == HORIZ)
    {
        if (length <= 10) strel = strelF10h;
        else if (length <= 15) strel = strelF15h;
        else if (length <= 20) strel = strelF20h;
        else if (length <= 25) strel = strelF25h;
        else if (length <= 30) strel = strelF30h;
```

```
        else if (length <= 35) strel = strelF35h;
        else if (length <= 40) strel = strelF40h;
        else if (length <= 45) strel = strelF45h;
        else if (length <= 50) strel = strelF50h;
        else
        {
            printf(" Error in lineF: length too long!\n");
            return;
        }
    }
    else if (orient == VERT)
    {
        if (length <= 10) strel = strelF10v;
        else if (length <= 15) strel = strelF15v;
        else if (length <= 20) strel = strelF20v;
        else if (length <= 25) strel = strelF25v;
        else if (length <= 30) strel = strelF30v;
        else if (length <= 35) strel = strelF35v;
        else if (length <= 40) strel = strelF40v;
        else if (length <= 45) strel = strelF45v;
        else if (length <= 50) strel = strelF50v;
        else
        {
            printf(" Error in lineF: length too long!\n");
            return;
        }
    }
    else
    {
        printf(" Error in lineF: unknown orientation!\n");
        return;
    }

    openPr(pixrD, pixrS, strel);
}


/*
 *  lineFA():  Returns either the horizontal or vertical lines
 *                  of given min. length
 *             Fast version, with subsampling of line.
 *             Special version for Alp, that requires specification of
 *                 intermediate pixrect for openPrA.
 */
lineFA(pixrD, pixrS, pixrI, orient, length)
Pixrect      *pixrD, *pixrS, *pixrI;
int           orient, length;
{
STREL        *strel;
static char   procName[] = "lineFA";

    if (!isPrDefined(pixrS, procName))
        return;
    if (!isPrDefined(pixrD, procName))
        return;
    if (!isPrDefined(pixrI, procName))
        return;

    if (orient == HORIZ)
```

```
    {
        if (length <= 10) strel = strelF10h;
        else if (length <= 15) strel = strelF15h;
        else if (length <= 20) strel = strelF20h;
        else if (length <= 25) strel = strelF25h;
        else if (length <= 30) strel = strelF30h;
        else if (length <= 35) strel = strelF35h;
        else if (length <= 40) strel = strelF40h;
        else if (length <= 45) strel = strelF45h;
        else if (length <= 50) strel = strelF50h;
        else
        {
            printf(" Error in lineFA: length too long!\n");
            return;
        }
    }
    else if (orient == VERT)
    {
        if (length <= 10) strel = strelF10v;
        else if (length <= 15) strel = strelF15v;
        else if (length <= 20) strel = strelF20v;
        else if (length <= 25) strel = strelF25v;
        else if (length <= 30) strel = strelF30v;
        else if (length <= 35) strel = strelF35v;
        else if (length <= 40) strel = strelF40v;
        else if (length <= 45) strel = strelF45v;
        else if (length <= 50) strel = strelF50v;
        else
        {
            printf(" Error in lineFA: length too long!\n");
            return;
        }
    }
    else
    {
        printf(" Error in lineFA: unknown orientation!\n");
        return;
    }

    openPrA(pixrD, pixrS, pixrI, strel);
}


/*
 *  fill8():   Fast fill with 8-adjacency into a pixrect.
 *     N.B.:   Uses pr7 and pr8, or creates temp pixrects
 *                  if they don't exist.
 *             Uses dilateAdd.
 *             termFlag determines whether the routine terminates
 *                upon completion.  The parameter iter gives the
 *                maximum number of iterations permitted.
 */
fill8(pixrD, pixrS, termFlag, iter)
Pixrect      *pixrD, *pixrS;
int           termFlag, iter;
{
int           i;
Pixrect      *prtemp1, *prtemp2;
```

```
static char   procName[] = "fill8";

    if (!isPrDefined(pixrS, procName))
        return;
    if (!isPrDefined(pixrD, procName))
        return;

    if (!pr7 || !pr8)
    {
#if WARNING
        printf(" Warning in fill8: Creating two temporary pixrects.\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        opPrPr(pixrD, pixrS, COPY);
        opPrPr(prtemp2, pixrS, COPY);        /* for comparison after
                                                 first iteration  */
        for (i = 0; i < iter; i++)
        {
            erode(prtemp1, pixrD, strel2dp);
            dilateAdd(pixrD, prtemp1, strel2dm);
            erode(prtemp1, pixrD, strel2dm);
            dilateAdd(pixrD, prtemp1, strel2dp);
            if (termFlag == TO_COMPLETION)
            {
                if (equalPrD(pixrD, prtemp2))
                    break;
                opPrPr(prtemp2, pixrD, COPY);     /* for comparison after
                                                     next iteration */
            }
        }
        pr_close(prtemp1);
        pr_close(prtemp2);
    }
    else
    {
        opPrPr(pixrD, pixrS, COPY);
        opPrPr(pr8, pixrS, COPY);  /* for comparison after first iteration;
                                    * only useful if termFlag == TO_COMPLETION */
        for (i = 0; i < iter; i++)
        {
            erode(pr7, pixrD, strel2dp);
            dilateAdd(pixrD, pr7, strel2dm);
            erode(pr7, pixrD, strel2dm);
            dilateAdd(pixrD, pr7, strel2dp);
            if (termFlag == TO_COMPLETION)
            {
                if (equalPrD(pixrD, pr8))
                    break;
                opPrPr(pr8, pixrD, COPY);      /* for comparison after
                                                  next iteration */
            }
        }
    }
}


/*
```

```
 *  fill8A():   Fast fill with 8-adjacency into a pixrect.
 *             Version that requires specification of 2 pixrects for
 *                intermediate computation.
 *             Uses dilateAdd.
 *             termFlag determines whether the routine terminates
 *                upon completion.  The parameter iter gives the
 *                maximum number of iterations permitted.
 */
fill8A(pixrD, pixrS, pixrI1, pixrI2, termFlag, iter)
Pixrect       *pixrD, *pixrS, *pixrI1, *pixrI2;
int            termFlag, iter;
{
int            i;
static char    procName[] = "fill8A";

    if (!isPrDefined(pixrS, procName))
        return;
    if (!isPrDefined(pixrD, procName))
        return;
    if (!isPrDefined(pixrI1, procName))
        return;
    if (!isPrDefined(pixrI2, procName))
        return;

    opPrPr(pixrD, pixrS, COPY);
    opPrPr(pixrI2, pixrS, COPY);  /* for comparison after first iteration;
                                   * only useful if termFlag == TO_COMPLETION */
    for (i = 0; i < iter; i++)
    {
        erode(pixrI1, pixrD, strel2dp);
        dilateAdd(pixrD, pixrI1, strel2dm);
        erode(pixrI1, pixrD, strel2dm);
        dilateAdd(pixrD, pixrI1, strel2dp);
        if (termFlag == TO_COMPLETION)
        {
            if (equalPrD(pixrD, pixrI2))
                break;
            opPrPr(pixrI2, pixrD, COPY);  /* for comparison after next iteration */
        }
    }
}


/*
 *  fill4():   Fast fill with 4-adjacency into a pixrect.
 *     N.B.:   Uses pr7 and pr8.
 *             Uses dilateAdd.
 *             termFlag determines whether the routine terminates
 *                upon completion.  The parameter iter gives the
 *                maximum number of iterations permitted.
 */
fill4(pixrD, pixrS, termFlag, iter)
Pixrect       *pixrD, *pixrS;
int            termFlag, iter;
{
int            i;
Pixrect       *prtemp1, *prtemp2;
static char    procName[] = "fill4";
```

```c
    if (!isPrDefined(pixrS, procName))
        return;
    if (!isPrDefined(pixrD, procName))
        return;

    if (!pr7 || !pr8)
    {
#if WARNING
        printf(" Warning in fill4: Creating two temporary pixrects.\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        opPrPr(pixrD, pixrS, COPY);
        opPrPr(prtemp2, pixrS, COPY);        /* for comparison after
                                                first iteration; */
        for (i = 0; i < iter; i++)
        {
            erode(prtemp1, pixrD, strel2ule);
            dilateAdd(pixrD, prtemp1, strel2uld);
            erode(prtemp1, pixrD, strel2ure);
            dilateAdd(pixrD, prtemp1, strel2urd);
            erode(prtemp1, pixrD, strel2lle);
            dilateAdd(pixrD, prtemp1, strel2lld);
            erode(prtemp1, pixrD, strel2lre);
            dilateAdd(pixrD, prtemp1, strel2lrd);
            if (termFlag == TO_COMPLETION)
            {
                if (equalPr(pixrD, prtemp2))
                    break;
                opPrPr(prtemp2, pixrD, COPY);     /* for comparison after
                                                    next iteration */
            }
        }
        pr_close(prtemp1);
        pr_close(prtemp2);
    }
    else
    {
        opPrPr(pixrD, pixrS, COPY);
        opPrPr(pr8, pixrS, COPY);        /* for comparison after
                                            first iteration; */
                            /* only useful if termFlag == TO_COMPLETION */
        for (i = 0; i < iter; i++)
        {
            erode(pr7, pixrD, strel2ule);
            dilateAdd(pixrD, pr7, strel2uld);
            erode(pr7, pixrD, strel2ure);
            dilateAdd(pixrD, pr7, strel2urd);
            erode(pr7, pixrD, strel2lle);
            dilateAdd(pixrD, pr7, strel2lld);
            erode(pr7, pixrD, strel2lre);
            dilateAdd(pixrD, pr7, strel2lrd);
            if (termFlag == TO_COMPLETION)
            {
                if (equalPr(pixrD, pr8))
                    break;
                opPrPr(pr8, pixrD, COPY);        /* for comparison after
                                                    next iteration */
```

```
            }
        }
    }
}


/*
 *  fill4A():   Fast fill with 4-adjacency into a pixrect.
 *              Version that requires specification of 2 pixrects for
 *                 intermediate computation.
 *              Uses dilateAdd.
 *              termFlag determines whether the routine terminates
 *                 upon completion.  The parameter iter gives the
 *                 maximum number of iterations permitted.
 */
fill4A(pixrD, pixrS, pixrI1, pixrI2, termFlag, iter)
Pixrect      *pixrD, *pixrS, *pixrI1, *pixrI2;
int           termFlag, iter;
{
int           i;
static char   procName[] = "fill4";

    if (!isPrDefined(pixrS, procName))
        return;
    if (!isPrDefined(pixrD, procName))
        return;
    if (!isPrDefined(pixrI1, procName))
        return;
    if (!isPrDefined(pixrI2, procName))
        return;

    opPrPr(pixrD, pixrS, COPY);
    opPrPr(pixrI2, pixrS, COPY);  /* for comparison after first iteration;
                                   * only useful if termFlag == TO_COMPLETION */
    for (i = 0; i < iter; i++)
    {
        erode(pixrI1, pixrD, strel2ule);
        dilateAdd(pixrD, pixrI1, strel2uld);
        erode(pixrI1, pixrD, strel2ure);
        dilateAdd(pixrD, pixrI1, strel2urd);
        erode(pixrI1, pixrD, strel2lle);
        dilateAdd(pixrD, pixrI1, strel2lld);
        erode(pixrI1, pixrD, strel2lre);
        dilateAdd(pixrD, pixrI1, strel2lrd);
        if (termFlag == TO_COMPLETION)
        {
            if (equalPr(pixrD, pixrI2))
                break;
            opPrPr(pixrI2, pixrD, COPY);  /* for comparison after next iteration */
        }
    }
}


/*
 *  fillClip():  Fills pixrD on the pixrS seed, using strel3, and
 *                  clipping to pixrC on each iteration.
 *               pixrD holds the results after each iteration;
 *               pr7 and pr8 are used as temporary storage;
```

```
 *                  pr8 holds the previous results;
 */
fillClip(pixrD, pixrS, pixrC, termFlag, iter)
Pixrect      *pixrD, *pixrS, *pixrC;
int           termFlag, iter;
{
Pixrect      *mem_create(), *prtemp1, *prtemp2;
int           i;
static char   procName[] = "fillClip";

    if (!isPrDefined(pixrS, procName))
        return;
    if (!isPrDefined(pixrC, procName))
        return;
    if (!isPrDefined(pixrD, procName))
        return;

    if (!pr7 && (termFlag == TO_COMPLETION))  /* need 2 temp pixrects */
    {
#if WARNING
        printf(" Warning in fillClip: Creating two temporary pixrects!\n");
#endif WARNING
        prtemp1 = mem_create(pixrS->pr_size.x, pixrS->pr_size.y, 1);
        prtemp2 = mem_create(pixrS->pr_size.x, pixrS->pr_size.y, 1);
        opPrPr(pixrD, pixrS, COPY);
        opPrPr(prtemp2, pixrS, COPY);     /* for comparison after
                                             first iteration;  */
        for (i = 0; i < iter; i++)
        {
            dilate(prtemp1, pixrD, strel3);  /* dilate */
            logOp(pixrD, prtemp1, pixrC, INTERSECTION);  /* clip */
            if (termFlag == TO_COMPLETION)
            {
                if (equalPr(pixrD, prtemp2))
                    break;
                opPrPr(prtemp2, pixrD, COPY);  /* for comparison after
                                                   next iteration */
            }
        }
        pr_close(prtemp1);
        pr_close(prtemp2);
    }
    else if (!pr7 && (termFlag == FIXED_ITERATIONS))  /* need only 1 temp pr */
    {
#if WARNING
        printf(" Warning in fillClip: Creating a temporary pixrect!\n");
#endif WARNING
        prtemp1 = mem_create(pixrS->pr_size.x, pixrS->pr_size.y, 1);
        opPrPr(pixrD, pixrS, COPY);
        for (i = 0; i < iter; i++)
        {
            dilate(prtemp1, pixrD, strel3);  /* dilate */
            logOp(pixrD, prtemp1, pixrC, INTERSECTION);  /* clip */
        }
        pr_close(prtemp1);
    }
    else if (pr7 && !pr8 && (termFlag == TO_COMPLETION))
    {  /* need only 1 temp pixrect */
```

```
#if WARNING
        printf(" Warning in fillClip: Creating a temporary pixrect!\n");
#endif WARNING
        prtempl = mem_create(pixrS->pr_size.x, pixrS->pr_size.y, 1);
        opPrPr(pixrD, pixrS, COPY);
        opPrPr(prtempl, pixrS, COPY);     /* for comparison after
                                              first iteration;  */
        for (i = 0; i < iter; i++)
        {
            dilate(pr7, pixrD, strel3);  /* dilate */
            logOp(pixrD, pr7, pixrC, INTERSECTION);  /* clip */
            if (termFlag == TO_COMPLETION)
            {
                if (equalPr(pixrD, prtempl))
                    break;
                opPrPr(prtempl, pixrD, COPY);  /* for comparison after
                                                   next iteration */
            }
        }
        pr_close(prtempl);
    }
    else     /* don't need any temporary pixrects */
    {
        opPrPr(pixrD, pixrS, COPY);
        opPrPr(pr8, pixrS, COPY);    /* for comparison after
                                         first iteration;  */
        for (i = 0; i < iter; i++)
        {
            dilate(pr7, pixrD, strel3);  /* dilate */
            logOp(pixrD, pr7, pixrC, INTERSECTION);  /* clip */
            if (termFlag == TO_COMPLETION)
            {
                if (equalPr(pixrD, pr8))
                    break;
                opPrPr(pr8, pixrD, COPY);  /* for comparison after
                                               next iteration */
            }
        }
    }
}


/*
 *  corner():  extracts designated bounding box corners.
 *             N.B.  Uses pr7; creates a temporary pr if necessary.
 */
corner(pixrD, pixrS, topLeft, topRight, bottomLeft, bottomRight)
Pixrect       *pixrD, *pixrS;
int            topLeft, topRight, bottomLeft, bottomRight;
{
Pixrect       *prtemp;
static char    procName[] = "corner";

    if (!isPrDefined(pixrS, procName))
        return;
    if (!isPrDefined(pixrD, procName))
        return;
```

```
    clearPr(pixrD);

    if (!pr7)
    {
#if WARNING
        printf(" Warning in corner: Creating a temporary pixrect!\n");
#endif WARNING
        prtemp = mem_create(pixrS->pr_size.x, pixrS->pr_size.y, 1);
        if (topLeft)
        {
            erode(prtemp, pixrS, strel2tl);
            opPrPr(pixrD, prtemp, UNION);
        }
        if (topRight)
        {
            erode(prtemp, pixrS, strel2tr);
            opPrPr(pixrD, prtemp, UNION);
        }
        if (bottomLeft)
        {
            erode(prtemp, pixrS, strel2bl);
            opPrPr(pixrD, prtemp, UNION);
        }
        if (bottomRight)
        {
            erode(prtemp, pixrS, strel2br);
            opPrPr(pixrD, prtemp, UNION);
        }
        pr_close(prtemp);
    }
    else
    {
        if (topLeft)
        {
            erode(pr7, pixrS, strel2tl);
            opPrPr(pixrD, pr7, UNION);
        }
        if (topRight)
        {
            erode(pr7, pixrS, strel2tr);
            opPrPr(pixrD, pr7, UNION);
        }
        if (bottomLeft)
        {
            erode(pr7, pixrS, strel2bl);
            opPrPr(pixrD, pr7, UNION);
        }
        if (bottomRight)
        {
            erode(pr7, pixrS, strel2br);
            opPrPr(pixrD, pr7, UNION);
        }
    }
}


/*
 *  cornerA():  extracts designated bounding box corners.
```

```
*		This version requires specification of a pixrect for
*			internal computation.
*/
cornerA(pixrD, pixrS, pixrI, topLeft, topRight, bottomLeft, bottomRight)
Pixrect      *pixrD, *pixrS, *pixrI;
int           topLeft, topRight, bottomLeft, bottomRight;
{
static char   procName[] = "corner";

    if (!isPrDefined(pixrS, procName))
        return;
    if (!isPrDefined(pixrD, procName))
        return;
    if (!isPrDefined(pixrI, procName))
        return;

    clearPr(pixrD);

    if (topLeft)
    {
        erode(pixrI, pixrS, strel2tl);
        opPrPr(pixrD, pixrI, UNION);
    }
    if (topRight)
    {
        erode(pixrI, pixrS, strel2tr);
        opPrPr(pixrD, pixrI, UNION);
    }
    if (bottomLeft)
    {
        erode(pixrI, pixrS, strel2bl);
        opPrPr(pixrD, pixrI, UNION);
    }
    if (bottomRight)
    {
        erode(pixrI, pixrS, strel2br);
        opPrPr(pixrD, pixrI, UNION);
    }
}

/***********************************************************************
* Copyright (c) 1988, Xerox Corporation.  All rights reserved.         *
* Copyright protection claimed includes all forms and matters          *
* of copyrightable material and information now allowed by             *
* statutory or judicial law or hereafter granted, including            *
* without limitation, material generated from the software             *
* programs which are displayed on the screen such as icons,            *
* screen display looks, etc.                                           *
***********************************************************************/

/*
*   strel1.c--includes subroutines
*               strel1Inits()
*                   --strel2h, strel2hR, strel2v, strel3h, strel3v,
*                   --strel4h, strel4v, strel5h, strel5v,
*                   --strel6h, strel6v, strel7h, strel7v,
*                   --strel8h, strel8v, strel9h, strel9v,
*                   --strel10h, strel10v, strel11h, strel11v;
*                   --strel13h, strel13v, strel15h, strel15v;
```

```
 *                      --strel20h, strel20v, strel25h, strel25v;
 *                      --strel30h, strel30v, strel35h, strel35v;
 *                      --strel40h, strel40v, strel45h, strel45v;
 *                      --strel50h, strel50v;
 *                          ...some diagonal strels...
 *                      --strel3dp, strel3dn, strel4dp, strel4dn;
 *                      --strel5dp, strel5dn, strel6dp, strel6dn;
 *                      --strel7dp, strel7dn, strel9dp, strel9dn;
 *                      --strel11dp, strel11dn, strel13dp, strel13dn;
 *                      --strel15dp, strel15dn;
 *                      --strel5hdp, strel5hdn, strel5vdp, strel5vdn;
 *                      --strel9hdp, strel9hdn, strel9vdp, strel9vdn;
 *                      --strel13hdp, strel13hdn, strel13vdp, strel13vdn;
 *                          ...use for solid block matches...
 *                      --strel1, strel2, strel3, strel4, strel5;
 *                      --strel2dp, strel2dm;
 *                      --strel2tl, strel2tr, strel2bl, strel2br;
 *                      --strel3ve, strel4ve, strel2vd;
 *                      --strel3ht1, strel3ht2;
 *                      --strel3h1, strel3h2, strel3v1, strel3v2;
 *                      --strel4h1, strel4h2, strel4v1, strel4v2;
 *                      --strel5h1, strel5h2, strel5v1, strel5v2;
 *                  matrix()
 */

#include <stdio.h>
#include <llama.h>
#include "morph.h"
#include "strelGlobals.h"

strel1Inits()
{
int         i, j;
short int  **matrix();

        /* horizontal strel of length 2: (1c 1) */
    strel2h = (STREL *) calloc (1, sizeof (STREL));
    strel2h->nx = 2;
    strel2h->ny = 1;
    strel2h->cx = strel2h->cy = 0;
    strel2h->data = matrix(strel2h->nx, strel2h->ny);
    strel2h->data[0][0] = 1;
    strel2h->data[0][1] = 1;

        /* horizontal strel of length 2: (1 1c) */
    strel2hR = (STREL *) calloc (1, sizeof (STREL));
    strel2hR->nx = 2;
    strel2hR->ny = 1;
    strel2hR->cx = 1;
    strel2hR->cy = 0;
    strel2hR->data = matrix(strel2hR->nx, strel2hR->ny);
    strel2hR->data[0][0] = 1;
    strel2hR->data[0][1] = 1;

        /* vertical strel of length 2: v(1c 1) */
    strel2v = (STREL *) calloc (1, sizeof (STREL));
    strel2v->nx = 1;
    strel2v->ny = 2;
    strel2v->cx = strel2v->cy = 0;
```

```
strel2v->data = matrix(strel2v->nx, strel2v->ny);
strel2v->data[0][0] = 1;
strel2v->data[1][0] = 1;

    /* vertical strel of length 2: v(1 1c) */
strel2vB = (STREL *) calloc (1, sizeof (STREL));
strel2vB->nx = 1;
strel2vB->ny = 2;
strel2vB->cx = 0;
strel2vB->cy = 1;
strel2vB->data = matrix(strel2vB->nx, strel2vB->ny);
strel2vB->data[0][0] = 1;
strel2vB->data[1][0] = 1;

    /* horizontal strel of length 3: (1 1c 1) */
strel3h = (STREL *) calloc (1, sizeof (STREL));
strel3h->nx = 3;
strel3h->ny = 1;
strel3h->cx = 1;  /* center pixel */
strel3h->cy = 0;
strel3h->data = matrix(strel3h->nx, strel3h->ny);
for (i = 0; i < 3; i++)
    strel3h->data[0][i] = 1;

    /* vertical strel of length 3: v(1 1c 1) */
strel3v = (STREL *) calloc (1, sizeof (STREL));
strel3v->nx = 1;
strel3v->ny = 3;
strel3v->cx = 0;
strel3v->cy = 1;
strel3v->data = matrix(strel3v->nx, strel3v->ny);
for (i = 0; i < 3; i++)
    strel3v->data[i][0] = 1;

    /* horizontal strel of length 4: (1 1c 1 1) */
strel4h = (STREL *) calloc (1, sizeof (STREL));
strel4h->nx = 4;
strel4h->ny = 1;
strel4h->cx = 1;  /* near center pixel */
strel4h->cy = 0;
strel4h->data = matrix(strel4h->nx, strel4h->ny);
for (i = 0; i < 4; i++)
   strel4h->data[0][i] = 1;

    /* vertical strel of length 4: v(1 1c 1 1) */
strel4v = (STREL *) calloc (1, sizeof (STREL));
strel4v->nx = 1;
strel4v->ny = 4;
strel4v->cx = 0;
strel4v->cy = 1;
strel4v->data = matrix(strel4v->nx, strel4v->ny);
for (i = 0; i < 4; i++)
    strel4v->data[i][0] = 1;

    /* horizontal strel of length 5: (1 1 1c 1 1) */
strel5h = (STREL *) calloc (1, sizeof (STREL));
strel5h->nx = 5;
strel5h->ny = 1;
strel5h->cx = 2;  /* center pixel */
```

```
strel5h->cy = 0;
strel5h->data = matrix(strel5h->nx, strel5h->ny);
for (i = 0; i < 5; i++)
    strel5h->data[0][i] = 1;

    /* vertical strel of length 5: v(1 1 1c 1 1) */
strel5v = (STREL *) calloc (1, sizeof (STREL));
strel5v->nx = 1;
strel5v->ny = 5;
strel5v->cx = 0;
strel5v->cy = 2;
strel5v->data = matrix(strel5v->nx, strel5v->ny);
for (i = 0; i < 5; i++)
    strel5v->data[i][0] = 1;

    /* horizontal strel of length 6: (1 1 1c 1 1 1) */
strel6h = (STREL *) calloc (1, sizeof (STREL));
strel6h->nx = 6;
strel6h->ny = 1;
strel6h->cx = 2;  /* near center pixel */
strel6h->cy = 0;
strel6h->data = matrix(strel6h->nx, strel6h->ny);
for (i = 0; i < 6; i++)
    strel6h->data[0][i] = 1;

    /* vertical strel of length 6: v(1 1 1c 1 1 1) */
strel6v = (STREL *) calloc (1, sizeof (STREL));
strel6v->nx = 1;
strel6v->ny = 6;
strel6v->cx = 0;
strel6v->cy = 2;
strel6v->data = matrix(strel6v->nx, strel6v->ny);
for (i = 0; i < 6; i++)
    strel6v->data[i][0] = 1;

    /* horizontal strel of length 7: (1 1 1 1c 1 1 1) */
strel7h = (STREL *) calloc (1, sizeof (STREL));
strel7h->nx = 7;
strel7h->ny = 1;
strel7h->cx = 3;  /* center pixel */
strel7h->cy = 0;
strel7h->data = matrix(strel7h->nx, strel7h->ny);
for (i = 0; i < 7; i++)
    strel7h->data[0][i] = 1;

    /* vertical strel of length 7: v(1 1 1 1c 1 1 1) */
strel7v = (STREL *) calloc (1, sizeof (STREL));
strel7v->nx = 1;
strel7v->ny = 7;
strel7v->cx = 0;
strel7v->cy = 3;
strel7v->data = matrix(strel7v->nx, strel7v->ny);
for (i = 0; i < 7; i++)
    strel7v->data[i][0] = 1;

    /* horizontal strel of length 8: (1 1 1 1c 1 1 1 1) */
strel8h = (STREL *) calloc (1, sizeof (STREL));
```

```
strel8h->nx = 8;
strel8h->ny = 1;
strel8h->cx = 3;  /* near center pixel */
strel8h->cy = 0;
strel8h->data = matrix(strel8h->nx, strel8h->ny);
for (i = 0; i < 8; i++)
    strel8h->data[0][i] = 1;

    /* vertical strel of length 8: v(1 1 1 1c 1 1 1 1) */
strel8v = (STREL *) calloc (1, sizeof (STREL));
strel8v->nx = 1;
strel8v->ny = 8;
strel8v->cx = 0;
strel8v->cy = 3;
strel8v->data = matrix(strel8v->nx, strel8v->ny);
for (i = 0; i < 8; i++)
    strel8v->data[i][0] = 1;

    /* horizontal strel of length 9: (1 1 1 1 1c 1 1 1 1) */
strel9h = (STREL *) calloc (1, sizeof (STREL));
strel9h->nx = 9;
strel9h->ny = 1;
strel9h->cx = 4;  /* center pixel */
strel9h->cy = 0;
strel9h->data = matrix(strel9h->nx, strel9h->ny);
for (i = 0; i < 9; i++)
    strel9h->data[0][i] = 1;

    /* vertical strel of length 9: v(1 1 1 1 1c 1 1 1 1) */
strel9v = (STREL *) calloc (1, sizeof (STREL));
strel9v->nx = 1;
strel9v->ny = 9;
strel9v->cx = 0;
strel9v->cy = 4;
strel9v->data = matrix(strel9v->nx, strel9v->ny);
for (i = 0; i < 9; i++)
    strel9v->data[i][0] = 1;

    /* horizontal strel of length 10: ((4:1) 1c (5:1)) */
strel10h = (STREL *) calloc (1, sizeof (STREL));
strel10h->nx = 10;
strel10h->ny = 1;
strel10h->cx = 4;  /* near center pixel */
strel10h->cy = 0;
strel10h->data = matrix(strel10h->nx, strel10h->ny);
for (i = 0; i < 10; i++)
    strel10h->data[0][i] = 1;

    /* vertical strel of length 10: v((4:1) 1c (5:1)) */
strel10v = (STREL *) calloc (1, sizeof (STREL));
strel10v->nx = 1;
strel10v->ny = 10;
strel10v->cx = 0;
strel10v->cy = 4;  /* near center pixel */
strel10v->data = matrix(strel10v->nx, strel10v->ny);
for (i = 0; i < 10; i++)
    strel10v->data[i][0] = 1;
```

```
    /* horizontal strel of length 11: h((5:1) lc (5:1)) */
strel11h = (STREL *) calloc (1, sizeof (STREL));
strel11h->nx = 11;
strel11h->ny = 1;
strel11h->cx = 5;  /* center pixel */
strel11h->cy = 0;
strel11h->data = matrix(strel11h->nx, strel11h->ny);
for (i = 0; i < 11; i++)
    strel11h->data[0][i] = 1;

    /* vertical strel of length 11: v((5:1) lc (5:1)) */
strel11v = (STREL *) calloc (1, sizeof (STREL));
strel11v->nx = 1;
strel11v->ny = 11;
strel11v->cx = 0;
strel11v->cy = 5;
strel11v->data = matrix(strel11v->nx, strel11v->ny);
for (i = 0; i < 11; i++)
    strel11v->data[i][0] = 1;

    /* horizontal strel of length 13: h((6:1) lc (6:1)) */
strel13h = (STREL *) calloc (1, sizeof (STREL));
strel13h->nx = 13;
strel13h->ny = 1;
strel13h->cx = 6;  /* center pixel */
strel13h->cy = 0;
strel13h->data = matrix(strel13h->nx, strel13h->ny);
for (i = 0; i < 13; i++)
    strel13h->data[0][i] = 1;

    /* vertical strel of length 13: v((6:1) lc (6:1)) */
strel13v = (STREL *) calloc (1, sizeof (STREL));
strel13v->nx = 1:
strel13v->ny = 13;
strel13v->cx = 0;
strel13v->cy = 6;
strel13v->data = matrix(strel13v->nx, strel13v->ny);
for (i = 0; i < 13; i++)
    strel13v->data[i][0] = 1;

    /* horizontal strel of length 15: ((7:1) lc (7:1)) */
strel15h = (STREL *) calloc (1, sizeof (STREL));
strel15h->nx = 15;
strel15h->ny = 1;
strel15h->cx = 7;  /* center on pixel */
strel15h->cy = 0;
strel15h->data = matrix(strel15h->nx, strel15h->ny);
for (i = 0; i < 15; i++)
    strel15h->data[0][i] = 1;

    /* vertical strel of length 15: v((7:1) lc (7:1)) */
strel15v = (STREL *) calloc (1, sizeof (STREL));
strel15v->nx = 1;
strel15v->ny = 15;
strel15v->cx = 0;
strel15v->cy = 7;  /* center on center pixel */
strel15v->data = matrix(strel15v->nx, strel15v->ny);
for (i = 0; i < 15; i++)
    strel15v->data[i][0] = 1;
```

```
    /* horizontal strel of length 20: ((9:1) lc (10:1))  */
strel20h = (STREL *) calloc (1, sizeof (STREL));
strel20h->nx = 20;
strel20h->ny = 1;
strel20h->cx = 9;  /* near center pixel */
strel20h->cy = 0;
strel20h->data = matrix(strel20h->nx, strel20h->ny);
for (i = 0; i < 20; i++)
    strel20h->data[0][i] = 1;

    /* vertical strel of length 20: v((9:1) lc (10:1))  */
strel20v = (STREL *) calloc (1, sizeof (STREL));
strel20v->nx = 1;
strel20v->ny = 20;
strel20v->cx = 0;
strel20v->cy = 9;  /* near center pixel */
strel20v->data = matrix(strel20v->nx, strel20v->ny);
for (i = 0; i < 20; i++)
    strel20v->data[i][0] = 1;

    /* horizontal strel of length 25: ((12:1) lc (12:1))  */
strel25h = (STREL *) calloc (1, sizeof (STREL));
strel25h->nx = 25;
strel25h->ny = 1;
strel25h->cx = 12;  /* center pixel */
strel25h->cy = 0;
strel25h->data = matrix(strel25h->nx, strel25h->ny);
for (i = 0; i < 25; i++)
    strel25h->data[0][i] = 1;

    /* vertical strel of length 25: v((12:1) lc (12:1))  */
strel25v = (STREL *) calloc (1, sizeof (STREL));
strel25v->nx = 1;
strel25v->ny = 25;
strel25v->cx = 0;
strel25v->cy = 12;  /* on center pixel */
strel25v->data = matrix(strel25v->nx, strel25v->ny);
for (i = 0; i < 25; i++)
    strel25v->data[i][0] = 1;

    /* horizontal strel of length 30: ((14:1) lc (15:1))  */
strel30h = (STREL *) calloc (1, sizeof (STREL));
strel30h->nx = 30;
strel30h->ny = 1;
strel30h->cx = 14;  /* center pixel */
strel30h->cy = 0;
strel30h->data = matrix(strel30h->nx, strel30h->ny);
for (i = 0; i < 30; i++)
    strel30h->data[0][i] = 1;

    /* vertical strel of length 30: v((14:1) lc (15:1))  */
strel30v = (STREL *) calloc (1, sizeof (STREL));
strel30v->nx = 1;
strel30v->ny = 30;
strel30v->cx = 0;
strel30v->cy = 14;  /* on center pixel */
```

```
strel30v->data = matrix(strel30v->nx, strel30v->ny);
for (i = 0; i < 30; i++)
    strel30v->data[i][0] = 1;

    /* horizontal strel of length 35: ((17:1) lc (17:1))  */
strel35h = (STREL *) calloc (1, sizeof (STREL));
strel35h->nx = 35;
strel35h->ny = 1;
strel35h->cx = 17;  /* center pixel */
strel35h->cy = 0;
strel35h->data = matrix(strel35h->nx, strel35h->ny);
for (i = 0; i < 35; i++)
    strel35h->data[0][i] = 1;

    /* vertical strel of length 35: v((17:1) lc (17:1))  */
strel35v = (STREL *) calloc (1, sizeof (STREL));
strel35v->nx = 1;
strel35v->ny = 35;
strel35v->cx = 0;
strel35v->cy = 17;  /* on center pixel */
strel35v->data = matrix(strel35v->nx, strel35v->ny);
for (i = 0; i < 35; i++)
    strel35v->data[i][0] = 1;

    /* horizontal strel of length 40: ((19:1) lc (20:1))  */
strel40h = (STREL *) calloc (1, sizeof (STREL));
strel40h->nx = 40;
strel40h->ny = 1;
strel40h->cx = 19;  /* center pixel */
strel40h->cy = 0;
strel40h->data = matrix(strel40h->nx, strel40h->ny);
for (i = 0; i < 40; i++)
    strel40h->data[0][i] = 1;

    /* vertical strel of length 40: v((19:1) lc (20:1))  */
strel40v = (STREL *) calloc (1, sizeof (STREL));
strel40v->nx = 1;
strel40v->ny = 40;
strel40v->cx = 0;
strel40v->cy = 19;  /* on center pixel */
strel40v->data = matrix(strel40v->nx, strel40v->ny);
for (i = 0; i < 40; i++)
    strel40v->data[i][0] = 1;

    /* horizontal strel of length 45: ((22:1) lc (22:1))  */
strel45h = (STREL *) calloc (1, sizeof (STREL));
strel45h->nx = 45;
strel45h->ny = 1;
strel45h->cx = 22;  /* center pixel */
strel45h->cy = 0;
strel45h->data = matrix(strel45h->nx, strel45h->ny);
for (i = 0; i < 45; i++)
    strel45h->data[0][i] = 1;

    /* vertical strel of length 45: v((22:1) lc (22:1))  */
strel45v = (STREL *) calloc (1, sizeof (STREL));
strel45v->nx = 1;
strel45v->ny = 45;
strel45v->cx = 0;
```

```
strel45v->cy = 22;  /* on center pixel */
strel45v->data = matrix(strel45v->nx, strel45v->ny);
for (i = 0; i < 45; i++)
    strel45v->data[i][0] = 1;

    /* horizontal strel of length 50: ((24:1) lc (25:1))  */
strel50h = (STREL *) calloc (1, sizeof (STREL));
strel50h->nx = 50;
strel50h->ny = 1;
strel50h->cx = 24;  /* center pixel */
strel50h->cy = 0;
strel50h->data = matrix(strel50h->nx, strel50h->ny);
for (i = 0; i < 50; i++)
    strel50h->data[0][i] = 1;

    /* vertical strel of length 50: v((24:1) lc (25:1))  */
strel50v = (STREL *) calloc (1, sizeof (STREL));
strel50v->nx = 1;
strel50v->ny = 50;
strel50v->cx = 0;
strel50v->cy = 24;  /* on center pixel */
strel50v->data = matrix(strel50v->nx, strel50v->ny);
for (i = 0; i < 50; i++)
    strel50v->data[i][0] = 1;

    /* diagonal strel, length 3, positive slope. */
strel3dp = (STREL *) calloc (1, sizeof (STREL));
strel3dp->nx = strel3dp->ny = 3;
strel3dp->cx = strel3dp->cy = 1;
strel3dp->data = matrix(strel3dp->nx, strel3dp->ny);
for (i = 0; i < 3; i++)
{
    j = 2 - i;
    strel3dp->data[i][j] = 1;
}

    /* diagonal strel, length 3, negative slope. */
strel3dn = (STREL *) calloc (1, sizeof (STREL));
strel3dn->nx = strel3dn->ny = 3;
strel3dn->cx = strel3dn->cy = 1;
strel3dn->data = matrix(strel3dn->nx, strel3dn->ny);
for (i = 0; i < 3; i++)
    strel3dn->data[i][i] = 1;

    /* diagonal strel, length 4, positive slope. */
strel4dp = (STREL *) calloc (1, sizeof (STREL));
strel4dp->nx = strel4dp->ny = 4;
strel4dp->cx = strel4dp->cy = 1;
strel4dp->data = matrix(strel4dp->nx, strel4dp->ny);
for (i = 0; i < 4; i++)
{
    j = 3 - i;
    strel4dp->data[i][j] = 1;
}

    /* diagonal strel, length 4, negative slope. */
strel4dn = (STREL *) calloc (1, sizeof (STREL));
strel4dn->nx = strel4dn->ny = 4;
strel4dn->cx = strel4dn->cy = 1;
```

```
strel4dn->data = matrix(strel4dn->nx, strel4dn->ny);
for (i = 0; i < 4; i++)
    strel4dn->data[i][j] = 1;

    /* diagonal strel, length 5, positive slope. */
strel5dp = (STREL *) calloc (1, sizeof (STREL));
strel5dp->nx = strel5dp->ny = 5;
strel5dp->cx = strel5dp->cy = 2;
strel5dp->data = matrix(strel5dp->nx, strel5dp->ny);
for (i = 0; i < 5; i++)
{
    j = 4 - i;
    strel5dp->data[i][j] = 1;
}

    /* diagonal strel, length 5, negative slope. */
strel5dn = (STREL *) calloc (1, sizeof (STREL));
strel5dn->nx = strel5dn->ny = 5;
strel5dn->cx = strel5dn->cy = 2;
strel5dn->data = matrix(strel5dn->nx, strel5dn->ny);
for (i = 0; i < 5; i++)
    strel5dn->data[i][i] = 1;

    /* diagonal strel, length 6, positive slope. */
strel6dp = (STREL *) calloc (1, sizeof (STREL));
strel6dp->nx = strel6dp->ny = 6;
strel6dp->cx = strel6dp->cy = 2;
strel6dp->data = matrix(strel6dp->nx, strel6dp->ny);
for (i = 0; i < 6; i++)
{
    j = 5 - i;
    strel6dp->data[i][j] = 1;
}

    /* diagonal strel, length 6, negative slope. */
strel6dn = (STREL *) calloc (1, sizeof (STREL));
strel6dn->nx = strel6dn->ny = 6;
strel6dn->cx = strel6dn->cy = 2;
strel6dn->data = matrix(strel6dn->nx, strel6dn->ny);
for (i = 0; i < 6; i++)
    strel6dn->data[i][j] = 1;

    /* diagonal strel, length 7, positive slope. */
strel7dp = (STREL *) calloc (1, sizeof (STREL));
strel7dp->nx = strel7dp->ny = 7;
strel7dp->cx = strel7dp->cy = 3;
strel7dp->data = matrix(strel7dp->nx, strel7dp->ny);
for (i = 0; i < 7; i++)
{
    j = 6 - i;
    strel7dp->data[i][j] = 1;
}

    /* diagonal strel, length 7, negative slope. */
strel7dn = (STREL *) calloc (1, sizeof (STREL));
strel7dn->nx = strel7dn->ny = 7;
strel7dn->cx = strel7dn->cy = 3;
strel7dn->data = matrix(strel7dn->nx, strel7dn->ny);
```

```
for (i = 0; i < 7; i++)
    strel7dn->data[i][i] = 1;

    /* diagonal strel, length 9, positive slope. */
strel9dp = (STREL *) calloc (1, sizeof (STREL));
strel9dp->nx = strel9dp->ny = 9;
strel9dp->cx = strel9dp->cy = 4;
strel9dp->data = matrix(strel9dp->nx, strel9dp->ny);
for (i = 0; i < 9; i++)
{
    j = 8 - i;
    strel9dp->data[i][j] = 1;
}

    /* diagonal strel, length 9, negative slope. */
strel9dn = (STREL *) calloc (1, sizeof (STREL));
strel9dn->nx = strel9dn->ny = 9;
strel9dn->cx = strel9dn->cy = 4;
strel9dn->data = matrix(strel9dn->nx, strel9dn->ny);
for (i = 0; i < 9; i++)
    strel9dn->data[i][i] = 1;

    /* diagonal strel, length 11, positive slope. */
strel11dp = (STREL *) calloc (1, sizeof (STREL));
strel11dp->nx = strel11dp->ny = 11;
strel11dp->cx = strel11dp->cy = 5;
strel11dp->data = matrix(strel11dp->nx, strel11dp->ny);
for (i = 0; i < 11; i++)
{
    j = 10 - i;
    strel11dp->data[i][j] = 1;
}

    /* diagonal strel, length 11, negative slope. */
strel11dn = (STREL *) calloc (1, sizeof (STREL));
strel11dn->nx = strel11dn->ny = 11;
strel11dn->cx = strel11dn->cy = 5;
strel11dn->data = matrix(strel11dn->nx, strel11dn->ny);
for (i = 0; i < 11; i++)
    strel11dn->data[i][i] = 1;

    /* diagonal strel, length 13, positive slope. */
strel13dp = (STREL *) calloc (1, sizeof (STREL));
strel13dp->nx = strel13dp->ny = 13;
strel13dp->cx = strel13dp->cy = 6;
strel13dp->data = matrix(strel13dp->nx, strel13dp->ny);
for (i = 0; i < 13; i++)
{
    j = 12 - i;
    strel13dp->data[i][j] = 1;
}

    /* diagonal strel, length 13, negative slope. */
strel13dn = (STREL *) calloc (1, sizeof (STREL));
strel13dn->nx = strel13dn->ny = 13;
strel13dn->cx = strel13dn->cy = 6;
```

```
strel13dn->data = matrix(strel13dn->nx, strel13dn->ny);
for (i = 0; i < 13; i++)
    strel13dn->data[i][i] = 1;

    /* diagonal strel, length 15, positive slope. */
strel15dp = (STREL *) calloc (1, sizeof (STREL));
strel15dp->nx = strel15dp->ny = 15;
strel15dp->cx = strel15dp->cy = 7;
strel15dp->data = matrix(strel15dp->nx, strel15dp->ny);
for (i = 0; i < 15; i++)
{
    j = 14 - i;
    strel15dp->data[i][j] = 1;
}

    /* diagonal strel, length 15, negative slope. */
strel15dn = (STREL *) calloc (1, sizeof (STREL));
strel15dn->nx = strel15dn->ny = 15;
strel15dn->cx = strel15dn->cy = 7;
strel15dn->data = matrix(strel15dn->nx, strel15dn->ny);
for (i = 0; i < 15; i++)
    strel15dn->data[i][i] = 1;

    /* +27 degree diagonal strel, max. dimension 5 */
strel5hdp = (STREL *) calloc (1, sizeof (STREL));
strel5hdp->nx = 5:
strel5hdp->ny = 3;
strel5hdp->cx = 2;
strel5hdp->cy = 1;
strel5hdp->data = matrix(strel5hdp->nx, strel5hdp->ny);
for (j = 0; j < 5; j++)
{
    i = 2 - j/2;
    strel5hdp->data[i][j] = 1;
}

    /* -27 degree diagonal strel, max. dimension 5 */
strel5hdn = (STREL *) calloc (1, sizeof (STREL));
strel5hdn->nx = 5;
strel5hdn->ny = 3;
strel5hdn->cx = 2;
strel5hdn->cy = 1;
strel5hdn->data = matrix(strel5hdn->nx, strel5hdn->ny);
for (j = 0; j < 5; j++)
{
    i = j/2;
    strel5hdn->data[i][j] = 1;
}

    /* +63 degree diagonal strel, max. dimension 5 */
strel5vdp = (STREL *) calloc (1, sizeof (STREL));
strel5vdp->nx = 3;
strel5vdp->ny = 5;
strel5vdp->cx = 1;
strel5vdp->cy = 2;
strel5vdp->data = matrix(strel5vdp->nx, strel5vdp->ny);
for (i = 0; i < 5; i++)
{
    j = 2 - (i+1)/2;
    strel5vdp->data[i][j] = 1;
```

```
}

    /* -63 degree diagonal strel, max. dimension 5 */
strel5vdn = (STREL *) calloc (1, sizeof (STREL));
strel5vdn->nx = 3;
strel5vdn->ny = 5;
strel5vdn->cx = 1;
strel5vdn->cy = 2;
strel5vdn->data = matrix(strel5vdn->nx, strel5vdn->ny);
for (i = 0; i < 5; i++)
{
    j = (i+1)/2;
    strel5vdn->data[i][j] = 1;
}

    /* +27 degree diagonal strel, max. dimension 9 */
strel9hdp = (STREL *) calloc (1, sizeof (STREL));
strel9hdp->nx = 9;
strel9hdp->ny = 5;
strel9hdp->cx = 4;
strel9hdp->cy = 2;
strel9hdp->data = matrix(strel9hdp->nx, strel9hdp->ny);
for (j = 0; j < 9; j++)
{
    i = 4 - j/2;
    strel9hdp->data[i][j] = 1;
}

    /* -27 degree diagonal strel, max. dimension 9 */
strel9hdn = (STREL *) calloc (1, sizeof (STREL));
strel9hdn->nx = 9;
strel9hdn->ny = 5;
strel9hdn->cx = 4;
strel9hdn->cy = 2;
strel9hdn->data = matrix(strel9hdn->nx, strel9hdn->ny);
for (j = 0; j < 9; j++)
{
    i = j/2;
    strel9hdn->data[i][j] = 1;
}

    /* +63 degree diagonal strel, max. dimension 9 */
strel9vdp = (STREL *) calloc (1, sizeof (STREL));
strel9vdp->nx = 5;
strel9vdp->ny = 9;
strel9vdp->cx = 2;
strel9vdp->cy = 4;
strel9vdp->data = matrix(strel9vdp->nx, strel9vdp->ny);
for (i = 0; i < 9; i++)
{
    j = 4 - (i+1)/2;
    strel9vdp->data[i][j] = 1;
}

    /* -63 degree diagonal strel, max. dimension 9 */
strel9vdn = (STREL *) calloc (1, sizeof (STREL));
strel9vdn->nx = 5;
strel9vdn->ny = 9;
strel9vdn->cx = 2;
strel9vdn->cy = 4;
```

```
strel9vdn->data = matrix(strel9vdn->nx, strel9vdn->ny);
for (i = 0; i < 9; i++)
{
    j = (i+1)/2;
    strel9vdn->data[i][j] = 1;
}

    /* +27 degree diagonal strel, max. dimension 13 */
strel13hdp = (STREL *) calloc (1, sizeof (STREL));
strel13hdp->nx = 13;
strel13hdp->ny = 7;
strel13hdp->cx = 6;
strel13hdp->cy = 3;
strel13hdp->data = matrix(strel13hdp->nx, strel13hdp->ny);
for (j = 0; j < 13; j++)
{
    i = 6 - j/2;
    strel13hdp->data[i][j] = 1;
}

    /* -27 degree diagonal strel, max. dimension 13 */
strel13hdn = (STREL *) calloc (1, sizeof (STREL));
strel13hdn->nx = 13;
strel13hdn->ny = 7;
strel13hdn->cx = 6;
strel13hdn->cy = 3;
strel13hdn->data = matrix(strel13hdn->nx, strel13hdn->ny);
for (j = 0; j < 13; j++)
{
    i = j/2;
    strel13hdn->data[i][j] = 1;
}

    /* +63 degree diagonal strel, max. dimension 13 */
strel13vdp = (STREL *) calloc (1, sizeof (STREL));
strel13vdp->nx = 7;
strel13vdp->ny = 13;
strel13vdp->cx = 3;
strel13vdp->cy = 6;
strel13vdp->data = matrix(strel13vdp->nx, strel13vdp->ny);
for (i = 0; i < 13; i++)
{
    j = 6 - (i+1)/2;
    strel13vdp->data[i][j] = 1;
}

    /* -63 degree diagonal strel, max. dimension 13 */
strel13vdn = (STREL *) calloc (1, sizeof (STREL));
strel13vdn->nx = 7;
strel13vdn->ny = 13;
strel13vdn->cx = 3;
strel13vdn->cy = 6;
strel13vdn->data = matrix(strel13vdn->nx, strel13vdn->ny);
for (i = 0; i < 13; i++)
{
    j = (i+1)/2;
    strel13vdn->data[i][j] = 1;
}

    /* pattern:  1c  */
```

```
strel1 = (STREL *) calloc (1, sizeof (STREL));
strel1->nx = strel1->ny = 1;
strel1->cx = strel1->cy = 0;
strel1->data = matrix(strel1->nx, strel1->ny);
strel1->data[0][0] = 1;

    /* pattern:  1c  1
                 1   1      */
strel2 = (STREL *) calloc (1, sizeof (STREL));
strel2->nx = strel2->ny = 2;
strel2->cx = strel2->cy = 0;
strel2->data = matrix(strel2->nx, strel2->ny);
strel2->data[0][0] = 1;
strel2->data[0][1] = 1;
strel2->data[1][0] = 1;
strel2->data[1][1] = 1;

    /* pattern:  1   1   1
                 1   1c  1
                 1   1   1   */
strel3 = (STREL *) calloc (1, sizeof (STREL));
strel3->nx = strel3->ny = 3;
strel3->cx = strel3->cy = 1;
strel3->data = matrix(strel3->nx, strel3->ny);
for (j = 0; j < 3; j++)
    for (i = 0; i < 3; i++)
        strel3->data[j][i] = 1;

    /* pattern:  1   1   1   1
                 1   1c  1   1
                 1   1   1   1
                 1   1   1   1    */
strel4 = (STREL *) calloc (1, sizeof (STREL));
strel4->nx = strel4->ny = 4;
strel4->cx = strel4->cy = 1;
strel4->data = matrix(strel4->nx, strel4->ny);
for (j = 0; j < 4; j++)
    for (i = 0; i < 4; i++)
        strel4->data[j][i] = 1;

    /* pattern:  1   1   1   1   1
                 1   1   1   1   1
                 1   1   1c  1   1
                 1   1   1   1   1
                 1   1   1   1   1     */
strel5 = (STREL *) calloc (1, sizeof (STREL));
strel5->nx = strel5->ny = 5;
strel5->cx = strel5->cy = 2;
strel5->data = matrix(strel5->nx, strel5->ny);
for (j = 0; j < 5; j++)
    for (i = 0; i < 5; i++)
        strel5->data[j][i] = 1;

    /* pattern:  0c  1
                 1   0      */
strel2dp = (STREL *) calloc (1, sizeof (STREL));
strel2dp->nx = strel2dp->ny = 2;
strel2dp->cx = strel2dp->cy = 0;
strel2dp->data = matrix(strel2dp->nx, strel2dp->ny);
strel2dp->data[0][1] = 1;
```

```
strel2dp->data[1][0] = 1;

    /* pattern:  1c  0
                 0   1      */
strel2dm = (STREL *) calloc (1, sizeof (STREL));
strel2dm->nx = strel2dm->ny = 2;
strel2dm->cx = strel2dm->cy = 0;
strel2dm->data = matrix(strel2dm->nx, strel2dm->ny);
strel2dm->data[0][0] = 1;
strel2dm->data[1][1] = 1;

    /* pattern:  0c . 1
                 1   1      */
strel2ule = (STREL *) calloc (1, sizeof (STREL));
strel2ule->nx = strel2ule->ny = 2;
strel2ule->cx = strel2ule->cy = 0;
strel2ule->data = matrix(strel2ule->nx, strel2ule->ny);
strel2ule->data[0][1] = 1;
strel2ule->data[1][0] = 1;
strel2ule->data[1][1] = 1;

    /* pattern:  1c  0
                 0   0      */
strel2uld = (STREL *) calloc (1, sizeof (STREL));
strel2uld->nx = strel2uld->ny = 2;
strel2uld->cx = strel2uld->cy = 0;
strel2uld->data = matrix(strel2uld->nx, strel2uld->ny);
strel2uld->data[0][0] = 1;

    /* pattern:  1c  0
                 1   1      */
strel2ure = (STREL *) calloc (1, sizeof (STREL));
strel2ure->nx = strel2ure->ny = 2;
strel2ure->cx = strel2ure->cy = 0;
strel2ure->data = matrix(strel2ure->nx, strel2ure->ny);
strel2ure->data[0][0] = 1;
strel2ure->data[1][0] = 1;
strel2ure->data[1][1] = 1;

    /* pattern:  0c  1
                 0   0      */
strel2urd = (STREL *) calloc (1, sizeof (STREL));
strel2urd->nx = strel2urd->ny = 2;
strel2urd->cx = strel2urd->cy = 0;
strel2urd->data = matrix(strel2urd->nx, strel2urd->ny);
strel2urd->data[0][1] = 1;

    /* pattern:  1c  1
                 0   1      */
strel2lle = (STREL *) calloc (1, sizeof (STREL));
strel2lle->nx = strel2lle->ny = 2;
strel2lle->cx = strel2lle->cy = 0;
strel2lle->data = matrix(strel2lle->nx, strel2lle->ny);
strel2lle->data[0][0] = 1;
strel2lle->data[0][1] = 1;
strel2lle->data[1][1] = 1;

    /* pattern:  0c  0
                 1   0      */
strel2lld = (STREL *) calloc (1, sizeof (STREL));
```

```
strel2lld->nx = strel2lld->ny = 2;
strel2lld->cx = strel2lld->cy = 0;
strel2lld->data = matrix(strel2lld->nx, strel2lld->ny);
strel2lld->data[1][0] = 1;

    /* pattern:  1c  1
                 1   0      */
strel2lre = (STREL *) calloc (1, sizeof (STREL));
strel2lre->nx = strel2lre->ny = 2;
strel2lre->cx = strel2lre->cy = 0;
strel2lre->data = matrix(strel2lre->nx, strel2lre->ny);
strel2lre->data[0][0] = 1;
strel2lre->data[0][1] = 1;
strel2lre->data[1][0] = 1;

    /* pattern:  0c  0
                 0   1      */
strel2lrd = (STREL *) calloc (1, sizeof (STREL));
strel2lrd->nx = strel2lrd->ny = 2;
strel2lrd->cx = strel2lrd->cy = 0;
strel2lrd->data = matrix(strel2lrd->nx, strel2lrd->ny);
strel2lrd->data[1][1] = 1;

    /* pattern match for top left b.b. corner:  2 2
     *                                          2 1c  */
strel2tl = (STREL *) calloc (1, sizeof (STREL));
strel2tl->nx = 2;
strel2tl->ny = 2;
strel2tl->cx = 1;
strel2tl->cy = 1;
strel2tl->data = matrix(strel2tl->nx, strel2tl->ny);
strel2tl->data[0][0] = 2;
strel2tl->data[0][1] = 2;
strel2tl->data[1][0] = 2;
strel2tl->data[1][1] = 1;

    /* pattern match for top right b.b. corner:  2   2
     *                                           1c 2   */
strel2tr = (STREL *) calloc (1, sizeof (STREL));
strel2tr->nx = 2;
strel2tr->ny = 2;
strel2tr->cx = 0;
strel2tr->cy = 1;
strel2tr->data = matrix(strel2tr->nx, strel2tr->ny);
strel2tr->data[0][0] = 2;
strel2tr->data[0][1] = 2;
strel2tr->data[1][0] = 1;
strel2tr->data[1][1] = 2;

    /* pattern match for bottom left b.b. corner:  2 1c
     *                                             2 2    */
strel2bl = (STREL *) calloc (1, sizeof (STREL));
strel2bl->nx = 2;
strel2bl->ny = 2;
strel2bl->cx = 1;
strel2bl->cy = 0;
strel2bl->data = matrix(strel2bl->nx, strel2bl->ny);
strel2bl->data[0][0] = 2;
strel2bl->data[0][1] = 1;
strel2bl->data[1][0] = 2;
```

```
strel2bl->data[1][1] = 2;

    /* pattern match for bottom right b.b. corner:  1c 2
     *                                               2  2  */
strel2br = (STREL *) calloc (1, sizeof (STREL));
strel2br->nx = 2;
strel2br->ny = 2;
strel2br->cx = 0;
strel2br->cy = 0;
strel2br->data = matrix(strel2br->nx, strel2br->ny);
strel2br->data[0][0] = 1;
strel2br->data[0][1] = 2;
strel2br->data[1][0] = 2;
strel2br->data[1][1] = 2;

    /* pattern match for vertical runs of length 1.  v: 2 1c 2   */
strel3ve = (STREL *) calloc (1, sizeof (STREL));
strel3ve->nx = 1;
strel3ve->ny = 3;
strel3ve->cx = 0;
strel3ve->cy = 1;  /* center pixel in column */
strel3ve->data = matrix(strel3ve->nx, strel3ve->ny);
strel3ve->data[0][0] = 2;
strel3ve->data[1][0] = 1;
strel3ve->data[2][0] = 2;

    /* pattern match for vertical runs of length 2.  v: 2 1c 1 2   */
strel4ve = (STREL *) calloc (1, sizeof (STREL));
strel4ve->nx = 1;
strel4ve->ny = 4;
strel4ve->cx = 0;
strel4ve->cy = 1;  /* first on pixel down */
strel4ve->data = matrix(strel4ve->nx, strel4ve->ny);
strel4ve->data[0][0] = 2;
strel4ve->data[1][0] = 1;
strel4ve->data[2][0] = 1;
strel4ve->data[3][0] = 2;

    /* use with strel4ve to dilate both pixels: */
strel2vd = (STREL *) malloc (sizeof (STREL));
strel2vd->nx = 1;
strel2vd->ny = 2;
strel2vd->cx = 0;  /* dilate  1  -->  1
                              0       1   */
strel2vd->cy = 0;
strel2vd->data = matrix(strel2vd->nx, strel2vd->ny);
strel2vd->data[0][0] = 1;
strel2vd->data[1][0] = 1;

    /* pattern match for run of length 1:   2c 1  2   */
strel3hl = (STREL *) calloc (1, sizeof (STREL));
strel3hl->nx = 3;
strel3hl->ny = 1;
strel3hl->cx = 0;  /* center at left pixel */
strel3hl->cy = 0;
strel3hl->data = matrix(strel3hl->nx, strel3hl->ny);
strel3hl->data[0][0] = 2;
strel3hl->data[0][1] = 1;
strel3hl->data[0][2] = 2;
```

```
    /* pattern match for white run of length 1:   1  2  1c   */
strel3h2 = (STREL *) calloc (1, sizeof (STREL));
strel3h2->nx = 3;
strel3h2->ny = 1;
strel3h2->cx = 2;  /* center at right pixel */
strel3h2->cy = 0;
strel3h2->data = matrix(strel3h2->nx, strel3h2->ny);
strel3h2->data[0][0] = 1;
strel3h2->data[0][1] = 2;
strel3h2->data[0][2] = 1;

    /* pattern match for vertical run of length 1:  v:2c 1  2   */
strel3v1 = (STREL *) calloc (1, sizeof (STREL));
strel3v1->nx = 1;
strel3v1->ny = 3;
strel3v1->cx = 0;
strel3v1->cy = 0;  /* center at top pixel */
strel3v1->data = matrix(strel3v1->nx, strel3v1->ny);
strel3v1->data[0][0] = 2;
strel3v1->data[1][0] = 1;
strel3v1->data[2][0] = 2;

    /* pattern match for vertical white run of length 1:  v:1  2  1c  */
strel3v2 = (STREL *) calloc (1, sizeof (STREL));
strel3v2->nx = 1;
strel3v2->ny = 3;
strel3v2->cx = 0;
strel3v2->cy = 2;  /* center at bottom pixel */
strel3v2->data = matrix(strel3v2->nx, strel3v2->ny);
strel3v2->data[0][0] = 1;
strel3v2->data[1][0] = 2;
strel3v2->data[2][0] = 1;

    /* pattern match for run of length 2:   2c 1 1  2   */
strel4h1 = (STREL *) calloc (1, sizeof (STREL));
strel4h1->nx = 4;
strel4h1->ny = 1;
strel4h1->cx = 0;  /* center at left pixel */
strel4h1->cy = 0;
strel4h1->data = matrix(strel4h1->nx, strel4h1->ny);
strel4h1->data[0][0] = 2;
strel4h1->data[0][1] = 1;
strel4h1->data[0][2] = 1;
strel4h1->data[0][3] = 2;

    /* pattern match for white run of length 2:   1  2  2  1c   */
strel4h2 = (STREL *) calloc (1, sizeof (STREL));
strel4h2->nx = 4;
strel4h2->ny = 1;
strel4h2->cx = 3;  /* center at right pixel */
strel4h2->cy = 0;
strel4h2->data = matrix(strel4h2->nx, strel4h2->ny);
strel4h2->data[0][0] = 1;
strel4h2->data[0][1] = 2;
strel4h2->data[0][2] = 2;
strel4h2->data[0][3] = 1;

    /* pattern match for vertical run of length 2:  v:2c 1  1  2   */
strel4v1 = (STREL *) calloc (1, sizeof (STREL));
strel4v1->nx = 1;
```

```
    strel4vl->ny = 4;
    strel4vl->cx = 0;
    strel4vl->cy = 0;   /* center at top pixel */
    strel4vl->data = matrix(strel4vl->nx, strel4vl->ny);
    strel4vl->data[0][0] = 2;
    strel4vl->data[1][0] = 1;
    strel4vl->data[2][0] = 1;
    strel4vl->data[3][0] = 2;

        /* pattern match for vertical white run of length 2:  v:1  2  2  1c  */
    strel4v2 = (STREL *) calloc (1, sizeof (STREL));
    strel4v2->nx = 1;
    strel4v2->ny = 4;
    strel4v2->cx = 0;
    strel4v2->cy = 3;   /* center at bottom pixel */
    strel4v2->data = matrix(strel4v2->nx, strel4v2->ny);
    strel4v2->data[0][0] = 1;
    strel4v2->data[1][0] = 2;
    strel4v2->data[2][0] = 2;
    strel4v2->data[3][0] = 1;

        /* pattern match for run of length 3:   2c 1 1 1 2   */
    strel5h1 = (STREL *) calloc (1, sizeof (STREL));
    strel5h1->nx = 5;
    strel5h1->ny = 1;
    strel5h1->cx = 0;   /* center at left pixel */
    strel5h1->cy = 0;
    strel5h1->data = matrix(strel5h1->nx, strel5h1->ny);
    strel5h1->data[0][0] = 2;
    strel5h1->data[0][1] = 1;
    strel5h1->data[0][2] = 1;
    strel5h1->data[0][3] = 1;
    strel5h1->data[0][4] = 2;

        /* pattern match for white run of length 3:   1  2  2  2  1c   */
    strel5h2 = (STREL *) calloc (1, sizeof (STREL));
    strel5h2->nx = 5;
    strel5h2->ny = 1;
    strel5h2->cx = 4;   /* center at right pixel */
    strel5h2->cy = 0;
    strel5h2->data = matrix(strel5h2->nx, strel5h2->ny);
    strel5h2->data[0][0] = 1;
    strel5h2->data[0][1] = 2;
    strel5h2->data[0][2] = 2;
    strel5h2->data[0][3] = 2;
    strel5h2->data[0][4] = 1;

        /* pattern match for vertical run of length 3:  v:2c 1  1  1  2   */
    strel5v1 = (STREL *) calloc (1, sizeof (STREL));
    strel5v1->nx = 1;
    strel5v1->ny = 5;
    strel5v1->cx = 0;
    strel5v1->cy = 0;   /* center at top pixel */
    strel5v1->data = matrix(strel5v1->nx, strel5v1->ny);
    strel5v1->data[0][0] = 2;
    strel5v1->data[1][0] = 1;
    strel5v1->data[2][0] = 1;
    strel5v1->data[3][0] = 1;
    strel5v1->data[4][0] = 2;
```

```
    /* pattern match for vertical white run of length 3: v:1  2  2  2  1c  */
strel5v2 = (STREL *) calloc (1, sizeof (STREL));
strel5v2->nx = 1;
strel5v2->ny = 5;
strel5v2->cx = 0;
strel5v2->cy = 4;  /* center at bottom pixel */
strel5v2->data = matrix(strel5v2->nx, strel5v2->ny);
strel5v2->data[0][0] = 1;
strel5v2->data[1][0] = 2;
strel5v2->data[2][0] = 2;
strel5v2->data[3][0] = 2;
strel5v2->data[4][0] = 1;

    /* pattern match for single pixel with 4-adj white surround:
            0   2   0
            2   1c  2
            0   2   0      */
strel3ht1 = (STREL *) calloc (1, sizeof (STREL));
strel3ht1->nx = 3;
strel3ht1->ny = 3;
strel3ht1->cx = 1;  /* center pixel in center */
strel3ht1->cy = 1;
strel3ht1->data = matrix(strel3ht1->nx, strel3ht1->ny);
strel3ht1->data[1][1] = 1;
strel3ht1->data[0][1] = 2;
strel3ht1->data[1][0] = 2;
strel3ht1->data[1][2] = 2;
strel3ht1->data[2][1] = 2;

    /* pattern match for two pixels with near 4-adj white surround:
            0   2   0
            2   1c  1
            0   2   0      */
strel3ht2 = (STREL *) calloc (1, sizeof (STREL));
strel3ht2->nx = 3;
strel3ht2->ny = 3;
strel3ht2->cx = 1;  /* center pixel in center */
strel3ht2->cy = 1;
strel3ht2->data = matrix(strel3ht2->nx, strel3ht2->ny);
strel3ht2->data[1][1] = 1;
strel3ht2->data[1][2] = 1;
strel3ht2->data[0][1] = 2;
strel3ht2->data[1][0] = 2;
strel3ht2->data[2][1] = 2;

    /* horizontal gapped strel of length 5: (1 1 2c 1 1) */
strel5gap = (STREL *) calloc (1, sizeof (STREL));
strel5gap->nx = 5;
strel5gap->ny = 1;
strel5gap->cx = 2;  /* center pixel */
strel5gap->cy = 0;
strel5gap->data = matrix(strel5gap->nx, strel5gap->ny);
for (i = 0; i < 5; i++)
    strel5gap->data[0][i] = 1;
strel5gap->data[0][2] = 2;

}

/*
```

```
 *  matrix():  returns a matrix (pointer to array of pointers)
 *             at starting address m that
 *                (1) has allocation for ny rows of nx short ints in each row,
 *                (2) "knows" that each row is of width nx.
 */
short int **
matrix(nx, ny)
int          nx, ny;
{
short int   **m;
int          j;

        /* m is a pointer to an array of ny pointers */
    m = (short int **) calloc (ny, sizeof(short int *));
        /* each of which points to an array of nx short ints */
    for (j = 0; j < ny; j++)
        m[j] = (short int *) calloc (nx, sizeof(short int));
    return (m);
}
```

```
/******************************************************************
 *  Copyright (c) 1988, Xerox Corporation.  All rights reserved. *
 *  Copyright protection claimed includes all forms and matters  *
 *  of copyrightable material and information now allowed by     *
 *  statutory or judicial law or hereafter granted, including    *
 *  without limitation, material generated from the software     *
 *  programs which are displayed on the screen such as icons,    *
 *  screen display looks, etc.                                    *
 ******************************************************************/
```

```
/*
 *  strelHT.c--includes subroutines
 *                  strelHTInits()
 *
 *            Horizontal Filters:
 *                    --filtH8p2c0d, filtH8p3c0d;
 *
 ************************************************************
 *            Solid Filters:
 *                    --filtS4p1c0d, filtS4p1c0dI;   0 degrees...
 *                    --filtS6p1c0d, filtS8p1c0d;
 *                    --filtS8p15c0d; (1.5 cycles)
 *
 ************************************************************
 *            Cruciform Filters:
 *                    --filtC4p2c0d, filtC4p2c0dI;
 *                    --filtC4p2c14d;
 *                    --filtC4p2c27d, filtC4p2c27dI;
 *                    --filtC4p2c45d;
 *
 *                    --filtC5p2c0d;
 *                    --filtC5p2c22d;
 *                    --filtC5p2c37d;
 *
 *                    --filtC6p2c0d;
 *                    --filtC6p2c18d;
 *                    --filtC6p2c31d;
 *                    --filtC6p2c45d;
 *
```

```
*                       --filtC7p2c0d;
*                       --filtC7p2c27d;
*                       --filtC7p2c34d;
*                       --filtC7p2c45d;
*
*                       --filtC8p2c0d;
*                       --filtC8p2c23d;
*                       --filtC8p2c30d;
*                       --filtC8p2c45d;
*
*******************************************************
*              Wide Bandpass Filters:
*                       --filtL3p1c18d;
*                       --filtL3p1c45d;

*                       --filtL4p1c0d;
*                       --filtL4p1c27d;
*                       --filtL4p1c45d;
*
*                       --filtL5p1c11d;
*
*                       --filtL6p1c0d;
*                       --filtL6p1c18d;
*                       --filtL6p1c31d;
*                       --filtL6p1c45d;
*
*                       --filtL7p1c8d;
*                       --filtL7p1c34d;
*                       --filtL7p1c45d;
*
*                       --filtL8p1c0d;
*                       --filtL8p1c14d;
*                       --filtL8p1c23d;
*                       --filtL8p1c45d;
*                    matrix()
*/

#include <stdio.h>
#include <llama.h>
#include "morph.h"
#include "strelGlobals.h"

strelHTInits()
{
int          i, j;
short int  **matrix();

/************************************
 *    horizontal filters
 ************************************/
       /* pattern match for 2 cycles of halftone frequency 8 pix/cycle:
        *    10002000100020001  */
    filtH8p2c0d = (STREL *) calloc (1, sizeof (STREL));
    filtH8p2c0d->nx = 17;
    filtH8p2c0d->ny = 1;
    filtH8p2c0d->cx = 8;  /* center at center pixel */
    filtH8p2c0d->cy = 0;
    filtH8p2c0d->data = matrix(filtH8p2c0d->nx, filtH8p2c0d->ny);
```

```
filtH8p2c0d->data[0][0] = 1;
filtH8p2c0d->data[0][4] = 2;
filtH8p2c0d->data[0][8] = 1;
filtH8p2c0d->data[0][12] = 2;
filtH8p2c0d->data[0][16] = 1;

    /* pattern match for 3 cycles of halftone frequency 8 pix/cycle:
     *    1000200010002000100020001  */
filtH8p3c0d = (STREL *) calloc (1, sizeof (STREL));
filtH8p3c0d->nx = 25;
filtH8p3c0d->ny = 1;
filtH8p3c0d->cx = 12;  /* center at center pixel */
filtH8p3c0d->cy = 0;
filtH8p3c0d->data = matrix(filtH8p3c0d->nx, filtH8p3c0d->ny);
filtH8p3c0d->data[0][0] = 1;
filtH8p3c0d->data[0][4] = 2;
filtH8p3c0d->data[0][8] = 1;
filtH8p3c0d->data[0][12] = 2;
filtH8p3c0d->data[0][16] = 1;
filtH8p3c0d->data[0][20] = 2;
filtH8p3c0d->data[0][24] = 1;

/***********************************
 *    3 cycles in 2-d
 ***********************************/
    /* pattern match for 3 cycles in 2 dimensions of halftone frequency
     *  8 pix/cycle:
     *    0000000000001000000000000
     *              0000000 (3)
     *    0000000000002000000000000
     *              0000000 (3)
     *    0000000000001000000000000
     *              0000000 (3)
     *    1000200010002000100020001
     *              0000000 (3)
     *    0000000000001000000000000
     *              0000000 (3)
     *    0000000000002000000000000
     *              0000000 (3)
     *    0000000000001000000000000   */
filtC8p3c0d = (STREL *) calloc (1, sizeof (STREL));
filtC8p3c0d->nx = 25;
filtC8p3c0d->ny = 25;
filtC8p3c0d->cx = 12;  /* center at center pixel */
filtC8p3c0d->cy = 12;
filtC8p3c0d->data = matrix(filtC8p3c0d->nx, filtC8p3c0d->ny);
filtC8p3c0d->data[12][0] = 1;
filtC8p3c0d->data[12][4] = 2;
filtC8p3c0d->data[12][8] = 1;
filtC8p3c0d->data[12][12] = 2;
filtC8p3c0d->data[12][16] = 1;
filtC8p3c0d->data[12][20] = 2;
filtC8p3c0d->data[12][24] = 1;
filtC8p3c0d->data[0][12] = 1;
filtC8p3c0d->data[4][12] = 2;
filtC8p3c0d->data[8][12] = 1;
filtC8p3c0d->data[16][12] = 1;
filtC8p3c0d->data[20][12] = 2;
filtC8p3c0d->data[24][12] = 1;
```

```
/************************************
*    Solid 1 and 1.5-cycle filters
************************************/
     /* pattern match for 1 cycle, 2-d solid filter, halftone frequency
      *  4 pix/cycle:
      *    10201
      *    00000
      *    20202
      *    00000
      *    10201   */
   filtS4p1c0d = (STREL *) calloc (1, sizeof (STREL));
   filtS4p1c0d->nx = 5;
   filtS4p1c0d->ny = 5;
   filtS4p1c0d->cx = 2;  /* center at center pixel */
   filtS4p1c0d->cy = 2;
   filtS4p1c0d->data = matrix(filtS4p1c0d->nx, filtS4p1c0d->ny);
   filtS4p1c0d->data[0][0] = 1;
   filtS4p1c0d->data[0][2] = 2;
   filtS4p1c0d->data[0][4] = 1;
   filtS4p1c0d->data[2][0] = 2;
   filtS4p1c0d->data[2][2] = 2;
   filtS4p1c0d->data[2][4] = 2;
   filtS4p1c0d->data[4][0] = 1;
   filtS4p1c0d->data[4][2] = 2;
   filtS4p1c0d->data[4][4] = 1;

     /* pattern match for 1 cycle, 2-d solid filter, halftone frequency
      *  4 pix/cycle, inverted phase:
      *    20102
      *    00000
      *    10101
      *    00000
      *    20102   */
   filtS4p1c0dI = (STREL *) calloc (1, sizeof (STREL));
   filtS4p1c0dI->nx = 5;
   filtS4p1c0dI->ny = 5;
   filtS4p1c0dI->cx = 2;  /* center at center pixel */
   filtS4p1c0dI->cy = 2;
   filtS4p1c0dI->data = matrix(filtS4p1c0dI->nx, filtS4p1c0dI->ny);
   filtS4p1c0dI->data[0][0] = 2;
   filtS4p1c0dI->data[0][2] = 1;
   filtS4p1c0dI->data[0][4] = 2;
   filtS4p1c0dI->data[2][0] = 1;
   filtS4p1c0dI->data[2][2] = 1;
   filtS4p1c0dI->data[2][4] = 1;
   filtS4p1c0dI->data[4][0] = 2;
   filtS4p1c0dI->data[4][2] = 1;
   filtS4p1c0dI->data[4][4] = 2;

     /* pattern match for 1 cycle, 2-d solid filter, halftone frequency
      *  6 pix/cycle:
      *    1002001
      *     00000 (2)
      *    2001002
      *     00000 (2)
      *    1002001   */
   filtS6p1c0d = (STREL *) calloc (1, sizeof (STREL));
   filtS6p1c0d->nx = 7;
```

```
filtS6plc0d->ny = 7;
filtS6plc0d->cx = 3;  /* center at center pixel */
filtS6plc0d->cy = 3;
filtS6plc0d->data = matrix(filtS6plc0d->nx, filtS6plc0d->ny);
filtS6plc0d->data[0][0] = 1;
filtS6plc0d->data[0][3] = 2;
filtS6plc0d->data[0][6] = 1;
filtS6plc0d->data[3][0] = 2;
filtS6plc0d->data[3][3] = 1;
filtS6plc0d->data[3][6] = 2;
filtS6plc0d->data[6][0] = 1;
filtS6plc0d->data[6][3] = 2;
filtS6plc0d->data[6][6] = 1;

    /* pattern match for 1 cycle, 2-d solid filter, halftone frequency
     *  8 pix/cycle:
     *    100020001
     *      00000 (3)
     *    200010002
     *      00000 (3)
     *    100020001   */
filtS8plc0d = (STREL *) calloc (1, sizeof (STREL));
filtS8plc0d->nx = 9;
filtS8plc0d->ny = 9;
filtS8plc0d->cx = 4;  /* center at center pixel */
filtS8plc0d->cy = 4;
filtS8plc0d->data = matrix(filtS8plc0d->nx, filtS8plc0d->ny);
filtS8plc0d->data[0][0] = 1;
filtS8plc0d->data[0][4] = 2;
filtS8plc0d->data[0][8] = 1;
filtS8plc0d->data[4][0] = 2;
filtS8plc0d->data[4][4] = 1;
filtS8plc0d->data[4][8] = 2;
filtS8plc0d->data[8][0] = 1;
filtS8plc0d->data[8][4] = 2;
filtS8plc0d->data[8][8] = 1;


    /* pattern match for 1.5 cycles, 2-d solid filter, halftone frequency
     *  8 pix/cycle:
     *    2000100020001
     *        00000 (3)
     *    1000200010002
     *        00000 (3)
     *    2000100020001
     *        00000 (3)
     *    1000200010002   */
filtS8pl5c0d = (STREL *) calloc (1, sizeof (STREL));
filtS8pl5c0d->nx = 13;
filtS8pl5c0d->ny = 13;
filtS8pl5c0d->cx = 6;  /* center at center pixel */
filtS8pl5c0d->cy = 6;
filtS8pl5c0d->data = matrix(filtS8pl5c0d->nx, filtS8pl5c0d->ny);
filtS8pl5c0d->data[0][0] = 0;
filtS8pl5c0d->data[0][4] = 1;
filtS8pl5c0d->data[0][8] = 2;
filtS8pl5c0d->data[0][12] = 0;
filtS8pl5c0d->data[4][0] = 1;
filtS8pl5c0d->data[4][4] = 2;
```

```
filtS8p15c0d->data[4][8] = 1;
filtS8p15c0d->data[4][12] = 2;
filtS8p15c0d->data[8][0] = 2;
filtS8p15c0d->data[8][4] = 1;
filtS8p15c0d->data[8][8] = 2;
filtS8p15c0d->data[8][12] = 1;
filtS8p15c0d->data[12][0] = 0;
filtS8p15c0d->data[12][4] = 2;
filtS8p15c0d->data[12][8] = 1;
filtS8p15c0d->data[12][12] = 0;


/************************************
 *    Cruciform 2-cycle filters
 ************************************/
    /* pattern match for 2 cycles in 2 dimensions of halftone frequency
     *  4 pix/cycle:
     *    000010000
     *    000000000
     *    000020000
     *    000000000
     *    102010201
     *    000000000
     *    000020000
     *    000000000
     *    000010000   */
filtC4p2c0d = (STREL *) calloc (1, sizeof (STREL));
filtC4p2c0d->nx = 9;
filtC4p2c0d->ny = 9;
filtC4p2c0d->cx = 4;  /* center at center pixel */
filtC4p2c0d->cy = 4;
filtC4p2c0d->data = matrix(filtC4p2c0d->nx, filtC4p2c0d->ny);
filtC4p2c0d->data[4][0] = 1;
filtC4p2c0d->data[4][2] = 2;
filtC4p2c0d->data[4][4] = 1;
filtC4p2c0d->data[4][6] = 2;
filtC4p2c0d->data[4][8] = 1;
filtC4p2c0d->data[0][4] = 1;
filtC4p2c0d->data[2][4] = 2;
filtC4p2c0d->data[6][4] = 2;
filtC4p2c0d->data[8][4] = 1;

    /* pattern match for 2 cycles in 2 dimensions of halftone frequency
     *  4 pix/cycle; inverted phase:
     *    000020000
     *    000000000
     *    000010000
     *    000000000
     *    201020102
     *    000000000
     *    000010000
     *    000000000
     *    000020000   */
filtC4p2c0dI = (STREL *) calloc (1, sizeof (STREL));
filtC4p2c0dI->nx = 9;
filtC4p2c0dI->ny = 9;
filtC4p2c0dI->cx = 4;  /* center at center pixel */
filtC4p2c0dI->cy = 4;
filtC4p2c0dI->data = matrix(filtC4p2c0dI->nx, filtC4p2c0dI->ny);
```

```
filtC4p2c0dI->data[4][0] = 2;
filtC4p2c0dI->data[4][2] = 1;
filtC4p2c0dI->data[4][4] = 2;
filtC4p2c0dI->data[4][6] = 1;
filtC4p2c0dI->data[4][8] = 2;
filtC4p2c0dI->data[0][4] = 2;
filtC4p2c0dI->data[2][4] = 1;
filtC4p2c0dI->data[6][4] = 1;
filtC4p2c0dI->data[8][4] = 2;

    /* pattern match for 2 cycles in 2 dimensions of halftone frequency
     *  4 pix/cycle, 14-degree rotation:
     *    000100000
     *    000000000
     *    000200000
     *    000000201
     *    000010000
     *    102000000
     *    000002000
     *    000000000
     *    000001000   */
filtC4p2c14d = (STREL *) calloc (1, sizeof (STREL));
filtC4p2c14d->nx = 9;
filtC4p2c14d->ny = 9;
filtC4p2c14d->cx = 4;  /* center at center pixel */
filtC4p2c14d->cy = 4;
filtC4p2c14d->data = matrix(filtC4p2c14d->nx, filtC4p2c14d->ny);
filtC4p2c14d->data[0][3] = 1;
filtC4p2c14d->data[2][3] = 2;
filtC4p2c14d->data[3][6] = 2;
filtC4p2c14d->data[3][8] = 1;
filtC4p2c14d->data[4][4] = 1;
filtC4p2c14d->data[5][0] = 1;
filtC4p2c14d->data[5][2] = 2;
filtC4p2c14d->data[6][5] = 2;
filtC4p2c14d->data[8][5] = 1;

    /* pattern match for 2 cycles in 2 dimensions of halftone frequency
     *  4 pix/cycle, 27-degree rotation:
     *    001000000
     *    000000000
     *    000200001
     *    000000200
     *    000010000
     *    002000000
     *    100002000
     *    000000000
     *    000000100   */
filtC4p2c27d = (STREL *) calloc (1, sizeof (STREL));
filtC4p2c27d->nx = 9;
filtC4p2c27d->ny = 9;
filtC4p2c27d->cx = 4;  /* center at center pixel */
filtC4p2c27d->cy = 4;
filtC4p2c27d->data = matrix(filtC4p2c27d->nx, filtC4p2c27d->ny);
filtC4p2c27d->data[2][0] = 1;
filtC4p2c27d->data[3][2] = 2;
filtC4p2c27d->data[4][4] = 1;
filtC4p2c27d->data[5][6] = 2;
filtC4p2c27d->data[6][8] = 1;
```

```
filtC4p2c27d->data[0][6] = 1;
filtC4p2c27d->data[2][5] = 2;
filtC4p2c27d->data[6][3] = 2;
filtC4p2c27d->data[8][2] = 1;

    /* pattern match for 2 cycles in 2 dimensions of halftone frequency
     *  4 pix/cycle, 27-degree rotation, inverted phase:
     *    002000000
     *    000000000
     *    000100002
     *    000000100
     *    000020000
     *    001000000
     *    200001000
     *    000000000
     *    000000200   */
filtC4p2c27dI = (STREL *) calloc (1, sizeof (STREL));
filtC4p2c27dI->nx = 9;
filtC4p2c27dI->ny = 9;
filtC4p2c27dI->cx = 4;  /* center at center pixel */
filtC4p2c27dI->cy = 4;
filtC4p2c27dI->data = matrix(filtC4p2c27dI->nx, filtC4p2c27dI->ny);
filtC4p2c27dI->data[2][0] = 2;
filtC4p2c27dI->data[3][2] = 1;
filtC4p2c27dI->data[4][4] = 2;
filtC4p2c27dI->data[5][6] = 1;
filtC4p2c27dI->data[6][8] = 2;
filtC4p2c27dI->data[0][6] = 2;
filtC4p2c27dI->data[2][5] = 1;
filtC4p2c27dI->data[6][3] = 1;
filtC4p2c27dI->data[8][2] = 2;

    /* pattern match for 2 cycles in 2 dimensions of halftone frequency
     *  4 pix/cycle, 45-degree rotation:
     *    1000001
     *    0020000
     *    0000020
     *    0001000
     *    0200000
     *    0000200
     *    1000001   */
filtC4p2c45d = (STREL *) calloc (1, sizeof (STREL));
filtC4p2c45d->nx = 7;
filtC4p2c45d->ny = 7;
filtC4p2c45d->cx = 3;  /* center at center pixel */
filtC4p2c45d->cy = 3;
filtC4p2c45d->data = matrix(filtC4p2c45d->nx, filtC4p2c45d->ny);
filtC4p2c45d->data[0][0] = 1;
filtC4p2c45d->data[0][6] = 1;
filtC4p2c45d->data[1][2] = 2;
filtC4p2c45d->data[2][5] = 2;
filtC4p2c45d->data[3][3] = 1;
filtC4p2c45d->data[4][1] = 2;
filtC4p2c45d->data[5][4] = 2;
filtC4p2c45d->data[6][0] = 1;
filtC4p2c45d->data[6][6] = 1;
```

```
/* pattern match for 2 cycles in 2 dimensions of halftone frequency
 *  5 pix/cycle:
 *    00000100000
 *    00000000000
 *    00000200000
 *    00000000000
 *    00000000000
 *    10200102001
 *    00000000000
 *    00000200000
 *    00000000000
 *    00000000000
 *    00000100000   */
filtC5p2c0d = (STREL *) calloc (1, sizeof (STREL));
filtC5p2c0d->nx = 11;
filtC5p2c0d->ny = 11;
filtC5p2c0d->cx = 5;  /* center at center pixel */
filtC5p2c0d->cy = 5;
filtC5p2c0d->data = matrix(filtC5p2c0d->nx, filtC5p2c0d->ny);
filtC5p2c0d->data[5][0] = 1;
filtC5p2c0d->data[5][2] = 2;
filtC5p2c0d->data[5][5] = 1;
filtC5p2c0d->data[5][7] = 2;
filtC5p2c0d->data[5][10] = 1;
filtC5p2c0d->data[0][5] = 1;
filtC5p2c0d->data[2][5] = 2;
filtC5p2c0d->data[7][5] = 2;
filtC5p2c0d->data[10][5] = 1;

/* pattern match for 2 cycles in 2 dimensions of halftone frequency
 *  5 pix/cycle, 22-degree rotation:
 *    00010000000
 *    00000000000
 *    00002000000
 *    00000000001
 *    00000000200
 *    00000100000
 *    00200000000
 *    10000000000
 *    00000020000
 *    00000000000
 *    00000001000  */
filtC5p2c22d = (STREL *) calloc (1, sizeof (STREL));
filtC5p2c22d->nx = 11;
filtC5p2c22d->ny = 11;
filtC5p2c22d->cx = 5;  /* center at center pixel */
filtC5p2c22d->cy = 5;
filtC5p2c22d->data = matrix(filtC5p2c22d->nx, filtC5p2c22d->ny);
filtC5p2c22d->data[0][3] = 1;
filtC5p2c22d->data[2][4] = 2;
filtC5p2c22d->data[3][10] = 1;
filtC5p2c22d->data[4][8] = 2;
filtC5p2c22d->data[5][5] = 1;
filtC5p2c22d->data[6][2] = 2;
filtC5p2c22d->data[7][0] = 1;
filtC5p2c22d->data[8][6] = 2;
filtC5p2c22d->data[10][7] = 1;
```

```
/* pattern match for 2 cycles in 2 dimensions of halftone frequency
 *  5 pix/cycle, 37-degree rotation:
 *     010000000
 *     000000001
 *     002000200
 *     000000000
 *     000010000
 *     000000000
 *     002000200
 *     100000000
 *     000000010    */
filtC5p2c37d = (STREL *) calloc (1, sizeof (STREL));
filtC5p2c37d->nx = 9;
filtC5p2c37d->ny = 9;
filtC5p2c37d->cx = 4;  /* center at center pixel */
filtC5p2c37d->cy = 4;
filtC5p2c37d->data = matrix(filtC5p2c37d->nx, filtC5p2c37d->ny);
filtC5p2c37d->data[0][1] = 1;
filtC5p2c37d->data[1][8] = 1;
filtC5p2c37d->data[2][2] = 2;
filtC5p2c37d->data[2][6] = 2;
filtC5p2c37d->data[4][4] = 1;
filtC5p2c37d->data[6][2] = 2;
filtC5p2c37d->data[6][6] = 2;
filtC5p2c37d->data[7][0] = 1;
filtC5p2c37d->data[8][7] = 1;

/* pattern match for 2 cycles in 2 dimensions of halftone frequency
 *  6 pix/cycle:
 *    0000001000000
 *        00000 (2)
 *    0000002000000
 *        00000 (2)
 *    1002001002001
 *        00000 (2)
 *    0000002000000
 *        00000 (2)
 *    0000001000000    */
filtC6p2c0d = (STREL *) calloc (1, sizeof (STREL));
filtC6p2c0d->nx = 13;
filtC6p2c0d->ny = 13;
filtC6p2c0d->cx = 6;  /* center at center pixel */
filtC6p2c0d->cy = 6;
filtC6p2c0d->data = matrix(filtC6p2c0d->nx, filtC6p2c0d->ny);
filtC6p2c0d->data[6][0] = 1;
filtC6p2c0d->data[6][3] = 2;
filtC6p2c0d->data[6][6] = 1;
filtC6p2c0d->data[6][9] = 2;
filtC6p2c0d->data[6][12] = 1;
filtC6p2c0d->data[0][6] = 1;
filtC6p2c0d->data[3][6] = 2;
filtC6p2c0d->data[9][6] = 2;
filtC6p2c0d->data[12][6] = 1;

/* pattern match for 2 cycles in 2 dimensions of halftone frequency
 *  6 pix/cycle, 18-degree rotation:
 *     0000100000000
 *     0000000000000
```

```
 *     0000000000000
 *     0000020000000
 *     0000000000001
 *     0000000002000
 *     0000001000000
 *     0002000000000
 *     1000000000000
 *     0000000200000
 *     0000000000000
 *     0000000000000
 *     0000000010000 */
filtC6p2c18d = (STREL *) calloc (1, sizeof (STREL));
filtC6p2c18d->nx = 13;
filtC6p2c18d->ny = 13;
filtC6p2c18d->cx = 6;  /* center at center pixel */
filtC6p2c18d->cy = 6;
filtC6p2c18d->data = matrix(filtC6p2c18d->nx, filtC6p2c18d->ny);
filtC6p2c18d->data[0][4] = 1;
filtC6p2c18d->data[3][5] = 2;
filtC6p2c18d->data[4][12] = 1;
filtC6p2c18d->data[5][9] = 2;
filtC6p2c18d->data[6][6] = 1;
filtC6p2c18d->data[7][3] = 2;
filtC6p2c18d->data[8][0] = 1;
filtC6p2c18d->data[9][7] = 2;
filtC6p2c18d->data[12][8] = 1;

    /* pattern match for 2 cycles in 2 dimensions of halftone frequency
     *  6 pix/cycle, 31-degree rotation:
     *     00100000000
     *     00000000000
     *     00002000001
     *     00000000000
     *     00000000200
     *     00000100000
     *     00200000000
     *     00000000000
     *     10000020000
     *     00000000000
     *     00000000100  */
filtC6p2c31d = (STREL *) calloc (1, sizeof (STREL));
filtC6p2c31d->nx = 11;
filtC6p2c31d->ny = 11;
filtC6p2c31d->cx = 5;  /* center at center pixel */
filtC6p2c31d->cy = 5;
filtC6p2c31d->data = matrix(filtC6p2c31d->nx, filtC6p2c31d->ny);
filtC6p2c31d->data[0][2] = 1;
filtC6p2c31d->data[2][4] = 2;
filtC6p2c31d->data[2][10] = 1;
filtC6p2c31d->data[4][8] = 2;
filtC6p2c31d->data[5][5] = 1;
filtC6p2c31d->data[6][2] = 2;
filtC6p2c31d->data[8][0] = 1;
filtC6p2c31d->data[8][6] = 2;
filtC6p2c31d->data[10][8] = 1;

    /* pattern match for 2 cycles in 2 dimensions of halftone frequency
     *  6 pix/cycle, 45-degree rotation:
```

```
 *     100000001
 *     000000000
 *     002000200
 *     000000000
 *     000010000
 *     000000000
 *     002000200
 *     000000000
 *     100000001    */
filtC6p2c45d = (STREL *) calloc (1, sizeof (STREL));
filtC6p2c45d->nx = 9;
filtC6p2c45d->ny = 9;
filtC6p2c45d->cx = 4;  /* center at center pixel */
filtC6p2c45d->cy = 4;
filtC6p2c45d->data = matrix(filtC6p2c45d->nx, filtC6p2c45d->ny);
filtC6p2c45d->data[0][0] = 1;
filtC6p2c45d->data[0][8] = 1;
filtC6p2c45d->data[2][2] = 2;
filtC6p2c45d->data[2][6] = 2;
filtC6p2c45d->data[4][4] = 1;
filtC6p2c45d->data[6][2] = 2;
filtC6p2c45d->data[6][6] = 2;
filtC6p2c45d->data[8][0] = 1;
filtC6p2c45d->data[8][8] = 1;

    /* pattern match for 2 cycles in 2 dimensions of halftone frequency
     *  7 pix/cycle:
     *    000000010000000
     *         00000 (2)
     *    000000020000000
     *         00000 (3)
     *    100200010020001
     *         00000 (2)
     *    000000020000000
     *         00000 (3)
     *    000000010000000    */
filtC7p2c0d = (STREL *) calloc (1, sizeof (STREL));
filtC7p2c0d->nx = 15;
filtC7p2c0d->ny = 15;
filtC7p2c0d->cx = 7;  /* center at center pixel */
filtC7p2c0d->cy = 7;
filtC7p2c0d->data = matrix(filtC7p2c0d->nx, filtC7p2c0d->ny);
filtC7p2c0d->data[7][0] = 1;
filtC7p2c0d->data[7][3] = 2;
filtC7p2c0d->data[7][7] = 1;
filtC7p2c0d->data[7][10] = 2;
filtC7p2c0d->data[7][14] = 1;
filtC7p2c0d->data[0][7] = 1;
filtC7p2c0d->data[3][7] = 2;
filtC7p2c0d->data[10][7] = 2;
filtC7p2c0d->data[14][7] = 1;

    /* pattern match for 2 cycles in 2 dimensions of halftone frequency
     *  7 pix/cycle at 27-degrees rotation:
     *    0001000000000
     *    0000000000000
     *    0000000000000
     *    0000020000001
     *    0000000000000
```

```
 *    0000000002000
 *    0000001000000
 *    0002000000000
 *    0000000000000
 *    1000000200000
 *    0000000000000
 *    0000000000000
 *    0000000001000  */
filtC7p2c27d = (STREL *) calloc (1, sizeof (STREL));
filtC7p2c27d->nx = 13;
filtC7p2c27d->ny = 13;
filtC7p2c27d->cx = 6;  /* center at center pixel */
filtC7p2c27d->cy = 6;
filtC7p2c27d->data = matrix(filtC7p2c27d->nx, filtC7p2c27d->ny);
filtC7p2c27d->data[0][3] = 1;
filtC7p2c27d->data[3][5] = 2;
filtC7p2c27d->data[3][12] = 1;
filtC7p2c27d->data[5][9] = 2;
filtC7p2c27d->data[6][6] = 1;
filtC7p2c27d->data[7][3] = 2;
filtC7p2c27d->data[9][0] = 1;
filtC7p2c27d->data[9][7] = 2;
filtC7p2c27d->data[12][9] = 1;

   /* pattern match for 2 cycles in 2 dimensions of halftone frequency
    *  7 pix/cycle at 34-degrees rotation:
    *    0010000000000
    *    0000000000000
    *    0000000000001
    *    0000200000000
    *    0000000002000
    *    0000000000000
    *    0000001000000
    *    0000000000000
    *    0002000000000
    *    0000000020000
    *    1000000000000
    *    0000000000000
    *    0000000000100  */
filtC7p2c34d = (STREL *) calloc (1, sizeof (STREL));
filtC7p2c34d->nx = 13;
filtC7p2c34d->ny = 13;
filtC7p2c34d->cx = 6;  /* center at center pixel */
filtC7p2c34d->cy = 6;
filtC7p2c34d->data = matrix(filtC7p2c34d->nx, filtC7p2c34d->ny);
filtC7p2c34d->data[0][2] = 1;
filtC7p2c34d->data[2][12] = 1;
filtC7p2c34d->data[3][4] = 2;
filtC7p2c34d->data[4][9] = 2;
filtC7p2c34d->data[6][6] = 1;
filtC7p2c34d->data[8][3] = 2;
filtC7p2c34d->data[9][8] = 2;
filtC7p2c34d->data[10][0] = 1;
filtC7p2c34d->data[12][10] = 1;

   /* pattern match for 2 cycles in 2 dimensions of halftone frequency
    *  7 pix/cycle, 45-degree rotation:
    *     10000000001
    *     00000000000
```

```
 *     00020000000
 *     00000000200
 *     00000000000
 *     00000100000
 *     00000000000
 *     00200000000
 *     00000002000
 *     00000000000
 *     10000000001  */
filtC7p2c45d = (STREL *) calloc (1, sizeof (STREL));
filtC7p2c45d->nx = 11;
filtC7p2c45d->ny = 11;
filtC7p2c45d->cx = 5;  /* center at center pixel */
filtC7p2c45d->cy = 5;
filtC7p2c45d->data = matrix(filtC7p2c45d->nx, filtC7p2c45d->ny);
filtC7p2c45d->data[0][0] = 1;
filtC7p2c45d->data[0][10] = 1;
filtC7p2c45d->data[2][3] = 2;
filtC7p2c45d->data[3][8] = 2;
filtC7p2c45d->data[5][5] = 1;
filtC7p2c45d->data[7][2] = 2;
filtC7p2c45d->data[8][7] = 2;
filtC7p2c45d->data[10][0] = 1;
filtC7p2c45d->data[10][10] = 1;

    /* pattern match for 2 cycles in 2 dimensions of halftone frequency
     *  8 pix/cycle:                  (0-degree, normal cruciform)
     *    00000000100000000
     *          000000 (3)
     *    00000000200000000
     *          000000 (3)
     *    10002000100020001
     *          000000 (3)
     *    00000000200000000
     *          000000 (3)
     *    00000000100000000   */
filtC8p2c0d = (STREL *) calloc (1, sizeof (STREL));
filtC8p2c0d->nx = 17;
filtC8p2c0d->ny = 17;
filtC8p2c0d->cx = 8;  /* center at center pixel */
filtC8p2c0d->cy = 8;
filtC8p2c0d->data = matrix(filtC8p2c0d->nx, filtC8p2c0d->ny);
filtC8p2c0d->data[8][0] = 1;
filtC8p2c0d->data[8][4] = 2;
filtC8p2c0d->data[8][8] = 1;
filtC8p2c0d->data[8][12] = 2;
filtC8p2c0d->data[8][16] = 1;
filtC8p2c0d->data[0][8] = 1;
filtC8p2c0d->data[4][8] = 2;
filtC8p2c0d->data[12][8] = 2;
filtC8p2c0d->data[16][8] = 1;

    /* pattern match for 2 cycles in 2 dimensions of halftone frequency
     *  8 pix/cycle:                  (23-degree, rotated cruciform)
     *    000010000000000
     *    000000000000000
     *    000000000000000
     *    000000000000000
     *    000000200000001
```

```
 *    000000000000000
 *    000000000020000
 *    000000010000000
 *    000020000000000
 *    000000000000000
 *    100000002000000
 *    000000000000000
 *    000000000000000
 *    000000000000000
 *    000000000010000  */
filtC8p2c23d = (STREL *) calloc (1, sizeof (STREL));
filtC8p2c23d->nx = 15;
filtC8p2c23d->ny = 15;
filtC8p2c23d->cx = 7;  /* center at center pixel */
filtC8p2c23d->cy = 7;
filtC8p2c23d->data = matrix(filtC8p2c23d->nx, filtC8p2c23d->ny);
filtC8p2c23d->data[0][4] = 1;
filtC8p2c23d->data[4][6] = 2;
filtC8p2c23d->data[4][14] = 1;
filtC8p2c23d->data[6][10] = 2;
filtC8p2c23d->data[7][7] = 1;
filtC8p2c23d->data[8][4] = 2;
filtC8p2c23d->data[10][0] = 1;
filtC8p2c23d->data[10][8] = 2;
filtC8p2c23d->data[14][10] = 1;

    /* pattern match for 2 cycles in 2 dimensions of halftone frequency
     *  8 pix/cycle:                     (30-degree, rotated cruciform)
     *    000100000000000
     *    000000000000000
     *    000000000000000
     *    000002000000001
     *    000000000000000
     *    000000000002000
     *    000000000000000
     *    000000010000000
     *    000000000000000
     *    000200000000000
     *    000000000000000
     *    100000000200000
     *    000000000000000
     *    000000000000000
     *    000000000001000  */
filtC8p2c30d = (STREL *) calloc (1, sizeof (STREL));
filtC8p2c30d->nx = 15;
filtC8p2c30d->ny = 15;
filtC8p2c30d->cx = 7;  /* center at center pixel */
filtC8p2c30d->cy = 7;
filtC8p2c30d->data = matrix(filtC8p2c30d->nx, filtC8p2c30d->ny);
filtC8p2c30d->data[0][3] = 1;
filtC8p2c30d->data[3][5] = 2;
filtC8p2c30d->data[3][14] = 1;
filtC8p2c30d->data[5][11] = 2;
filtC8p2c30d->data[7][7] = 1;
filtC8p2c30d->data[9][3] = 2;
filtC8p2c30d->data[11][0] = 1;
filtC8p2c30d->data[11][9] = 2;
filtC8p2c30d->data[14][11] = 1;
```

```
/* pattern match for 2 cycles in 2 dimensions of halftone frequency
 *  8 pix/cycle at 45-degrees rotation:
 *    1000000000001
 *    0000000000000
 *    0000000000000
 *    0002000002000
 *    0000000000000
 *    0000000000000
 *    0000001000000
 *    0000000000000
 *    0000000000000
 *    0002000002000
 *    0000000000000
 *    0000000000000
 *    1000000000001  */
filtC8p2c45d = (STREL *) calloc (1, sizeof (STREL));
filtC8p2c45d->nx = 13;
filtC8p2c45d->ny = 13;
filtC8p2c45d->cx = 6;  /* center at center pixel */
filtC8p2c45d->cy = 6;
filtC8p2c45d->data = matrix(filtC8p2c45d->nx, filtC8p2c45d->ny);
filtC8p2c45d->data[0][0] = 1;
filtC8p2c45d->data[0][12] = 1;
filtC8p2c45d->data[3][3] = 2;
filtC8p2c45d->data[3][9] = 2;
filtC8p2c45d->data[6][6] = 1;
filtC8p2c45d->data[9][3] = 2;
filtC8p2c45d->data[9][9] = 2;
filtC8p2c45d->data[12][0] = 1;
filtC8p2c45d->data[12][12] = 1;

    /* pattern match for 1 cycle in 2 dimensions at 8 pix/cycle
     * with 30-degree, rotated cruciform:
     *    002000000
     *        0
     *    000000002
     *        0
     *    000010000
     *        0
     *    200000000
     *        0
     *    000000200   */
filtC8p1c30d = (STREL *) calloc (1, sizeof (STREL));
filtC8p1c30d->nx = 9;
filtC8p1c30d->ny = 9;
filtC8p1c30d->cx = 4;  /* center at center pixel */
filtC8p1c30d->cy = 4;
filtC8p1c30d->data = matrix(filtC8p1c30d->nx, filtC8p1c30d->ny);
filtC8p1c30d->data[0][2] = 2;
filtC8p1c30d->data[4][4] = 1;
filtC8p1c30d->data[8][6] = 2;
filtC8p1c30d->data[6][0] = 2;
filtC8p1c30d->data[2][8] = 2;


/*****************************
 *   wide bandpass 2-d filters
 *****************************/
```

```
/* pattern match for 1 cycle, wideBP, halftone frequency 3 pix/cycle,
 *                    rotation 18 degrees.
 *    00010
 *    10000
 *    00200
 *    00001
 *    01000  */
filtL3p1c18d = (STREL *) calloc (1, sizeof (STREL));
filtL3p1c18d->nx = 5;
filtL3p1c18d->ny = 5;
filtL3p1c18d->cx = 2;  /* center pixel */
filtL3p1c18d->cy = 2;
filtL3p1c18d->data = matrix(filtL3p1c18d->nx, filtL3p1c18d->ny);
filtL3p1c18d->data[0][3] = 1;
filtL3p1c18d->data[1][0] = 1;
filtL3p1c18d->data[2][2] = 2;
filtL3p1c18d->data[3][4] = 1;
filtL3p1c18d->data[4][1] = 1;

/* pattern match for 1 cycle, wideBP, halftone frequency 3 pix/cycle,
 *                    rotation 45 degrees.
 *    00100
 *    00000
 *    10201
 *    00000
 *    00100  */
filtL3p1c45d = (STREL *) calloc (1, sizeof (STREL));
filtL3p1c45d->nx = 5;
filtL3p1c45d->ny = 5;
filtL3p1c45d->cx = 2;  /* center pixel */
filtL3p1c45d->cy = 2;
filtL3p1c45d->data = matrix(filtL3p1c45d->nx, filtL3p1c45d->ny);
filtL3p1c45d->data[0][2] = 1;
filtL3p1c45d->data[2][0] = 1;
filtL3p1c45d->data[2][2] = 2;
filtL3p1c45d->data[2][4] = 1;
filtL3p1c45d->data[4][2] = 1;

/* pattern match for 1 cycle, wideBP, halftone frequency 4 pix/cycle,
 *                    rotation 0 degrees.
 *              Should also work well for 5 pix/cycle.
 *    10001
 *    00000
 *    00200
 *    00000
 *    10001  */
filtL4p1c0d = (STREL *) calloc (1, sizeof (STREL));
filtL4p1c0d->nx = 5;
filtL4p1c0d->ny = 5;
filtL4p1c0d->cx = 2;  /* center pixel */
filtL4p1c0d->cy = 2;
filtL4p1c0d->data = matrix(filtL4p1c0d->nx, filtL4p1c0d->ny);
filtL4p1c0d->data[0][0] = 1;
filtL4p1c0d->data[0][4] = 1;
filtL4p1c0d->data[2][2] = 2;
filtL4p1c0d->data[4][0] = 1;
filtL4p1c0d->data[4][4] = 1;
```

```
/* pattern match for 1 cycle, wideBP, halftone frequency 4 pix/cycle,
 *              rotation 27 deg
 *    0000100
 *    0000000
 *    1000000
 *    0002000
 *    0000001
 *    0000000
 *    0010000  */
filtL4plc27d = (STREL *) calloc (1, sizeof (STREL));
filtL4plc27d->nx = 7;
filtL4plc27d->ny = 7;
filtL4plc27d->cx = 3;  /* center pixel */
filtL4plc27d->cy = 3;
filtL4plc27d->data = matrix(filtL4plc27d->nx, filtL4plc27d->ny);
filtL4plc27d->data[0][4] = 1;
filtL4plc27d->data[2][0] = 1;
filtL4plc27d->data[3][3] = 2;
filtL4plc27d->data[4][6] = 1;
filtL4plc27d->data[6][2] = 1;

/* pattern match for 1 cycle, wideBP, halftone frequency 4 pix/cycle,
 *              rotation 45 degrees
 *          Should also work well for 5 pix/cycle.
 *    0001000
 *    0000000
 *    0000000
 *    1002001
 *    0000000
 *    0000000
 *    0001000  */
filtL4plc45d = (STREL *) calloc (1, sizeof (STREL));
filtL4plc45d->nx = 7;
filtL4plc45d->ny = 7;
filtL4plc45d->cx = 3;  /* center pixel */
filtL4plc45d->cy = 3;
filtL4plc45d->data = matrix(filtL4plc45d->nx, filtL4plc45d->ny);
filtL4plc45d->data[0][3] = 1;
filtL4plc45d->data[3][0] = 1;
filtL4plc45d->data[3][3] = 2;
filtL4plc45d->data[3][6] = 1;
filtL4plc45d->data[6][3] = 1;

/* pattern match for 1 cycle, wideBP, halftone frequency 5 pix/cycle,
 *              rotation 11 deg
 *    0000010
 *    1000000
 *    0000000
 *    0002000
 *    0000000
 *    0000001
 *    0100000  */
filtL5plc11d = (STREL *) calloc (1, sizeof (STREL));
filtL5plc11d->nx = 7;
filtL5plc11d->ny = 7;
filtL5plc11d->cx = 3;  /* center pixel */
filtL5plc11d->cy = 3;
filtL5plc11d->data = matrix(filtL5plc11d->nx, filtL5plc11d->ny);
filtL5plc11d->data[0][5] = 1;
```

```
filtL5plc11d->data[1][0] = 1;
filtL5plc11d->data[3][3] = 2;
filtL5plc11d->data[5][6] = 1;
filtL5plc11d->data[6][1] = 1;

    /* pattern match for 1 cycle, wideBP, halftone frequency 6 pix/cycle,
     *              rotation 0 degrees
     *             Should also work well for 5 and 7 pix/cycle.
     *    1000001
     *    0000000
     *    0000000
     *    0002000
     *    0000000
     *    0000000
     *    1000001  */
filtL6plc0d = (STREL *) calloc (1, sizeof (STREL));
filtL6plc0d->nx = 7;
filtL6plc0d->ny = 7;
filtL6plc0d->cx = 3;  /* center pixel */
filtL6plc0d->cy = 3;
filtL6plc0d->data = matrix(filtL6plc0d->nx, filtL6plc0d->ny);
filtL6plc0d->data[0][0] = 1;
filtL6plc0d->data[0][6] = 1;
filtL6plc0d->data[3][3] = 2;
filtL6plc0d->data[6][0] = 1;
filtL6plc0d->data[6][6] = 1;

    /* pattern match for 1 cycle, wideBP, halftone frequency 6 pix/cycle,
     *                 rotation 18 degrees
     *    000000100
     *    000000000
     *    100000000
     *    000000000
     *    000020000
     *    000000000
     *    000000001
     *    000000000
     *    001000000  */
filtL6plc18d = (STREL *) calloc (1, sizeof (STREL));
filtL6plc18d->nx = 9;
filtL6plc18d->ny = 9;
filtL6plc18d->cx = 4;  /* center pixel */
filtL6plc18d->cy = 4;
filtL6plc18d->data = matrix(filtL6plc18d->nx, filtL6plc18d->ny);
filtL6plc18d->data[0][6] = 1;
filtL6plc18d->data[2][0] = 1;
filtL6plc18d->data[4][4] = 2;
filtL6plc18d->data[6][8] = 1;
filtL6plc18d->data[8][2] = 1;

    /* pattern match for 1 cycle, wideBP, halftone frequency 6 pix/cycle,
     *                 rotation 31 degrees
     *    000001000
     *    000000000
     *    000000000
     *    100000000
     *    000020000
     *    000000001
     *    000000000
```

```
 *    000000000
 *    000100000  */
filtL6p1c31d = (STREL *) calloc (1, sizeof (STREL));
filtL6p1c31d->nx = 9;
filtL6p1c31d->ny = 9;
filtL6p1c31d->cx = 4;  /* center pixel */
filtL6p1c31d->cy = 4;
filtL6p1c31d->data = matrix(filtL6p1c31d->nx, filtL6p1c31d->ny);
filtL6p1c31d->data[0][5] = 1;
filtL6p1c31d->data[3][0] = 1;
filtL6p1c31d->data[4][4] = 2;
filtL6p1c31d->data[5][8] = 1;
filtL6p1c31d->data[8][3] = 1;

    /* pattern match for 1 cycle, wideBP, halftone frequency 6 pix/cycle,
     *                    rotation 45 degrees
     *    000010000
     *    000000000
     *    000000000
     *    000000000
     *    100020001
     *    000000000
     *    000000000
     *    000000000
     *    000010000  */
filtL6p1c45d = (STREL *) calloc (1, sizeof (STREL));
filtL6p1c45d->nx = 9;
filtL6p1c45d->ny = 9;
filtL6p1c45d->cx = 4;  /* center pixel */
filtL6p1c45d->cy = 4;
filtL6p1c45d->data = matrix(filtL6p1c45d->nx, filtL6p1c45d->ny);
filtL6p1c45d->data[0][4] = 1;
filtL6p1c45d->data[4][0] = 1;
filtL6p1c45d->data[4][4] = 2;
filtL6p1c45d->data[4][8] = 1;
filtL6p1c45d->data[8][4] = 1;

    /* pattern match for 1 cycle, wideBP, halftone frequency 7 pix/cycle,
     *                    rotation 8 degrees
     *    000000010
     *    100000000
     *    000000000
     *    000000000
     *    000020000
     *    000000000
     *    000000000
     *    000000001
     *    010000000  */
filtL7p1c8d = (STREL *) calloc (1, sizeof (STREL));
filtL7p1c8d->nx = 9;
filtL7p1c8d->ny = 9;
filtL7p1c8d->cx = 4;  /* center pixel */
filtL7p1c8d->cy = 4;
filtL7p1c8d->data = matrix(filtL7p1c8d->nx, filtL7p1c8d->ny);
filtL7p1c8d->data[0][7] = 1;
filtL7p1c8d->data[1][0] = 1;
filtL7p1c8d->data[4][4] = 2;
filtL7p1c8d->data[7][8] = 1;
filtL7p1c8d->data[8][1] = 1;
```

```
    /* pattern match for 1 cycle, wideBP, halftone frequency 7 pix/cycle,
     *                    rotation 34 degrees
     *    00000010000
     *    00000000000
     *    00000000000
     *    00000000000
     *    10000000000
     *    00000200000
     *    00000000001
     *    00000000000
     *    00000000000
     *    00000000000
     *    00001000000  */
filtL7plc34d = (STREL *) calloc (1, sizeof (STREL));
filtL7plc34d->nx = 11;
filtL7plc34d->ny = 11;
filtL7plc34d->cx = 5;  /* center pixel */
filtL7plc34d->cy = 5;
filtL7plc34d->data = matrix(filtL7plc34d->nx, filtL7plc34d->ny);
filtL7plc34d->data[0][6] = 1;
filtL7plc34d->data[4][0] = 1;
filtL7plc34d->data[5][5] = 2;
filtL7plc34d->data[6][10] = 1;
filtL7plc34d->data[10][4] = 1;

    /* pattern match for 1 cycle, wideBP, halftone frequency 7 pix/cycle,
     *                    rotation 45 degrees
     *    00000100000
     *       00000 (4)
     *    10000200001
     *       00000 (4)
     *    00000100000  */
filtL7plc45d = (STREL *) calloc (1, sizeof (STREL));
filtL7plc45d->nx = 11;
filtL7plc45d->ny = 11;
filtL7plc45d->cx = 5;  /* center pixel */
filtL7plc45d->cy = 5;
filtL7plc45d->data = matrix(filtL7plc45d->nx, filtL7plc45d->ny);
filtL7plc45d->data[0][5] = 1;
filtL7plc45d->data[5][0] = 1;
filtL7plc45d->data[5][5] = 2;
filtL7plc45d->data[5][10] = 1;
filtL7plc45d->data[10][5] = 1;

    /* pattern match for 1 cycle, wideBP, halftone frequency 8 pix/cycle,
     *                       rotation 0 degrees.
     *    100000001
     *      00000 (3)
     *    000020000
     *      00000 (3)
     *    100000001  */
filtL8plc0d = (STREL *) calloc (1, sizeof (STREL));
filtL8plc0d->nx = 9;
filtL8plc0d->ny = 9;
filtL8plc0d->cx = 4;  /* center pixel */
filtL8plc0d->cy = 4;
filtL8plc0d->data = matrix(filtL8plc0d->nx, filtL8plc0d->ny);
filtL8plc0d->data[0][0] = 1;
filtL8plc0d->data[0][8] = 1;
```

```
filtL8plc0d->data[4][4] = 2;
filtL8plc0d->data[8][0] = 1;
filtL8plc0d->data[8][8] = 1;

    /* pattern match for 1 cycle, wideBP, halftone frequency 8 pix/cycle,
     *                        rotation 14 degrees
     *    00000000100
     *    00000000000
     *    10000000000
     *    00000000000
     *    00000000000
     *    00000200000
     *    00000000000
     *    00000000000
     *    00000000001
     *    00000000000
     *    00100000000  */
filtL8plc14d = (STREL *) calloc (1, sizeof (STREL));
filtL8plc14d->nx = 11;
filtL8plc14d->ny = 11;
filtL8plc14d->cx = 5;  /* center pixel */
filtL8plc14d->cy = 5;
filtL8plc14d->data = matrix(filtL8plc14d->nx, filtL8plc14d->ny);
filtL8plc14d->data[0][8] = 1;
filtL8plc14d->data[2][0] = 1;
filtL8plc14d->data[5][5] = 2;
filtL8plc14d->data[8][10] = 1;
filtL8plc14d->data[10][2] = 1;

    /* pattern match for 1 cycle, wideBP, halftone frequency 8 pix/cycle,
     *                        rotation 23 degrees.
     *    00000001000
     *    00000000000
     *    00000000000
     *    10000000000
     *    00000000000
     *    00000200000
     *    00000000000
     *    00000000001
     *    00000000000
     *    00000000000
     *    00010000000  */
filtL8plc23d = (STREL *) calloc (1, sizeof (STREL));
filtL8plc23d->nx = 11;
filtL8plc23d->ny = 11;
filtL8plc23d->cx = 5;  /* center pixel */
filtL8plc23d->cy = 5;
filtL8plc23d->data = matrix(filtL8plc23d->nx, filtL8plc23d->ny);
filtL8plc23d->data[0][7] = 1;
filtL8plc23d->data[3][0] = 1;
filtL8plc23d->data[5][5] = 2;
filtL8plc23d->data[7][10] = 1;
filtL8plc23d->data[10][3] = 1;

    /* pattern match for 1 cycle, wideBP. halftone frequency 8 pix/cycle,
     *                        rotation 45 degrees.
     *    0000001000000
     *       000000 (5)
     *    1000002000001
```

```
 *      000000 (5)
 *      0000001000000   */
filtL8p1c45d = (STREL *) calloc (1, sizeof (STREL));
filtL8p1c45d->nx = 13;
filtL8p1c45d->ny = 13;
filtL8p1c45d->cx = 6;   /* center pixel */
filtL8p1c45d->cy = 6;
filtL8p1c45d->data = matrix(filtL8p1c45d->nx, filtL8p1c45d->ny);
filtL8p1c45d->data[0][6] = 1;
filtL8p1c45d->data[6][0] = 1;
filtL8p1c45d->data[6][6] = 2;
filtL8p1c45d->data[6][12] = 1;
filtL8p1c45d->data[12][6] = 1;

HTLFiltArray = (STREL **) calloc (N_HTL_FILT, sizeof (STREL *));
HTLFiltArray[0] = filtL3p1c18d;
HTLFiltArray[1] = filtL3p1c45d;
HTLFiltArray[2] = filtL4p1c0d;
HTLFiltArray[3] = filtL4p1c27d;
HTLFiltArray[4] = filtL4p1c45d;
HTLFiltArray[5] = filtL5p1c11d;
HTLFiltArray[6] = filtL6p1c0d;
HTLFiltArray[7] = filtL6p1c18d;
HTLFiltArray[8] = filtL6p1c31d;
HTLFiltArray[9] = filtL6p1c45d;
HTLFiltArray[10] = filtL7p1c8d;
HTLFiltArray[11] = filtL7p1c34d;
HTLFiltArray[12] = filtL7p1c45d;
HTLFiltArray[13] = filtL8p1c0d;
HTLFiltArray[14] = filtL8p1c14d;
HTLFiltArray[15] = filtL8p1c23d;
HTLFiltArray[16] = filtL8p1c45d;

HTFiltArray = (STREL **) calloc (N_HT_FILT, sizeof (STREL *));
HTFiltArray[0] = filtC4p2c0d;
HTFiltArray[1] = filtC4p2c0dI;
HTFiltArray[2] = filtC4p2c14d;
HTFiltArray[3] = filtC4p2c27d;
HTFiltArray[4] = filtC4p2c45d;
HTFiltArray[5] = filtC5p2c0d;
HTFiltArray[6] = filtC5p2c22d;
HTFiltArray[7] = filtC5p2c37d;
HTFiltArray[8] = filtC6p2c0d;
HTFiltArray[9] = filtC6p2c18d;
HTFiltArray[10] = filtC6p2c31d;
HTFiltArray[11] = filtC6p2c45d;
HTFiltArray[12] = filtC7p2c0d;
HTFiltArray[13] = filtC7p2c27d;
HTFiltArray[14] = filtC7p2c45d;
HTFiltArray[15] = filtC8p2c0d;
HTFiltArray[16] = filtC8p2c23d;
HTFiltArray[17] = filtC8p2c45d;
```

/**************************************************************
 *  Copyright (c) 1988, Xerox Corporation.  All rights reserved. *
    Copyright protection claimed includes all forms and matters
    of copyrightable material and information now allowed by
    statutory or judicial law or hereafter granted, including
    without limitation, material generated from the software
    programs which are displayed on the screen such as icons,
    screen display looks, etc.
 **************************************************************/

```
/*
 *  integerOpsAlp.c--includes subroutines
 *                  intStatsMenuProc()
 *                  intStatsCmd()
 *                  graphStats()
 *             --contains procedures that map from the
 *                      image to other domains:
 *                  equalPr()   returns 1 if two pr are identical; 2 args.
 *                  equalPrA()   returns 1 if two pr are identical; 3 args.
 *                  equalPrD()   returns 1 if two pr are identical; 2 args.
 *                  zeroPr()   returns 1 if pr is zero
 *                  numberPr()  returns number of ON pixels
 *                                  or number of non-zero words
 *                  makeSumPixelTab()
 *                  sumPixels()
 *                  onPixelsInRow()
 *                  onPixelsInEachRow()
 *                  extremeOnPixelInRow()
 */

#include <stdio.h>
#include <llama.h>
#include <imageReps.h>
#include "alp.h"
#include "morph.h"
#include "alpStrels.h"
#include "graphA.h"

#define  FAST_PIXEL_COUNT        1
#define  SLOW_PIXEL_COUNT        0

#define  ROW_SUMS                0
#define  COLUMN_SUMS             1
#define  ROW_TRANSITIONS         2
#define  COLUMN_TRANSITIONS      3

static unsigned short int     *tabSumPixel = NULL;
static unsigned short int     *sumRowPixels = NULL;
static unsigned short int     *sumColumnPixels = NULL;
static unsigned short int     *sumRowTransPixels = NULL;
static unsigned short int     *sumColTransPixels = NULL;
static int                     scanlines, bytesPerLine;
static char                    message[50];


void
intStatsMenuProc(item, event)
Panel_item     item;
Event         *event;
{
```

```
int             selection;
static Menu     intStatsMenu;
void            intStatsCmd();

    if (!intStatsMenu)
        intStatsMenu = menu_create(MENU_STRINGS,
                                "Is pr zero?",
                                "Count pixels in pr",
                                "Count non-zero words in pr",
                                "Compute new integer stats",
                                "Show row pixel stats",
                                "Show column pixel stats",
                                "Show row transition stats",
                                "Show column transition stats", 0,
                               0);

    selection = (int) menu_show(intStatsMenu, mainControlPanel, event, 0);
    intStatsCmd(item, selection, event);
}


/*
 *  intStatsCmd():  computes or shows integer statistics for a pixrect.
 */
void
intStatsCmd(intStatsItem, selection, event)
Panel_item          intStatsItem;
int                 selection;
Event              *event;
{
int                 i, n;

    if (!selection)
        return;

    if (!chosenPixrect)
    {
        strcpy(message, "  No chosen pixrect!");
        textsw_insert(mainTextSw, message, strlen(message));
        return;
    }

    switch (selection)
    {  /* Choose integer operations on pixrects */
    case 1:  /* Is pr = 0 */
        if (zeroPr(chosenPixrect))
        {
            strcpy(message, "\n  Pixrect has no ON pixels\n");;
            textsw_insert(mainTextSw, message, strlen(message));
        }
        else
        {
            strcpy(message, "\n  Pixrect has ON pixels\n");;
            textsw_insert(mainTextSw, message, strlen(message));
        }
        break;
    case 2:  /* Count pixels in pr */
        n = numberPr(chosenPixrect, PIXELS);
        sprintf(message, "\n %d ON pixels in pixrect\n", n);
        textsw_insert(mainTextSw, message, strlen(message));
```

```
        break;
    case 3:  /* Count non-zero words in pr */
        n = numberPr(chosenPixrect, WORDS);
        sprintf(message, "\n %d non-zero words in pixrect\n", n);
        textsw_insert(mainTextSw, message, strlen(message));
        break;
    case 4:  /* Compute integer stats */
        sumPixels(chosenPixrect);
        break;
    case 5:  /* Show row pixel stats */
        graphStats(ROW_SUMS);
        break;
    case 6:  /* Show column pixel byte stats */
        graphStats(COLUMN_SUMS);
        break;
    case 7:  /* Show row pixel transition stats */
        graphStats(ROW_TRANSITIONS);
        break;
    case 8:  /* Show column pixel transition stats */
        graphStats(COLUMN_TRANSITIONS);
        break;
    default:
        printf(" Error in intStatsCmd: unknown selection\n");
    }

    textsw_insert(mainTextSw, message, strlen(message));
}


/*
 *  graphStats():  plots specified row or column statistics
 *                 assumes that there exist global variables:
 *                    chosenPixrect, chosenPixwin
 *                 if there is no chosenPixwin, then it takes
 *                    statistics from the chosenPixrect.
 */
graphStats(type)
int            type;
{
int            i;
DATA          *data, *graphInit();
static char    procName[] = "graphStats";

    if (!isPrDefined(chosenPixrect))
        return;

    if (type == ROW_SUMS)
    {
        data = graphInit();
        graphPutTitle(data, "Sum of ON pixels in each row");
        if (!sumRowPixels)
            sumPixels(chosenPixrect);
        for (i = 0; i < scanlines; i++)
            graphPutData(data, i, sumRowPixels[i]);
    }
    else if (type == COLUMN_SUMS)
    {
        data = graphInit();
        graphPutTitle(data, "Sum of ON pixels in each byte column");
```

```
        if (!sumColumnPixels)
            sumPixels(chosenPixrect);
        for (i = 0; i < bytesPerLine; i++)
            graphPutData(data, i, sumColumnPixels[i]);
    }
    else if (type == ROW_TRANSITIONS)
    {
        data = graphInit();
        graphPutTitle(data, "Sum of pixel transitions in each row");
        if (!sumRowTransPixels)
            sumPixels(chosenPixrect);
        for (i = 0; i < scanlines; i++)
            graphPutData(data, i, sumRowTransPixels[i]);
    }
    else if (type == COLUMN_TRANSITIONS)
    {
        data = graphInit();
        graphPutTitle(data, "Sum of pixel transitions in each byte column");
        if (!sumColTransPixels)
            sumPixels(chosenPixrect);
        for (i = 0; i < bytesPerLine; i++)
            graphPutData(data, i, sumColTransPixels[i]);
    }

    graphMake(data);
}


/*
 *  equalPr():  returns 1 if the two pixrects are identical; zero otherwise.
 *              creates a temporary pixrect.
 */
int
equalPr(pixr1, pixr2)
Pixrect     *pixr1, *pixr2;
{
int          w, h, eq;
Pixrect     *prT;
static char  procName[] = "equalPr";

    if (!isPrDefined(pixr1, procName))
        return;
    if (!isPrDefined(pixr2, procName))
        return;

    w = pixr2->pr_size.x;
    h = pixr2->pr_size.y;
    prT = mem_create(w, h, 1);
    if (!prT)
    {
        printf(" Error in equalPr: pixrect not created\n");
        return;
    }

    opPrPr(prT, pixr2, COPY);
    pr_rop(prT, 0, 0, pixr1->pr_size.x, pixr1->pr_size.y,
          OP_XOR, pixr1, 0, 0);

    eq = zeroPr(prT);
    pr_close(prT);
```

```
    return eq;
}


/*
 *  equalPrA():  returns 1 if the two pixrects are identical; zero otherwise.
 *               accepts an auxiliary pixrect as an argument.
 */
int
equalPrA(pixr1, pixr2, pixrI)
Pixrect      *pixr1, *pixr2, *pixrI;
{
static char   procName[] = "equalPrA";

    if (!isPrDefined(pixr1, procName))
        return;
    if (!isPrDefined(pixr2, procName))
        return;
    if (!isPrDefined(pixrI, procName))
        return;

    opPrPr(pixrI, pixr2, COPY);
    pr_rop(pixrI, 0, 0, pixr1->pr_size.x, pixr1->pr_size.y,
            OP_XOR, pixr1, 0, 0);

    return (zeroPr(pixrI));
}


/*
 *  equalPrD():  returns 1 if the two pixrects are identical; zero otherwise.
 *               destructive version: alters the contents of pixr2.
 */
int
equalPrD(pixr1, pixr2)
Pixrect      *pixr1, *pixr2;
{
static char   procName[] = "equalPrD";

    if (!isPrDefined(pixr1, procName))
        return;
    if (!isPrDefined(pixr2, procName))
        return;

    pr_rop(pixr2, 0, 0, pixr1->pr_size.x, pixr1->pr_size.y,
            OP_XOR, pixr1, 0, 0);

    return (zeroPr(pixr2));
}


/*
 *  zeroPr():   returns 1 if the pixrect is zero; returns 0 otherwise.
 */
int
zeroPr(pixr)
Pixrect                *pixr;
{
int                     i, w, h, dataWords;
unsigned short int     *data;
```

```
static char             procName[] = "zeroPr";

    if (!isPrDefined(pixr, procName))
        return;

    w = pixr->pr_size.x;
    h = pixr->pr_size.y;
    dataWords = (prBytesPerLine(pixr) >> 1) * h;
    data = (unsigned short int *) mpr_d(pixr)->md_image;
    for (i = 0; i < dataWords; i++)
        if (data[i]) return(0);

    return(1);
}


/*
 *  numberPr():   returns either the number of ON pixels in the pixrect
 *                   or the number of non-zero words, depending on
 *                   the value of type.
 */
int
numberPr(pixr, type)
Pixrect                 *pixr;
int                      type;
{
int                         i, j, w, h, dataWords, dataBytes, num;
register int                byteOff, index;
register unsigned char     *bytePtr;
unsigned short int         *data;
static char                 procName[] = "numberPr";

    if (!isPrDefined(pixr, procName))
        return;

    w = pixr->pr_size.x;
    h = pixr->pr_size.y;
    dataBytes = prBytesPerLine(pixr) * h;
    dataWords = dataBytes >> 1;
    num = 0;
    data = (unsigned short int *) mpr_d(pixr)->md_image;
    bytePtr = (unsigned char *) mpr_d(pixr)->md_image;
    if (type == PIXELS)
#if FAST_PIXEL_COUNT
    {
        if (tabSumPixel == NULL)
            makeSumPixelTab();
        byteOff = 0;
        for (i = 0; i < dataBytes; i++)
        {
            index = *(bytePtr + byteOff);
            byteOff++;
            num += tabSumPixel[(int) index];
        }
    }
#endif FAST_PIXEL_COUNT
#if SLOW_PIXEL_COUNT
    {
        for (i = 0; i < dataWords; i++)
            if (data[i])
```

```
            for (j = 0; j < 16; j++)
                if (data[i] & wmask[j])
                    num++;
        }
#endif SLOW_PIXEL_COUNT
    else if (type == WORDS)
        for (i = 0; i < dataWords; i++)
            if (data[i])  /* there exists at least one non-zero bit
                           * in the word */
                num++;

    return(num);
}


/*
 *  makeSumPixelTab()
 */
makeSumPixelTab()
{
int       p[8];
int       i, t, d, iStart, k;

    if (tabSumPixel)  /* already exists; don't do anything */
        return;

        /* allocate */
    tabSumPixel = (unsigned short int *) calloc (256, sizeof(short int));

        /*  initialize power table */
    p[0] = 1;
    for (i = 1; i < 8; i++)
        p[i] = 2 * p[i - 1];

        /*  make table returning sum of ON pixels in a byte */
    tabSumPixel[0] = (unsigned short int) 0;
    i = 1;
    for (d = 0; d < 8; d++)
    {
        iStart = p[d];
        if (i != iStart)
            printf(" Error: i = %d; iStart = %d\n", i, iStart);
        for (k = 0; k < iStart; k++)
            tabSumPixel[i++] = (unsigned short int) (1 + tabSumPixel[k]);
    }
}


/*
 *  sumPixels():  allocates storage, computes the number of ON pixels
 *                   in each row, the number of ON pixels in each
 *                   byte column, and the number of ON-OFF or OFF-ON
 *                   pixel transitions in each row.
 */
int
sumPixels(pixr)
Pixrect               *pixr;
{
int                    w, h, i, j, num;
register int           byteOff, index, Bpl;
```

```
register unsigned char   *bytePtr;
Pixrect                  *prT1, *prT2;
static char               procName[] = "sumPixels";

    if (!isPrDefined(pixr, procName))
        return;

    w = pixr->pr_size.x;
    h = pixr->pr_size.y;
    Bpl = prBytesPerLine(pixr);
    bytePtr = (unsigned char *) mpr_d(pixr)->md_image;

    if (tabSumPixel == NULL)
        makeSumPixelTab();

    if (sumRowPixels)
        free (sumRowPixels);
    if (sumColumnPixels)
        free (sumColumnPixels);
    if (sumRowTransPixels)
        free (sumRowTransPixels);
    if (sumColTransPixels)
        free (sumColTransPixels);

    scanlines = h;
    bytesPerLine = Bpl;
    sumRowPixels = (unsigned short int *) calloc(h,
            sizeof(unsigned short int));
    sumColumnPixels = (unsigned short int *) calloc(Bpl,
            sizeof(unsigned short int));
    sumRowTransPixels = (unsigned short int *) calloc(h,
            sizeof(unsigned short int));
    sumColTransPixels = (unsigned short int *) calloc(Bpl,
            sizeof(unsigned short int));

        /*  find the number of ON pixels in each row */
    byteOff = 0;
    for (i = 0; i < h; i++)
    {
        num = 0;
        for (j = 0; j < Bpl; j++)
        {
            index = *(bytePtr + byteOff);
            byteOff++;
            num += tabSumPixel[(int) index];
        }
        sumRowPixels[i] = num;
    }

        /*  find the number of ON pixels in each column byte */
    for (i = 0; i < Bpl; i++)
    {
        num = 0;
        byteOff = i;
        for (j = 0; j < h; j++)
        {
            index = *(bytePtr + byteOff);
            byteOff += Bpl;
            num += tabSumPixel[(int) index];
        }
```

```
        sumColumnPixels[i] = num;
    }

        /*  Find the number of pixels transitions in each row.
         *    Note that single pixel runs only get counted once, but this
         *    matters little, because single pixel runs are relatively
         *    rare.  They can be found by using ERODE with SE=strel3hl  */
    prT1 = mem_create(w, h, 1);
    prT2 = mem_create(w, h, 1);
    if (!prT1 || !prT2)
    {
        printf(" Error in sumPixels: pixrect create failure\n");
        return;
    }
    erode(prT1, pixr, strel3h);
    logOp(prT2, pixr, prT1, XOR);
    bytePtr = (unsigned char *) mpr_d(prT2)->md_image;
    byteOff = 0;
    for (i = 0; i < h; i++)
    {
        num = 0;
        for (j = 0; j < Bpl; j++)
        {
            index = *(bytePtr + byteOff);
            byteOff++;
            num += tabSumPixel[(int) index];
        }
        sumRowTransPixels[i] = num;
    }

        /*  Find the number of pixels transitions in each byte of columns.
         *    Note that single pixel runs only get counted once, but this
         *    matters little, because single pixel runs are relatively
         *    rare.  They can be found by using ERODE with SE=strel3vl  */
    erode(prT1, pixr, strel3v);
    logOp(prT2, pixr, prT1, XOR);
    bytePtr = (unsigned char *) mpr_d(prT2)->md_image;
    for (i = 0; i < Bpl; i++)
    {
        num = 0;
        byteOff = i;
        for (j = 0; j < h; j++)
        {
            index = *(bytePtr + byteOff);
            byteOff += Bpl;
            num += tabSumPixel[(int) index];
        }
        sumColTransPixels[i] = num;
    }
    pr_close(prT1);
    pr_close(prT2);
}


/*
 *  onPixelsInRow():
 */
onPixelsInRow(pixr, row)
Pixrect                     *pixr;
int                          row;
```

```
{
int                         Bpl, byteOff, num, j;
int                         index;
unsigned char              *bytePtr;
static char                 procName[] = "onPixelsInRow";

    if (!isPrDefined(pixr, procName))
        return -1;

    if (row >= pixr->pr_size.y)
        return -1;

    if (tabSumPixel == NULL)
        makeSumPixelTab();

    Bpl = prBytesPerLine(pixr);
    bytePtr = (unsigned char *) mpr_d(pixr)->md_image;
    byteOff = Bpl * row;
    num = 0;
    for (j = 0; j < Bpl; j++)
    {
        index = *(bytePtr + byteOff);
        byteOff++;
        num += tabSumPixel[(int) index];
    }
    return num;
}


/*
 *  onPixelsInEachRow(pixr, array)
 */
onPixelsInEachRow(pixr, array)
Pixrect                 *pixr;
unsigned short int      *array;
{
int                     h, Bpl, byteOff, num, i, j;
int                     index;
unsigned char          *bytePtr;
static char             procName[] = "onPixelsInEachRow";

    if (!isPrDefined(pixr, procName))
        return -1;

    if (!array)
        return -1;

    if (tabSumPixel == NULL)
        makeSumPixelTab();

        /*  find the number of ON pixels in each row */
    h = pixr->pr_size.y;
    Bpl = prBytesPerLine(pixr);
    bytePtr = (unsigned char *) mpr_d(pixr)->md_image;
    byteOff = 0;
    for (i = 0; i < h; i++)
    {
        num = 0;
        for (j = 0; j < Bpl; j++)
        {
```

```
            index = *(bytePtr + byteOff);
            byteOff++;
            num += tabSumPixel[(int) index];
        }
        array[i] = (unsigned short int) num;
    }
}


/*
 *  extremeOnPixelInRow():  Returns the x-coordinate of either
 *                            (i) the first ON pixel in the row, or
 *                            (ii) the last ON pixel in the row, or
 *                            (iii) -1 on error.
 *                          "which" is either FIRST or LAST
 */
extremeOnPixelInRow(pixr, row, which)
Pixrect                 *pixr;
int                      row, which;
{
int                     foundFlag;
int                     Bpl, byteOff, j, jStart, i;
unsigned char          *bytePtr, byte;
static char             procName[] = "extremeOnPixelInRow";

    if (!isPrDefined(pixr, procName))
        return -1;

    if (row >= pixr->pr_size.y)
        return -1;

    foundFlag = FALSE;

        /* find the first or last byte with ON pixel(s) */
    Bpl = prBytesPerLine(pixr);
    bytePtr = (unsigned char *) mpr_d(pixr)->md_image;
    if (which == FIRST)   /* first byte */
    {
        byteOff = Bpl * row;
        for (j = 0; j < Bpl; j++)
        {
            byte = *(bytePtr + byteOff);
            if (byte)
            {
                foundFlag = TRUE;
                break;
            }
            byteOff++;
        }
    }
    else  /* last byte */
    {
        byteOff = Bpl * (row + 1) - 1;
        for (j = Bpl - 1; j >= 0; j--)
        {
            byte = *(bytePtr + byteOff);
            if (byte)
            {
                foundFlag = TRUE;
                break;
```

```
            }
            byteOff--;
        }
    }

    if (!foundFlag)
        return (-1);

    jStart = 8 * j;   /* bit position of start of byte with first ON pixel */
    if (which == FIRST)  /* search for first ON bit: left to right */
        for (i = 0; i < 8; i++)
        {
            if (byte & mask8[i])
                return (jStart + i);
        }
    else  /* search for first ON bit: right to left */
        for (i = 7; i >= 0; i--)
            if (byte & mask8[i])
                return (jStart + i);

    printf(" Error in extremeOnPixelInRow: shouldn't have reached here\n");
    return -1;
}
```

```
/*****************************************************************
 *  Copyright (c) 1988, Xerox Corporation.  All rights reserved. *
 *  Copyright protection claimed includes all forms and matters  *
 *  of copyrightable material and information now allowed by     *
 *  statutory or judicial law or hereafter granted, including    *
 *  without limitation, material generated from the software    *
 *  programs which are displayed on the screen such as icons,    *
 *  screen display looks, etc.                                   *
 *****************************************************************/
```

```
/*
 *  scale.c: contains subroutines for
 *           (1) thresholded reduction:
 *                 --reduceImToIm()
 *                 --reducePrToIm()
 *                 --reducePr()
 *                 --reducePr2()
 *                 --redOpF()
 *                 --redFastColumns()
 *                 --makeLookupTables()
 *                 --redOp()
 *           (2) fast and slow expansion
 *                 --expandPr2()
 *                 --expOpF()
 *                 --expFastColumns()
 *                 --expandPr2S()
 *           (3) set globals
 *                 --setThresholdLevel()
 *
 *      Note:  redOp() uses only rasterOps
 *             redOpF() uses rasterOps for rows and table lookup for columns.
 */
```

```
#include <stdio.h>
#include <llama.h>
#include <imageReps.h>
#include <imageGlobals.h>
#include "alp.h"
#include "morph.h"

#define  OR         1
#define  AND        2
#define  OR_OR      1
#define  OR_AND     2
#define  AND_OR     3
#define  AND_AND    4

static unsigned char        *tabOr, *tabAnd;
static unsigned short int   *tabExp2;


/*****************************************************************
 *      Reduction procedures
 *****************************************************************/
/*
 *  reduceImToIm():  Returns reduced image from a source image.
 *                        level = {1, 2, 3, 4} == {.25, .5, .75, 1.0} black
 *                        returns NULL on error.
 *                   This hasn't been tested, but because it differs from
 *                     reducePrToIm by only a line, it should be OK.
 */
IMAGE *
reduceImToIm(imIn, level)
IMAGE          *imIn;
int             level;
{
Pixrect        *pixrS, *pixrD, *imageToPrN(), *reducePr();
IMAGE          *imOut, *pixrectToImageN();

    pixrS = imageToPrN(imIn);
    pixrD = reducePr(pixrS, level);
    if (!pixrD)
    {
        printf(" Error in reduceImToIm:  returned Pr is NULL\n");
        return (NULL);
    }

    imOut = pixrectToImageN(pixrD);
    pr_close (pixrS);
    pr_close (pixrD);

    return (imOut);
}


/*
 *  reducePrToIm():  Returns reduced image from Pixrect.
 *                        level = {1, 2, 3, 4} == {.25, .5, .75, 1.0} black
 *                        returns NULL on error.
 */
```

```
reducePr(pixrS, level)
Pixrect       *pixrS;
int            level;
{
Pixrect       *pixrD, *pixrDAux;
int            wS, hS, wD, hD;
int            error1, error2;
static char    procName[] = "reducePr";

    if (!isPrDefined(pixrS, procName))
        return (NULL);

    wS = pixrS->pr_size.x;
    hS = pixrS->pr_size.y;
    pixrDAux = NULL;
    pixrD = mem_create(wS/2, hS/2, 1);  /* a half-height, half-width pr */
    if (!isPrDefined(pixrD, procName))
        return (NULL);

    if (!tabAnd || !tabOr)
        makeLookupTables();

    error1 = error2 = 0;
    wD = wS/2;
    hD = hS/2;

    if (level == 1)
        error1 = redOpF(pixrD, pixrS, OR_OR);
    else if (level == 2)
    {
        error1 = redOpF(pixrD, pixrS, OR_AND);
        pixrDAux = mem_create(wS/2, hS/2, 1);  /* a half-ht, half-width pr */
        error2 = redOpF(pixrDAux, pixrS, AND_OR);
        pr_rop(pixrD, 0, 0, wD, hD, OP_HU, pixrDAux, 0, 0);
    }
    else if (level == 3)
    {
        error1 = redOpF(pixrD, pixrS, OR_AND);
        pixrDAux = mem_create(wS/2, hS/2, 1);  /* a half-ht, half-width pr */
        error2 = redOpF(pixrDAux, pixrS, AND_OR);
        pr_rop(pixrD, 0, 0, wD, hD, OP_HI, pixrDAux, 0, 0);
    }
    else if (level == 4)
        error1 = redOpF(pixrD, pixrS, AND_AND);

    if (pixrDAux)
        pr_close(pixrDAux);

    if (error1 || error2)
        return (NULL);
    else
        return (pixrD);
}

/*
 *  reducePr2():  Takes an input pixrect and a reduced output pixrect,
 *                   and returns in the reduced pixrect an image
 *                   such that each pixel is ON
 *                   if at least 'level' of the four corresponding
```

```
IMAGE *
reducePrToIm(pixrS, level)
Pixrect       *pixrS;
int            level;
{
Pixrect       *pixrD, *reducePr();
IMAGE         *im, *pixrectToImageN();

    pixrD = reducePr(pixrS, level);
    if (!pixrD)
    {
        printf(" Error in reducePrToIm:  returned Pr is NULL\n");
        return (NULL);
    }

    im = pixrectToImageN(pixrD);
    pr_close (pixrD);

    return (im);
}


/*
 *  reducePr():  Returns reduced pixrect such that each pixel is ON
 *                  if at least 'level' of the four corresponding
 *                  source pixels is ON.
 *               Makes lookup tables if not already done.
 *               Uses redOpF (with table look-up) for speed.
 */
Pixrect  *
 *                  pixels in the input pixrect is ON.
 *                Makes lookup tables if not already done.
 *                Uses redOpF (with table look-up) for speed.
 */
reducePr2(pixrD, pixrS, level)
Pixrect       *pixrD, *pixrS;
int            level;
{
Pixrect       *pixrDAux;
int            wS, hS, wD, hD;
int            error1, error2;
static char    procName[] = "reducePr2";

    if (!isPrDefined(pixrS, procName))
        return 1;
    if (!isPrDefined(pixrD, procName))
        return 1;

    wS = pixrS->pr_size.x;
    hS = pixrS->pr_size.y;
    wD = pixrD->pr_size.x;
    hD = pixrD->pr_size.y;
    if (wS != 2*wD || hS != 2*hD)
    {
        printf("Error in reducePr2: pixrect sizes incorrect\n");
        return 1;
    }
```

```
if (!tabAnd || !tabOr)
    makeLookupTables();

pixrDAux = NULL;
error1 = error2 = 0;

if (level == 1)
    error1 = redOpF(pixrD, pixrS, OR_OR);
else if (level == 2)
{
    error1 = redOpF(pixrD, pixrS, OR_AND);
    pixrDAux = mem_create(wS/2, hS/2, 1);  /* a half-ht, half-width pr */
    error2 = redOpF(pixrDAux, pixrS, AND_OR);
    pr_rop(pixrD, 0, 0, wD, hD, OP_HU, pixrDAux, 0, 0);
}
else if (level == 3)
{
    error1 = redOpF(pixrD, pixrS, OR_AND);
    pixrDAux = mem_create(wS/2, hS/2, 1);  /* a half-ht, half-width pr */
    error2 = redOpF(pixrDAux, pixrS, AND_OR);
    pr_rop(pixrD, 0, 0, wD, hD, OP_HI, pixrDAux, 0, 0);
}
else if (level == 4)
    error1 = redOpF(pixrD, pixrS, AND_AND);

if (pixrDAux)
    pr_close(pixrDAux);

if (error1 || error2)
    return 1;
else
    return 0;
}


/*
 *  redOpF: Fills the reduced destination pixrect with data of
 *              the type specified by op.
 *          Fast version with table lookup.
 *          Two steps:  first combines adjacent rows of the source
 *              pixrect and writes into the intermediate pixrect;
 *              then uses table to convert each set of 16 adjacent bits
 *              of the intermediate pixrect into eight bits of the
 *              destination pixrect.
 *          Returns 0 if OK; 1 on error.
 */
redOpF(pixrD, pixrS, op)
Pixrect        *pixrD, *pixrS;
int             op;
{
int             wS, hS, wD, hD, j;
Pixrect        *pixrI;
static char     procName[] = "redOpF";

    if (!isPrDefined(pixrS, procName))
        return 1;
    if (!isPrDefined(pixrD, procName))
        return 1;
```

```
wS = pixrS->pr_size.x;
hS = pixrS->pr_size.y;
wD = pixrD->pr_size.x;
hD = pixrD->pr_size.y;
if (wS != 2*wD || hS != 2*hD)
{
    printf("Error in redOpF: pixrect sizes incorrect\n");
    return 1;
}

pixrI = mem_create(wS, hS/2, 1);  /* a half-height, full-width pr */
if (!pixrI)
{
    printf(" Error in redOpF: pixrI not created\n");
    return 1;
}

if (op == OR_OR)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HU, pixrS, 0, 2*j + 1);
    }

    if (redFastColumns(pixrD, pixrI, OR))
        return 1;
}
else if (op == OR_AND)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HU, pixrS, 0, 2*j + 1);
    }

    if (redFastColumns(pixrD, pixrI, AND))
        return 1;
}
else if (op == AND_OR)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    }

    if (redFastColumns(pixrD, pixrI, OR))
        return 1;
}
else if (op == AND_AND)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    }
```

```
    if (redFastColumns(pixrD, pixrI, AND))
        return 1;
    }
    else
    {
        printf(" Error in redOpF: unknown operators\n");
        return 1;
    }

    pr_close (pixrI);
    return 0;
}


/*
 *  redFastColumns():  uses lookup tables to reduce the number of
 *                        columns by a factor of 2 in going from the
 *                        source pixrect to the destination pixrect.
 *                     checks that relative sizes of source and destination
 *                        pixrects are correct.
 *                     depending on the line padding, the pixrect data
 *                        is either stored in short ints or in 32-bit ints.
 *                     returns 0 (or 1 on error).
 */
redFastColumns(pixrD, pixrS, op)
Pixrect               *pixrD, *pixrS;
int                    op;
{
int                    wS, hS, wD, hD, j, prSWpl, prDBpl;
register               i, sWord, dByte;
unsigned short int    *pS, index;
unsigned char         *pD, *tab;
static char            procName[] = "redFastColumns";

    if (!isPrDefined(pixrS, procName))
        return 1;
    if (!isPrDefined(pixrD, procName))
        return 1;

    wS = pixrS->pr_size.x;
    hS = pixrS->pr_size.y;
    wD = pixrD->pr_size.x;
    hD = pixrD->pr_size.y;
    prSWpl = prBytesPerLine(pixrS) >> 1;
    prDBpl = prBytesPerLine(pixrD);        /* Note that prDBpl >= prSWpl */
    if ((wD != ((wS + 1) >> 1)) || (hD != hS))
    {
        printf("Error in redFastColumns: pixrect sizes incorrect\n");
        return 1;
    }
    pS = (unsigned short int *) mpr_d(pixrS)->md_image;
    pD = (unsigned char *) mpr_d(pixrD)->md_image;


    if (op == OR)
        tab = tabOr;
      else if (op == AND)
```

```
        tab = tabAnd;
      else
        printf(" Error in redFastColumns: unknown operation\n");

   dByte = 0;
   for (j = 0; j < hS; j++)
   {
       sWord = j * prSWpl;
       for (i = 0; i < prSWpl; i++)
       {
               /* obtain 16 bits from the source */
           index = *(pS + sWord);
           sWord++;
               /* get the corresponding 8 bits from the table,
                * and put it in the destination byte */
           *(pD + dByte) = tab[index];
           dByte++;
       }
           /* Note that i for the row just completed has been incremented,
            *   and it now gives the number of bytes written to pixrD.
            * Write null bytes to pad pixrD  */
       for (; i < prDBpl; i++)
       {
           *(pD + dByte) = '\0';
           dByte++;
       }
   }

   return 0;
}


/*
 *  makeLookupTables():  Allocates and fills OR and AND tables
 *                           for column reduction.
 *                       Allocates and fills expansion table.
 */
makeLookupTables()
{
int      p[15], base[8];
int      i, d, r, k, iStart, tInc;

         /* allocate */
     tabOr = (unsigned char *) calloc (256*256, 1);
     tabAnd = (unsigned char *) calloc (256*256, 1);
     tabExp2 = (unsigned short int *) calloc (256, sizeof(short int));

     p[0] = 1;
     for (i = 1; i <= 14; i++)
         p[i] = 2 * p[i - 1];

         /*  OR table */
     tabOr[0] = (unsigned char) 0;
     i = 1;
     for (d = 1; d <= 8; d++)
     {
         iStart = p[2 * d - 2];
         tInc = p[d - 1];
         if (i != iStart)
```

```
            printf(" Error: i = %d; iStart = %d\n", i, iStart);
        for (r = 1; r <= 3; r++)
            for (k = 0; k < iStart; k++)
                tabOr[i++] = (unsigned char) ((int)tabOr[k] + tInc);
    }

        /*  AND table */
    tabAnd[0] = (unsigned char) 0;
    i = 1;
    for (d = 1; d <= 8; d++)
    {
        iStart = p[2 * d - 2];
        if (i != iStart)
            printf(" Error: i = %d; iStart = %d\n", i, iStart);
        for (r = 1; r <= 3; r++)
        {
            if (r < 3)
                tInc = 0;
              else
                tInc = p[d - 1];
            for (k = 0; k < iStart; k++)
                tabAnd[i++] = (unsigned char) ((int)tabAnd[k] + tInc);
        }
    }

/*    for (d = 0; d < 15; d++)
    {
        for (i = p[d]; i < p[d] + 6; i++)
            printf(" tabOr[%d] = %d; tabAnd[%d] = %d\n",
                    i, tabOr[i], i, tabAnd[i]);
        for (i = p[d]; i > p[d] - 6; i--)
            printf(" tabOr[%d] = %d; tabAnd[%d] = %d\n",
                    i, tabOr[i], i, tabAnd[i]);
    }  */

    base[0] = 3;
    for (i = 1; i < 8; i++)
        base[i] = p[2 * i] * base[0];
        /*  Expansion table */
    tabExp2[0] = 0;
    i = 1;
    for (d = 0; d < 8; d++)
    {
        iStart = p[d];
        if (i != iStart)
            printf(" Error: i = %d; iStart = %d\n", i, iStart);
        for (k = 0; k < iStart; k++)
            tabExp2[i++] = (unsigned short int) base[d] + tabExp2[k];
    }

/*    for (i = 0; i < p[8]; i += 2)
        printf(" tabExp2[%d] = %d; tabExp2[%d] = %d\n",
            i, tabExp2[i], i+1, tabExp2[i+1]);  */
}


/*
```

```
 *  redOp():  Fills the reduced destination pixrect with data of
 *              the type specified by op.
 *            Two steps:  first combines adjacent rows of the source
 *               pixrect and writes into the intermediate pixrect;
 *               then combines adjacent columns of the intermediate pixrect
 *               and writes into the destination pixrect.
 *            This is about 7 times slower than redOpF.
 *            Returns 0 if OK; 1 on error.
 *            To use this subroutine, substitute the redOp() call
 *               for redOpF(), in reducePr() and/or reducePr2().
 */
redOp(pixrD, pixrS, op)
Pixrect      *pixrD, *pixrS;
int           op;
{
int           wS, hS, wD, hD, i, j;
Pixrect      *pixrI;
static char   procName[] = "redOp";

    if (!isPrDefined(pixrS, procName))
        return 1;
    if (!isPrDefined(pixrD, procName))
        return 1;

    wS = pixrS->pr_size.x;
    hS = pixrS->pr_size.y;
    wD = pixrD->pr_size.x;
    hD = pixrD->pr_size.y;
    if (wS != 2*wD || hS != 2*hD)
    {
        printf("Error in redOp: pixrect sizes incorrect\n");
        return 1;
    }

    pixrI = mem_create(wS, hS/2, 1);  /* a half-height, full-width pr */
    if (!pixrI)
    {
        printf(" Error in redOp: pixrI not created\n");
        return 1;
    }

    if (op == OR_OR)
    {
        for (j = 0; j < hD; j++)
        {
            pr_rop(pixrI, 0, j, wS, 1, OP_HC, pixrS, 0, 2*j);
            pr_rop(pixrI, 0, j, wS, 1, OP_HU, pixrS, 0, 2*j + 1);
        }

        for (i = 0; i < wD; i++)
        {
            pr_rop(pixrD, i, 0, 1, hD, OP_HC, pixrI, 2*i, 0);
            pr_rop(pixrD, i, 0, 1, hD, OP_HU, pixrI, 2*i + 1, 0);
        }
    }
    else if (op == OR_AND)
    {
        for (j = 0; j < hD; j++)
        {
```

```
        pr_rop(pixrI, 0, j, wS, 1, OP_HC, pixrS, 0, 2*j);
        pr_rop(pixrI, 0, j, wS, 1, OP_HU, pixrS, 0, 2*j + 1);
    }

    for (i = 0; i < wD; i++)
    {
        pr_rop(pixrD, i, 0, 1, hD, OP_HC, pixrI, 2*i, 0);
        pr_rop(pixrD, i, 0, 1, hD, OP_HI, pixrI, 2*i + 1, 0);
    }
}
else if (op == AND_OR)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    }

    for (i = 0; i < wD; i++)
    {
        pr_rop(pixrD, i, 0, 1, hD, OP_HC, pixrI, 2*i, 0);
        pr_rop(pixrD, i, 0, 1, hD, OP_HU, pixrI, 2*i + 1, 0);
    }
}
else if (op == AND_AND)
{
    for (j = 0; j < hD; j++)
    {
        pr_rop(pixrI, 0, j, wS, 1, OP_HC, pixrS, 0, 2*j);
        pr_rop(pixrI, 0, j, wS, 1, OP_HI, pixrS, 0, 2*j + 1);
    }

    for (i = 0; i < wD; i++)
    {
        pr_rop(pixrD, i, 0, 1, hD, OP_HC, pixrI, 2*i, 0);
        pr_rop(pixrD, i, 0, 1, hD, OP_HI, pixrI, 2*i + 1, 0);
    }
}
else
{
    printf(" Error in redOp: unknown operators\n");
    return 1;
    }

    pr_close (pixrI);
    return 0;
}


/*****************************************************************
 *        Expansion procedures
 *****************************************************************/
/*
 * expandPr2():  Takes a source pixrect and an expanded destination pixrect;
 *                   each pixel in the source pixrect is mapped to four
 *                   identical pixels in the destination.
 *                 Makes lookup tables if not already done.
 *                 Uses expOpF (with table look-up) for speed.
```

```
 */
expandPr2(pixrD, pixrS)
Pixrect        *pixrD, *pixrS;
{
int             wS, hS, wD, hD;
static char     procName[] = "expandPr2";

    if (!isPrDefined(pixrS, procName))
        return 1;
    if (!isPrDefined(pixrD, procName))
        return 1;

    wS = pixrS->pr_size.x;
    hS = pixrS->pr_size.y;
    wD = pixrD->pr_size.x;
    hD = pixrD->pr_size.y;
    if (wD != 2 * wS || hD != 2 * hS)
    {
        printf("Error in expandPr2: pixrect sizes incorrect\n");
        return 1;
    }

    if (!tabExp2)
        makeLookupTables();

    if (expOpF(pixrD, pixrS))
        return 1;
      else
        return 0;
}


/*
 *  expOpF: Fills the expanded destination pixrect with
 *               data from the source.
 *          Fast version with table lookup.
 *          Two steps:  first combines adjacent rows of the source
 *               pixrect and writes into the intermediate pixrect;
 *               then uses table to convert each columns
 *               of the intermediate pixrect into two columns of
 *               the destination pixrect.
 *          Returns 0 if OK; 1 on error.
 */
expOpF(pixrD, pixrS)
Pixrect        *pixrD, *pixrS;
{
int             wS, hS, wD, hD, j;
Pixrect        *pixrI;
static char     procName[] = "expOpF";

    if (!isPrDefined(pixrS, procName))
        return 1;
    if (!isPrDefined(pixrD, procName))
        return 1;

    wS = pixrS->pr_size.x;
    hS = pixrS->pr_size.y;
    wD = pixrD->pr_size.x;
```

```
    hD = pixrD->pr_size.y;
    if (wD != 2*wS || hD != 2*hS)
    {
        printf("Error in expOpF: pixrect sizes incorrect\n");
        return 1;
    }

    pixrI = mem_create(wS, 2 * hS, 1);
    if (!pixrI)
    {
        printf(" Error in expOpF: pixrI not created\n");
        return 1;
    }

    for (j = 0; j < hS; j++)
    {
        pr_rop(pixrI, 0, 2*j, wS, 1, OP_HC, pixrS, 0, j);
        pr_rop(pixrI, 0, 2*j + 1, wS, 1, OP_HC, pixrS, 0, j);
    }

    if (expFastColumns(pixrD, pixrI))
        return 1;

    pr_close (pixrI);
    return 0;
}


/*
 *  expFastColumns():  uses lookup tables to expand the number of
 *                      columns by a factor of 2 in going from the
 *                      source pixrect to the destination pixrect.
 *                     checks that relative sizes of source and destination
 *                        pixrects are correct.
 *                     depending on the line padding, the pixrect data
 *                        is either stored in short ints or in 32-bit ints.
 *                     Returns 0 (or 1 on error).
 */
expFastColumns(pixrD, pixrS)
Pixrect                 *pixrD, *pixrS;
{
int                      wS, hS, wD, hD, j, prSBpl, prDWpl;
register                 i, sByte, dWord;
unsigned char           *pS, index;
unsigned short int      *pD;
static char              procName[] = "expFastColumns";

    if (!isPrDefined(pixrS, procName))
        return 1;
    if (!isPrDefined(pixrD, procName))
        return 1;

    wS = pixrS->pr_size.x;
    hS = pixrS->pr_size.y;
    wD = pixrD->pr_size.x;
    hD = pixrD->pr_size.y;
    prSBpl = prBytesPerLine(pixrS);
    prDWpl = prBytesPerLine(pixrD) >> 1;  /* Note that prSBpl >= prDWpl */
    if (wD != 2 * wS || hS != hD)
```

```
    {
        printf("Error in expFastColumns: pixrect sizes incorrect\n");
        return 1;
    }
    pS = (unsigned char *) mpr_d(pixrS)->md_image;
    pD = (unsigned short int *) mpr_d(pixrD)->md_image;

    dWord = 0;
    for (j = 0; j < hS; j++)
    {
        sByte = j * prSBpl;
        for (i = 0; i < prDWpl; i++)  /* because prDWpl <= prSBpl */
        {
                /* obtain 8 bits from the source */
            index = *(pS + sByte);
            sByte++;
                /* get the corresponding 16 bits from the table,
                 * and put it in the destination byte */
            *(pD + dWord) = tabExp2[(int) index];
            dWord++;
        }
    }

    return 0;
}


/*
 *  expandPr2S():  Takes an input pixrect and an expanded output pixrect,
 *                    and returns in the expanded pixrect an image
 *                    such that for each ON pixel in the input pixrect,
 *                    all corresponding pixels in the output pixrect are ON.
 *                 The integer mag is the requested magnification.
 *                    It is checked against the sizes of source and destination
 *                    pixrects, and if the relative sizes don't equal mag,
 *                    the routine returns with an error.
 *                 Returns 1 on error; 0 if OK.
 *                 This is the "slow" version, that does everything by
 *                    bit checking and substitution.
 */
expandPr2S(pixrD, pixrS, mag)
Pixrect        *pixrD, *pixrS;
int             mag;
{
IMAGE          *imS, *imD, *pixrectToImageN(), *expandImage();
int             wS, hS, wD, hD;
int             error;
static char     procName[] = "expandPr2S";

    if (!isPrDefined(pixrS, procName))
        return 1;
    if (!isPrDefined(pixrD, procName))
        return 1;

    wS = pixrS->pr_size.x;
    hS = pixrS->pr_size.y;
    wD = pixrD->pr_size.x;
    hD = pixrD->pr_size.y;
    if (wD != (mag * wS) || hD != (mag * hS))
```

```
  {
      printf("Error in expandPr2S: pixrect sizes incorrect\n");
      return 1;
  }

  imS = pixrectToImageN(pixrS);  /* imS has new data */
  imD = expandImage(imS, mag);  /* imD is newly made image structure */
  if (!imD)
      return 1;
  error = imageIntoPr(pixrD, imD); /* data from imD copied to pixrD */
  free (imS->data);
  free (imS);
  free (imD->data);
  free (imD);
  if (error)
      return 1;
    else
      return 0;
}


/****************************************************************
 *        Set globals
 ****************************************************************/
/*
 *  setThresholdLevel()
 */
setThresholdLevel(level)
int        level;
{

    if (level > 0 && level <= 4)
        thresholdLevel = level;
    else
        printf(" Error in setThresholdLevel: unknown level\n");
}


/****************************************************************
 *  Copyright (c) 1988, Xerox Corporation.  All rights reserved. *
 *  Copyright protection claimed includes all forms and matters  *
 *  of copyrightable material and information now allowed by     *
 *  statutory or judicial law or hereafter granted, including    *
 *  without limitation, material generated from the software     *
 *  programs which are displayed on the screen such as icons,    *
 *  screen display looks, etc.                                   *
 ****************************************************************/

/*
 *  Taken from the version of graph.c in Vicuna.
 *       Substitute:  >> #include "alpaca.h"
 *                    >> #include "graph.h"
 *          for:      << #include "raveDisplay.h"
 */

/*
```

```
* graphA: This module contains the procedures to create a pop up
*         frame or subframe that plots graphical data.
*     The following functions are defined:
*         graphMake()
*         graphMenu()
*         graphPaint()
*         graphInvert()
*         graphHardcopyMenu()
*            graphHardcopyCmd()
*            graphDumpDisplay()
*         graphWriteFile()
*         graphQuit()
*         graphScaleProc()
*            graphInputMenu()
*            graphInputSelect()
*            graphInputQuit()
*            graphInputInit()
*         graphSelectType()
*         graphClearCanvas()
*         graphInit()
*         graphPutTitle()
*         graphPutData()
*         graphPutType()
*         graphPlotData()
*         graphGetMinMax()
*         graphSetScale()
*         graphAxes()
*         graphPoints()
*         graphCurve()
*         graphHistogram()
*         graphCanCoord()
*         graphCanClip()
*         graphDrawPoint()
*         graphCheck()
*         graphTestExample()
*     The following functions are defined in writeFileA.c:
*         panelMessage()
*         clearString()
*     Usage:  entry is through graphMake(data).
*        data is a pointer to data struct DATA.
*        This makes the graph frame if it is not existent.
*        The frame is made either as a subframe (of mainFrame) or as
*           a mainFrame.  In the latter case, window_main_loop is called,
*           and control is returned to the calling program by destroying
*           the window.
*/

#include <stdio.h>
#include <sys/file.h>
#include <llama.h>
#include <imageReps.h>
#include "alpaca.h"
#include "graphA.h"

#define   GRAPH_FRAME_WIDTH        380
#define   GRAPH_FRAME_HEIGHT       450
#define   MARGIN                   20
#define   DEBUG                    0
```

```
#define   DISPLAY_TIME          10  /* if > 0, automatically removes
                                     * display after this number of secs */

#define   DUMP_FILE             "/usr/tmp/dumpfile"
#define   Sign(x)               (((x) < 0) ? -1 : 1)

static char      clearMessage[] = "                                         ";
static char      paintMessage[] = " Painting not yet implemented.";
static char      dumpFrameMessage[] = " Frame is being printed. ";
static char      dumpGraphMessage[] = " Graph is being printed. ";
static char      message[100], filename[80];
static char      varMessage[60];
static char      inputStart[] = " Enter value and click selection ";
static int       tooMuchData = 0;
Panel_item       graphMessage;
Panel_item       graphScaling;
Panel_item       graphScaleChoice;
Panel_item       graphSelectPanel;
Panel_item       graphInputMessage;
Panel_item       graphInputText;

void             graphQuit();

graphMake(data)
DATA         *data;
{
    if (!graphFrame)
       graphMenu();
    window_set(graphFrame, WIN_SHOW, TRUE, 0);
    graphAutoScale = 1;    /* default is for automatic scaling */
    panel_set_value(graphScaleChoice, 0);
    panel_set_value(graphSelectPanel, 0);
    graphData = data;
    graphPlotData(graphData);
    if (DISPLAY_TIME > 0)
        doWithDelay(graphQuit, DISPLAY_TIME, 0);
    if (!mainFrame)
        window_main_loop(graphFrame);
}

graphMenu()
{
/*
 * graphMenu --- displays a pop up frame or sub-frame with message panel,
 *               control panel, and canvas that allows plotting of data.
 */
/*  Panel      graphMessagePanel;
 *  Panel      graphControlPanel;
 *  Canvas     graphCanvas;  */
void       graphPaint();
void       graphInvert();
void       graphHardcopyMenu();
void       graphWriteFile();
void       graphScaleProc();
void       graphSelectType();

    if (mainFrame)
    {   /* make a subframe */
```

```
    graphFrame = window_create(mainFrame, FRAME,
            FRAME_LABEL,        "Graph",
            WIN_WIDTH,          GRAPH_FRAME_WIDTH,
            WIN_HEIGHT,         GRAPH_FRAME_HEIGHT,
            WIN_X,              0,
            WIN_Y,              360,
            0);
}
  else
{   /* make a main frame */
    graphFrame = window_create(NULL, FRAME,
            FRAME_LABEL,        "Graph",
            WIN_WIDTH,          GRAPH_FRAME_WIDTH,
            WIN_HEIGHT,         GRAPH_FRAME_HEIGHT,
            WIN_X,              300,
            WIN_Y,              360,
            0);
}

graphMessagePanel = window_create(graphFrame, PANEL,
        PANEL_HEIGHT,       ATTR_ROW(2),
        0);
graphMessage = panel_create_item(graphMessagePanel, PANEL_MESSAGE,
      PANEL_LABEL_BOLD,     TRUE,
      PANEL_LABEL_STRING,   "                                ",
      PANEL_ITEM_X,         0,
      PANEL_SHOW_ITEM,      FALSE,
      0);
graphScaling = panel_create_item(graphMessagePanel, PANEL_MESSAGE,
      PANEL_LABEL_BOLD,     TRUE,
      PANEL_LABEL_STRING,   "                                ",
      PANEL_ITEM_X,         0,
      PANEL_ITEM_Y,         ATTR_ROW(1),
      PANEL_SHOW_ITEM,      FALSE,
      0);
window_fit_height(graphMessagePanel);

graphControlPanel = window_create(graphFrame, PANEL,
        WIN_BELOW,        graphMessagePanel,
        0);
panel_create_item(graphControlPanel, PANEL_BUTTON,
       PANEL_LABEL_IMAGE,
            panel_button_image(graphControlPanel,"paint",4,0),
       PANEL_LABEL_BOLD,           TRUE,
       PANEL_NOTIFY_PROC,          graphPaint,
       0);
panel_create_item(graphControlPanel, PANEL_BUTTON,
       PANEL_LABEL_IMAGE,
            panel_button_image(graphControlPanel,"invert",6,0),
       PANEL_LABEL_BOLD,           TRUE,
       PANEL_NOTIFY_PROC,          graphInvert,
       0);
panel_create_item(graphControlPanel, PANEL_BUTTON,
       PANEL_LABEL_IMAGE,
            panel_button_image(graphControlPanel,"hardcopy",8,0),
       PANEL_LABEL_BOLD,           TRUE,
       PANEL_NOTIFY_PROC,          graphHardcopyMenu,
       0);
```

```
    panel_create_item(graphControlPanel, PANEL_BUTTON,
            PANEL_LABEL_IMAGE,
                panel_button_image(graphControlPanel,"writeFile",9,0),
            PANEL_LABEL_BOLD,           TRUE,
            PANEL_NOTIFY_PROC,          graphWriteFile,
            0);
    panel_create_item(graphControlPanel, PANEL_BUTTON,
            PANEL_LABEL_IMAGE,
                panel_button_image(graphControlPanel,"quit",4,0),
            PANEL_LABEL_BOLD,           TRUE,
            PANEL_NOTIFY_PROC,          graphQuit,
            0);
    graphScaleChoice = panel_create_item(graphControlPanel, PANEL_CYCLE,
            PANEL_ITEM_X,               ATTR_COL(0),
            PANEL_ITEM_Y,               ATTR_ROW(1),
            PANEL_LABEL_BOLD,           TRUE,
            PANEL_LABEL_STRING,         "Auto Scaling Enabled: ",
            PANEL_CHOICE_STRINGS,       "YES", "NO", 0,
            PANEL_VALUE,                0,
            PANEL_NOTIFY_PROC,          graphScaleProc,
            0);
    graphSelectPanel = panel_create_item(graphControlPanel, PANEL_CHOICE,
            PANEL_ITEM_X,               ATTR_COL(0),
            PANEL_ITEM_Y,               ATTR_ROW(2)+1,
            PANEL_LABEL_STRING,         "Type:",
            PANEL_LABEL_BOLD,           TRUE,
            PANEL_CHOICE_STRINGS,       "Histo","Curve","Points",0,
            PANEL_NOTIFY_PROC,          graphSelectType,
            0);
    window_fit_height(graphControlPanel);

    graphCanvasWidth = 365;
    graphCanvasHeight = 320;
    graphCanvas = window_create(graphFrame, CANVAS,
            WIN_BELOW,                  graphControlPanel,
            CANVAS_AUTO_SHRINK,         FALSE,
            CANVAS_WIDTH,               graphCanvasWidth,
            CANVAS_HEIGHT,              graphCanvasHeight,
            WIN_CONSUME_PICK_EVENTS,WIN_NO_EVENTS,WIN_MOUSE_BUTTONS,LOC_DRAG,0,
            0);
    graphPw = canvas_pixwin(graphCanvas);
}

void
graphPaint(item,event)
Panel_item      item;
Event           *event;
{
    panelMessage(graphMessage,paintMessage);
}

void
graphInvert()
{
    pw_writebackground(graphPw,0,0,graphCanvasWidth,graphCanvasHeight,
            PIX_NOT(PIX_DST));
}
```

```
void
graphHardcopyMenu(item,event)
Panel_item      item;
Event          *event;
{
int             selection;
static Menu     hardcopyMenu;
void            graphHardcopyCmd();

    if (!hardcopyMenu)
        hardcopyMenu = menu_create(MENU_STRINGS,
                                   "Hardcopy frame",
                                   "Hardcopy graph", 0,
                                  0);

    selection = (int) menu_show(hardcopyMenu, graphControlPanel, event, 0);
    graphHardcopyCmd(item, selection, event);
}


/*
 *  graphHardcopyCmd()
 */
void
graphHardcopyCmd(hardcopyItem, selection, event)
Panel_item      hardcopyItem;
int             selection;
Event          *event;
{
int             width, height;

    if (!selection)
        return;

    switch (selection)
    {
    case 1:  /* automatic hardcopy of graph frame */
        graphDumpDisplay();
        panelMessage(graphMessage,dumpFrameMessage);
        width = (int) window_get(graphFrame, WIN_WIDTH);
        height = (int) window_get(graphFrame, WIN_HEIGHT);
        autoSizeDump(width, height);
        break;
    case 2:  /* automatic hardcopy of graph canvas */
        dumpCanvas(graphCanvas, NULL);
        panelMessage(graphMessage,dumpGraphMessage);
        autoSizeDump(graphCanvasWidth, graphCanvasHeight);
        break;
    default:
        printf(" Error in graphHardcopyCmd: unknown selection %d\n", selection);
    }
}


graphDumpDisplay()
{
```

```
struct pixrect  *framepr, *mem_create(), *screen;
int              fd, x, y, width, height, mainX, mainY;
FILE            *fp;

    fd = open(DUMP_FILE, O_CREAT, 0666);  /* create a new file if possible */
    close(fd);
    fd = open(DUMP_FILE, O_TRUNC, 0666);  /* truncate to zero length */
    close(fd);
    fd = open(DUMP_FILE, O_RDWR, 0666);
    fp = fdopen(fd,"w+");
    if(fp == NULL)
    {
        sprintf(message,"%s could not be opened",filename);
        warning(message);
        return;
    }

    x = (int) window_get(graphFrame,WIN_X);
    y = (int) window_get(graphFrame,WIN_Y);
    if (mainFrame)
    {
        mainX = (int) window_get(mainFrame,WIN_X);
        mainY = (int) window_get(mainFrame,WIN_Y);
        x += mainX;
        y += mainY;
    }
    width = (int) window_get(graphFrame, WIN_WIDTH);
    height = (int) window_get(graphFrame, WIN_HEIGHT);
    screen = pr_open("/dev/fb");
    if (screen == NULL) syserr("can't find framebuffer");
    framepr = mem_create(width, height, 1);
    pr_rop(framepr, 0, 0, width, height, PIX_SRC, screen, x, y);
    pr_dump(framepr, fp, NULL, RT_STANDARD, 1);

    fclose(fp);
}


void
graphWriteFile()
{
Panel_item          item;
Event              *event;

    writeFileMain(item, event, graphCanvas, NULL);
}

void
graphQuit()
{
    if (mainFrame)
    {
        panelMessage(graphMessage,clearMessage);
        graphClearCanvas();
        window_set(graphFrame, WIN_SHOW, FALSE, 0);
    }
    else
        window_destroy(graphFrame);
```

```
    free (graphData);
    graphData = NULL;    /* the free knows only about "data", not "graphData";
                          * hence, graphInit() will try to free graphData
                          * if it is not NULL, resulting in a seg. fault!  */
}

void
graphScaleProc()
{
    if (!panel_get_value(graphScaleChoice))
    {    /*  automatic scaling */
        graphAutoScale = 1;
        panelMessage(graphScaling, clearMessage);
    }
    else
    {   /*  otherwise, do manual scaling */
        graphAutoScale = 0;
        if (!graphInputFrame)
            graphInputMenu();
        else
            window_set(graphInputFrame, WIN_SHOW, TRUE, 0);
        sprintf(varMessage,"X: %d to %d; Y: %d to %d\n", graphData->minX,
            graphData->maxX, graphData->minY, graphData->maxY);
        panelMessage(graphInputMessage,varMessage);
        panelMessage(graphScaling,varMessage);
    }
}

graphInputMenu()
{
/*  Frame              graphInputFrame;
 *  Panel              graphInputPanel;    */
void               graphInputSelect();
void               graphInputQuit();
void               graphInputInit();

    graphInputFrame = window_create(graphFrame, FRAME,
        WIN_X,                  GRAPH_FRAME_WIDTH,
        WIN_Y,                  100,
        WIN_WIDTH,              GRAPH_FRAME_WIDTH,
        WIN_HEIGHT,             75,
        0);
    graphInputPanel = window_create(graphInputFrame, PANEL, 0);
    graphInputMessage = panel_create_item(graphInputPanel, PANEL_MESSAGE,
        PANEL_ITEM_X,          0,
        PANEL_ITEM_Y,          ATTR_ROW(0),
        PANEL_LABEL_BOLD,      TRUE,
        PANEL_LABEL_STRING,    "                                   ",
        PANEL_SHOW_ITEM,       FALSE,
        0);
    panel_create_item(graphInputPanel, PANEL_CHOICE,
        PANEL_ITEM_X,          0,
        PANEL_ITEM_Y,          ATTR_ROW(1),
        PANEL_LABEL_BOLD,      TRUE,
        PANEL_CHOICE_STRINGS,  "MinX", "MaxX", "MinY", "MaxY", 0,
        PANEL_NOTIFY_PROC,     graphInputSelect,
        0);
```

```
    panel_create_item(graphInputPanel, PANEL_BUTTON,
        PANEL_LABEL_IMAGE,
            panel_button_image(graphInputPanel,"Quit",5,0),
        PANEL_LABEL_BOLD,       TRUE,
        PANEL_NOTIFY_PROC,      graphInputQuit,
        0);
    graphInputText = panel_create_item(graphInputPanel, PANEL_TEXT,
        PANEL_ITEM_X,           0,
        PANEL_ITEM_Y,           ATTR_ROW(2),
        PANEL_LABEL_BOLD,       TRUE,
        PANEL_VALUE_DISPLAY_LENGTH,     20,
        PANEL_LABEL_STRING,     "                       ",
        PANEL_NOTIFY_PROC,      graphInputInit,
        0);
    window_fit_height(graphInputPanel);
    window_set(graphInputFrame, WIN_SHOW, TRUE, 0);
    panelMessage(graphInputMessage,inputStart);
    graphInputInit();
}

void
graphInputSelect(selectItem, choice, event)
Panel_item          selectItem;
int                 choice;
Event              *event;
{
    graphInputInit();
    switch(choice)
    {
    case 0:         /* replace MinX */
        graphData->minX = atoi(panel_get_value(graphInputText));
        break;
    case 1:         /* replace MaxX */
        graphData->maxX = atoi(panel_get_value(graphInputText));
        break;
    case 2:         /* replace MinY */
        graphData->minY = atoi(panel_get_value(graphInputText));
        break;
    case 3:         /* replace MaxY */
        graphData->maxY = atoi(panel_get_value(graphInputText));
        break;
    default:
        printf("Error in graphInputSelect: unknown choice");
    }
    sprintf(varMessage,"X: %d to %d; Y: %d to %d\n", graphData->minX,
        graphData->maxX, graphData->minY, graphData->maxY);
    panelMessage(graphInputMessage,varMessage);
    panelMessage(graphScaling,varMessage);
    panel_set_value(graphInputText,"");
}

void
graphInputQuit()
{
    window_set(graphInputFrame, WIN_SHOW, FALSE, 0);
}
void
graphInputInit()
{
```

```
    panel_set(graphInputText, PANEL_LABEL_STRING, "  Value:",
        PANEL_SHOW_ITEM,    TRUE,
        0);
}

void
graphSelectType(selectedPanel, type, event)
Panel_item        selectedPanel;
int               type;
Event            *event;
{

    graphClearCanvas();
    switch (type)
    {
    case 0:     /* display histogram */
        graphData->type = HISTOGRAM;
        break;
    case 1:     /* display curve */
        graphData->type = CURVE;
        break;
    case 2:     /* display points */
        graphData->type = POINTS;
        break;
    default:
        printf("Error in graphSelectType: unknown plot type\n");
    }
    graphPlotData(graphData);
}

graphClearCanvas()
{
    pw_writebackground(graphPw,0,0,graphCanvasWidth,graphCanvasHeight,PIX_CLR);
}

/************************************
 *    Graphical routines          *
 ************************************/

DATA *
graphInit()
{
DATA            *data;
int              i;
/*  char            *titleString;  */

    if (graphData)  /* clean up previous stuff */
    {
        free (graphData);
        graphData = NULL;
    }

    data = (DATA *)calloc(1, sizeof(DATA));
    if (!data)
        syserr(" Malloc failure for data in graphInit in graph.c");
    data->n = 0;
    data->minX = data->maxX = data->minY = data->maxY = 0;
```

```
    data->scaleX = data->scaleY = 0.0;
    data->origX = data->origY = 0;
    data->type = HISTOGRAM;
    data->title = "";
    for (i = 0; i < GRAPH_ARRAY_SIZE; i++)
        data->x[i] = data->y[i] = 0;
    return(data);
}

graphPutTitle(data, title)
DATA        *data;
char        *title;.
{
    data->title = (char *)malloc(strlen(title) + 1);
    if (!data->title)
    {
        printf("Malloc error in graphPutTitle");
        return;
    }
    strcpy(data->title, title);
}

graphPutData(data,x,y)
DATA        *data;
int          x,y;
{
int          nextN;

    nextN = data->n;
    if (nextN > (GRAPH_ARRAY_SIZE - 3))
    {
        if (!tooMuchData)  /* only print the message the first time */
        {
            printf("Error in graphPutData: too many data points\n");
            tooMuchData = 1;
        }
        return;
    }
    data->x[nextN] = x;
    data->y[nextN] = y;
    data->n++;
}

graphPutType(data,type)
DATA         *data;
int           type;
{

    data->type = type;
}

graphPlotData(data)
DATA         *data;
{
int           errFlag, graphMinMax(), graphSetScale(), graphAxes();

    if (!data)
    {
        printf("Error in graphPlotData: no data\n");
        return;
```

```
    /* do preliminaries */
errFlag = graphGetMinMax(data);
if (errFlag)
{
    printf(" Error in graphPlotData from graphGetMinMax\n");
    return;
}
errFlag = graphSetScale(data);
if (errFlag)
{
    printf(" Error in graphPlotData from graphSetScale\n");
    return;
}

graphClearCanvas();
panelMessage(graphMessage,clearMessage);
strcpy(varMessage,data->title);
panelMessage(graphMessage,varMessage);

sprintf(varMessage,"X: %d to %d; Y: %d to %d\n",
        data->minX, data->maxX, data->minY, data->maxY);
panelMessage(graphScaling,varMessage);

    /* plot axes */
errFlag = graphAxes(data);
if (errFlag)
{
    printf("  Error in graphPlotData from graphAxes\n");
    return;
}

    /* plot data */
switch (data->type)
{
case POINTS:
    graphPoints(data);
    break;
case CURVE:
    graphCurve(data);
    break;
case HISTOGRAM:
    graphHistogram(data);
    break;
default:
    printf(" Error in graphPlotData: plot type unknown\n");
    break;
}
}

int
graphGetMinMax(data)
DATA          *data;
{
int            i;

    if (!data)
    {
        printf("Error in graphGetMinMax:  no data\n");
```

```
        return(1);
    }

    if (!data->n)
    {
        printf("Error in graphGetMinMax: no datapoints\n");
        return(1);
    }

    if (!graphAutoScale)  /* if manual, do not reset min and max */
        return(0);

    data->minX = data->minY = 1000000000;
    data->maxX = data->maxY = -1000000000;
    for (i = 0; i < data->n; i++)
    {
        data->minX = Min(data->x[i], data->minX);
        data->maxX = Max(data->x[i], data->maxX);
        data->minY = Min(data->y[i], data->minY);
        data->maxY = Max(data->y[i], data->maxY);
    }
#if DEBUG
    printf("MinX = %d; MaxX = %d; MinY = %d; MaxY = %d\n",
        data->minX, data->maxX, data->minY, data->maxY);
#endif DEBUG
    return(0);
}
```

---

```
int
graphSetScale(data)
DATA          *data;
{
int            maxX, minX, maxY, minY, rangeX, rangeY;
int            signMaxX, signMinX, signMaxY, signMinY;
float          scaleX, scaleY;

    if (!data)
    {
        printf("Error in graphSetScale:  no data\n");
        return(1);
    }

    minX = data->minX;
    maxX = data->maxX;
    minY = data->minY;
    maxY = data->maxY;
    signMinX = Sign(minX);
    signMaxX = Sign(maxX);
    signMinY = Sign(minY);
    signMaxY = Sign(maxY);
    if (graphAutoScale)
    {   /* always include 0 in range */
        if (signMinX * signMaxX >= 0)
        {  /* they're either both positive or both negative */
            if (signMaxX > 0)
            {  /* plot from zero to max */
                rangeX = maxX;
                data->origX = 0;
            }
```

```
            else
            {  /* plot from min to zero */
                rangeX = -minX;
                data->origX = minX;
            }
        }
        else
        {  /* plot from min to max */
            rangeX = maxX - minX;
            data->origX = minX;
        }

        if (signMinY * signMaxY >= 0)
        {  /* they're either both positive or both negative */
            if (signMaxY > 0)
            {   /* plot from zero to max */
                rangeY = maxY;
                data->origY = 0;
            }
            else
            {   /* plot from min to zero */
                rangeY = -minY;
                data->origY = minY;
            }
        }
        else
        {  /* plot from min to max */
            rangeY = maxY - minY;
            data->origY = minY;
        }
    }
    else
    {   /* take the range as given */
        rangeX = maxX - minX;
        data->origX = minX;
        rangeY = maxY - minY;
        data->origY = minY;
    }
#if DEBUG
    printf("rangeX = %d; rangeY = %d\n", rangeX, rangeY);
    printf("origX = %d; origY = %d\n", data->origX, data->origY);
#endif DEBUG

    if (!rangeX || !rangeY)
    {
        printf("Error in graphSetScale: some range = 0\n");
        return(1);
    }

      /* allows expansion of canvas by resizing window */
    graphCanvasWidth = (int) window_get(graphCanvas, WIN_WIDTH);
    graphCanvasHeight = (int) window_get(graphCanvas, WIN_HEIGHT);

    scaleX = (graphCanvasWidth - 2 * MARGIN) / ((float) rangeX);
    scaleY = (graphCanvasHeight - 2 * MARGIN) / ((float) rangeY);
    data->scaleX = scaleX;
    data->scaleY = scaleY;
#if DEBUG
    printf(" scaleX = %-.3f; scaleY = %-.3f\n",scaleX,scaleY);
#endif DEBUG
```

```
    return(0);
}


int
graphAxes(data)
DATA          *data;
{
int             errFlag, graphSetScale(), op, left, top, right, bottom;
int             i, graphCanCoord(), axisX, axisY, centerX, centerY, canX, canY;
int             extentX, extentY, exponX, exponY, factorX, factorY, ticX, ticY;
float           scaleX, scaleY;
struct rect     r;

    if (!data)
    {
        printf("Error in graphAxes:  no data\n");
        return(1);
    }

    scaleX = data->scaleX;
    scaleY = data->scaleY;
    if (!scaleX || !scaleY)
    {
        errFlag = graphSetScale(data);
        if (errFlag)
        {
            printf(" Error in graphAxes from graphSetScale\n");
            return(1);
        }
        scaleX = data->scaleX;
        scaleY = data->scaleY;
    }
    op = PIX_SET;
    centerX = graphCanvasWidth >> 1;
    centerY = graphCanvasHeight >> 1;
    extentX = Max(Abs(data->maxX), Abs(data->minX));
    extentY = Max(Abs(data->maxY), Abs(data->minY));
    exponX = (int) log10 ((double) extentX);
    exponY = (int) log10 ((double) extentY);
    factorX = (int) pow(10.,(double) exponX);
    factorY = (int) pow(10.,(double) exponY);
#if DEBUG
    printf("extentX = %d,extentY = %d,exponX = %d,exponY = %d\n",
        extentX, extentY, exponX, exponY);
    printf("factorX = %d,factorY = %d\n",factorX,factorY);
#endif DEBUG
    left = MARGIN;
    right = graphCanvasWidth - MARGIN;
    top = MARGIN;
    bottom = graphCanvasHeight - MARGIN;
    axisX = graphCanCoord(0, data->origY, scaleY, YAXIS);
    axisY = graphCanCoord(0, data->origX, scaleX, XAXIS);
    pw_get_region_rect(graphPw,&r);
    pw_lock(graphPw,&r);
    if (graphAutoScale || graphCanClip(centerX, axisY))  /* x-axis within canva
        pw_vector(graphPw, left, axisX, right, axisX, op, 1);
    if (graphAutoScale || graphCanClip(axisY, centerY))  /* y-axis within canvas
        pw_vector(graphPw, axisY, top, axisY, bottom, op, 1);
```

```
     for (i = -10; i<=10; i++)
     {    /* draw clipped tics */
         ticX = i * factorX;
         ticY = i * factorY;
         canX = graphCanCoord(ticX, data->origX, scaleX, XAXIS);
         canY = graphCanCoord(ticY, data->origY, scaleY, YAXIS);
         if (graphCanClip(canX, axisX))
             graphDrawPoint(canX, axisX, 4, op);
         if (graphCanClip(axisY, canY))
             graphDrawPoint(axisY, canY, 4, op);
     }
     pw_unlock(graphPw);
     return(0);
}

graphPoints(data)
DATA           *data;
{
int             errFlag, graphCheck(), graphCanCoord();
int             i, op, canX, canY;
float           scaleX, scaleY;
struct rect     r;

     errFlag = graphCheck(data);
     if (errFlag)
     {
         printf("  Error in graphCurve from graphCheck\n");
         return;
     }
     scaleX = data->scaleX;
     scaleY = data->scaleY;
     op = PIX_SET;
     pw_get_region_rect(graphPw,&r);
     pw_lock(graphPw,&r);
     for (i = 0; i < data->n; i++)
     {
         canX = graphCanCoord(data->x[i], data->origX, scaleX, XAXIS);
         canY = graphCanCoord(data->y[i], data->origY, scaleY, YAXIS);
         if (graphAutoScale || graphCanClip(canX, canY))
             graphDrawPoint(canX, canY, 2, op);
     }
     pw_unlock(graphPw);
}

graphCurve(data)
DATA           *data;
{
int             errFlag, graphCheck(), graphCanCoord();
int             i, op, oldX, oldY, newX, newY;
float           scaleX, scaleY;
struct rect     r;

     errFlag = graphCheck(data);
     if (errFlag)
     {
         printf("  Error in graphCurve from graphCheck\n");
         return;
     }
```

```
    scaleX = data->scaleX;
    scaleY = data->scaleY;
    op = PIX_SET;
    oldX = graphCanCoord(data->x[0], data->origX, scaleX, XAXIS);
    oldY = graphCanCoord(data->y[0], data->origY, scaleY, YAXIS);
    pw_get_region_rect(graphPw,&r);
    pw_lock(graphPw,&r);
    for (i = 1; i < data->n; i++)
    {
        newX = graphCanCoord(data->x[i], data->origX, scaleX, XAXIS);
        newY = graphCanCoord(data->y[i], data->origY, scaleY, YAXIS);
        if (graphAutoScale ||
                (graphCanClip(oldX, oldY) && graphCanClip(newX, newY)))
            pw_vector(graphPw, oldX, oldY, newX, newY, op, 1);
        oldX = newX;
        oldY = newY;
    }
    pw_unlock(graphPw);
}

graphHistogram(data)
DATA            *data;
{
int             errFlag, graphCheck(), graphCanCoord();
int             i, op, canX, canY, onAxisY;
float           scaleX, scaleY;
struct rect     r;

    errFlag = graphCheck(data);
    if (errFlag)
    {
        printf("  Error in graphCurve from graphCheck\n");
        return;
    }

    scaleX = data->scaleX;
    scaleY = data->scaleY;
    op = PIX_SET;
    onAxisY = graphCanCoord(0, data->origY, scaleY, YAXIS);
    pw_get_region_rect(graphPw,&r);
    pw_lock(graphPw,&r);
    for (i = 0; i < data->n; i++)
    {
        canX = graphCanCoord(data->x[i], data->origX, scaleX, XAXIS);
        canY = graphCanCoord(data->y[i], data->origY, scaleY, YAXIS);
        if (graphAutoScale ||
                (graphCanClip(canX, canY) && graphCanClip(canX, onAxisY)))
            pw_vector(graphPw, canX, canY, canX, onAxisY, op, 1);
    }
    pw_unlock(graphPw);
}


/*
 *  graphCanCoord():  returns the canvas pixel coordinate value,
 *                       relative to the upper-left corner (minus the
 *                       MARGIN) of the canvas.
 *                    when the "val" is at the "orig", the canvas
 *                       coordinate returned is the lower-left corner
 *                       (minus the MARGIN) of the canvas!
```

```
 */
int
graphCanCoord(val, orig, scale, axis)
double          scale;
int             val, orig, axis;
{
int             canCoord;

    switch(axis)
    {
    case XAXIS:
        canCoord = MARGIN + scale * (val - orig);
        return(canCoord);
        break;
    case YAXIS:
        canCoord = (graphCanvasHeight - MARGIN) - scale * (val - orig);
        return(canCoord);
        break;
    default:
        printf("Error in graphCanCoord: unknown axis type\n");
    }
}

int
graphCanClip(canX, canY)
int             canX, canY;
{   /* returns 1 if within margined canvas */
    if (canX >= MARGIN && canX <= (graphCanvasWidth - MARGIN)
            && canY >= MARGIN && canY <= (graphCanvasHeight - MARGIN))
        return(1);
    else
        return(0);
}

graphDrawPoint(canX, canY, size, op)
int             canX, canY, size, op;
{
int             left, right, top, bottom;

      /* this is for a plus sign */
    left = canX - size;
    right = canX + size;
    top = canY - size;
    bottom = canY + size;
    pw_vector(graphPw, left, canY, right, canY, op, 1);
    pw_vector(graphPw, canX, top, canX, bottom, op, 1);
}

int
graphCheck(data)
DATA            *data;
{
int             errFlag, graphSetScale();
float           scaleX, scaleY;

    if (!data)
    {
        printf(" Error in graphCheck: no data\n");
        return(1);
    }
```

```
    scaleX = data->scaleX;
    scaleY = data->scaleY;
    if (!scaleX || !scaleY)
    {
        errFlag = graphSetScale(data);
        if (errFlag)
        {
            printf(" Error in graphCheck from graphSetScale: no range\n");
            return(1);
        }
    }

    if (!data->n)
    {
        printf(" Error in graphCheck:  no data points\n");
        return(1);
    }

    return(0);   /* OK */
}

graphTestExample()
{
DATA          *testData, *graphInit();
int            i, x, y;

        /* initialize graph */
    testData = graphInit();

        /* input data into fields */
    graphPutTitle(testData,"Example Data");
    for (i = -50; i <= 50; i++)
    {
        x = 2 * i;
        y = x * Abs(x);
        graphPutData(testData,x,y);
    }
    graphPutType(testData,HISTOGRAM);
    graphMake(testData);
}
 /*
  *  coordsA.c:  includes subroutines
  *              --createCoords():  creates struct and associated arrays
  *              --destroyCoords():  frees arrays and returns NULL ptr
  *              --xformCoords():  translation and scaling
  *              --storeCoords():   stores ON pixels in a pixrect
  *              --printCoords():   prints coord pairs
  *              --displayCoords(): writes coord to a pixrect
  *              --displayArray():  writes coordinated array to a pixrect
  *              --writeCoords():  writes formatted to file
  *              --readCoords():   reads formatted from a file
  *              --coordsToBoxes():
  */

#include <stdio.h>
#include <llama.h>
#include <imageReps.h>
#include "alpaca.h"
#include "morph.h"
```

```
#include "strelGlobals.h"

static char              message[50];

/*
 *  createCoords():  takes the number of coordinate pairs, and returns
 *                   a COORDS data structure.
 */
COORDS *
createCoords(numPts)
int           numPts;
{
COORDS        *coords;
int           *x, *y;

    coords = (COORDS *) calloc(1, sizeof(COORDS));
    x = (int *) calloc(numPts, sizeof(int));
    y = (int *) calloc(numPts, sizeof(int));
    if (!coords || !x || !y)
    {
        printf(" Error in createCoords(): malloc failure!\n");
        return NULL;
    }
    coords->x = x;
    coords->y = y;
    coords->n = numPts;

    return (coords);
  /*
   *  destroyCoords():  frees the storage and returns a NULL pointer
   */
  COORDS *
  destroyCoords(coords)
  COORDS     *coords;
  {

      if (!coords)
      {
          printf(" Error in destroyCoords: COORDS structure not defined\n");
          return NULL;
      }

      free(coords->x);
      free(coords->y);
      free(coords);
      return NULL;
  }


  /*
   *  xformCoords()
   */
  COORDS *
  xformCoords(coords, shiftX, shiftY, scale)
  COORDS         *coords;
  int             shiftX, shiftY, scale;
  {
  int             i, numPts;
  COORDS         *coordsOut, *createCoords();
```

```
    if (!coords)
    {
        printf(" Error in xformCoords: no COORDS structure\n");
        return NULL;
    }

    numPts = coords->n;
    coordsOut = createCoords(numPts);
    if (!coordsOut)
    {
        printf(" Error in xformCoords: coordsOut not created\n");
        return NULL;
    }

        /* shift the origin and then scale */
    for (i = 0; i < numPts; i++)
    {
        coordsOut->x[i] = scale * (coords->x[i] + shiftX);
        coordsOut->y[i] = scale * (coords->y[i] + shiftY);
    }

    return (coordsOut);
}


/*
 *  storeCoords():  takes a pixrect, creates a COORDS data structure,
 *                       places the coordinates of the ON pixels in the
 *                       data structure, and returns the COORDS struct.
 */
COORDS *
storeCoords(pixr)
Pixrect          *pixr;
{
COORDS           *coords, *createCoords();
int               numPts, h, Bpl, arrayIndex, i, j, k, x1, x2;
unsigned char    *bytePtr, byte;
static char       procName[] = "storeCoords";

    if (!isPrDefined(pixr, procName))
        return NULL;

    numPts = numberPr(pixr, PIXELS);

    coords = createCoords(numPts);
    if (!coords)
        return NULL;

    Bpl = prBytesPerLine(pixr);
    h = pixr->pr_size.y;
    bytePtr = (unsigned char *) mpr_d(pixr)->md_image;
    arrayIndex = 0;
    for (i = 0; i < h; i++)
        for (j = 0; j < Bpl; j++)
        {
            byte = *bytePtr;
            if (byte)  /* extract the coordinates of the ON pixels */
            {
```

```
                x1 = 8 * j;
                x2 = x1 + 8;
                for (k = x1; k < x2; k++)
                    if (pr_get(pixr, k, i) == 1)
                    {
                        coords->x[arrayIndex] = k;
                        coords->y[arrayIndex] = i;
                        arrayIndex++;
                    }
            }
            bytePtr++;
        }

    if (arrayIndex != numPts)
        printf(" Error in storeCoords(): %d ON pixels, %d coord pairs!!\n",
                numPts, arrayIndex);

    return (coords);
}

/*
 *  printCoords()
 */
printCoords(coords)
COORDS       *coords;
{
int             numPts, i;

    if (!coords)
    {
        printf(" Error in printCoords(): no COORD data structure\n");
        return;
    }

    numPts = coords->n;
    printf("      ");
    for (i = 0; i < numPts; i++)
    {
        printf("(%d,%d) ", coords->x[i], coords->y[i]);
        if (((i+1) % 6) == 0)
            printf("\n      ");
    }
    printf("\n");
}


/*
 *  displayCoords():  writes pixels from input COORDS structure onto pixrect.
 */
displayCoords(pixr, coords)
Pixrect        *pixr;
COORDS         *coords;
{
int             i, numPts;
static char     procName[] = "displayCoords";

    if (!isPrDefined(pixr, procName))
        return;

    if (!coords)
```

```
    {
        printf(" Error in displayCoords(): COORDS structure not defined\n");
        return;
    }

    numPts = coords->n;
    clearPr(pixr);
    for (i = 0; i < numPts; i++)
        pr_put(pixr, coords->x[i], coords->y[i], 1);
}


/*
 *  displayArray():  displays in a pixrect a binary array, at the locations
 *                   specified by a COORDS structure.  Useful for debugging.
 *             Note: number of points in COORDS should equal array size,
 *                   but this cannot be checked.
 */
displayArray(pixr, coords, array)
Pixrect         *pixr;
COORDS          *coords;
unsigned char   *array;
{
int              i, numPts;
static char      procName[] = "displayArray";

    if (!isPrDefined(pixr, procName))
        return;
    if (!coords || !array)
    {
        printf(" Error in displayArray(): input data structure not defined\n");
        return;
    }

    numPts = coords->n;
    clearPr(pixr);
    for (i = 0; i < numPts; i++)
        pr_put(pixr, coords->x[i], coords->y[i], array[i]);
}


/*
 *  writeCoords():  formatted write of a COORDS structure to named file
 */
writeCoords(filename, coords)
char        *filename;
COORDS      *coords;
{
int          n, i;
FILE        *fp;

    if (!coords)
    {
        printf(" Error in writeCoords: no COORDS data structure\n");
        return 1;
    }

    fp = fopen(filename, "w");
    if (!fp)
```

```
{
    printf(" Error in writeCoords: failure to open %s\n", filename);
    return 1;
}

n = coords->n;
fprintf(fp, " Number of points: %d\n", n);
fprintf(fp, " Coords:\n   ");
for (i = 0; i < n; i++)
{
    fprintf(fp, "(%d,%d) ", coords->x[i], coords->y[i]);
    if (i % 5 == 4) fprintf(fp, "\n   ");
}
fprintf(fp, "\n");

fclose(fp);
}

/*
 *  readCoords():  formatted read of a COORDS structure from named file;
 *                 returns the structure.
 */
COORDS *
readCoords(filename)
char        *filename;
{
int          n, i, xcoord, ycoord;
FILE        *fp;
COORDS      *coords, *createCoords();

    fp = fopen(filename, "r");
    if (!fp)
    {
        printf(" Error in readCoords: failure to open %s\n", filename);
        return NULL;
    }

    fscanf(fp, " Number of points: %d\n", &n);
    coords = createCoords(n);
    fscanf(fp, " Coords:\n   ");
    for (i = 0; i < n; i++)
    {
        fscanf(fp, "(%d,%d) ", &coords->x[i], &coords->y[i]);
        if (i % 5 == 4) fscanf(fp, "\n   ");
    }

    fclose(fp);

    return (coords);
}


/*
 *  coordsToBoxes()
 */
BOXES *
coordsToBoxes(coords)
COORDS       *coords;
{
```

```
int          *x1, *x2, *y1, *y2;
int           numPts, numRects, i, j, index, x, y, found;
BOXES        *boxes, *createBoxes();

    if (!coords)
    {
        printf(" Error in coordsToBoxes: COORDS struct undefined\n");
        return NULL;
    }

    numPts = coords->n;
    if (numPts % 4)    /* not evenly divisible by 4 */
    {
        printf(" Error in coordsToBoxes: npts = %d not div. by 4\n", numPts);
        return NULL;
    }

    numRects = numPts / 4;
    boxes = createBoxes(numRects);
    if (!boxes)
        return NULL;

        /* make arrays of integers for UL and LR corners of rects */
    x1 = (int *) calloc(numRects, sizeof(int));
    x2 = (int *) calloc(numRects, sizeof(int));
    y1 = (int *) calloc(numRects, sizeof(int));
    y2 = (int *) calloc(numRects, sizeof(int));
    if (!x1 || !y1 || !x2 || !y2)
    {
       printf(" Error in coordsToBoxes: calloc failure for coord. array\n");
       return NULL;
    }

    index = 0;
    for (i = 0; i < numPts; i++)
    {  /* go through each set of 2 coord pairs */
        x = coords->x[i];
        y = coords->y[i];
        found = FALSE;
        for (j = 0; j < index; j++)  /* search rects already started */
            if ((x == x1[j]) && !y2[j])  /* associated with rect j */
            {
                found = TRUE;
                y2[j] = y;
                if (coords->x[i] != x1[j])
                {
                    printf(" Warning in coordsToBoxes, in rect %d:\n", j);
                    printf("   x-coords of points 1 and 3: (%d) and (%d)\n",
                        x1[j], coords->x[i]);
                }
                i++;  /* go to the last point in the rect; check that it's
                           OK  */
                if (coords->x[i] != x2[j])
                {
                    printf(" Warning in coordsToBoxes, in rect %d:\n", j);
                    printf("   x-coords of points 2 and 4: (%d) and (%d)\n",
                        x2[j], coords->x[i]);
                }
```

```
            if (coords->y[i] != y2[j])
            {
                printf(" Warning in coordsToBoxes, in rect %d:\n", j);
                printf("   y-coords of points 3 and 4: (%d) and (%d)\n",
                    y2[j], coords->y[i]);
            }
            break;   /* don't look at any more rectangles */
        }
    if (!found)  /* start a new rect */
    {
        if (index == numRects)  /* check for overflow: this can happen
                                 * if x coords of 1st and 3rd pts differ */
        {
            printf(" Error in coordsToBoxes: too many rects\n");
            return NULL;
        }
        x1[index] = x;
        y1[index] = y;
        i++;  /* get the next point */
        x2[index] = coords->x[i];
        if (coords->y[i] != y)
        {
            printf(" Warning in coordsToBoxes, in rect %d:\n", index);
            printf("   y-coords of points 1 and 2: (%d) and (%d)\n",
                y, coords->y[i]);
        }
        index++;  /* increment to point to the first empty rect
                   * in the set of 4 arrays  */
    }
}
            /* transfer data from arrays to BOXES struct */
        for (i = 0; i < numRects; i++)
        {
            boxes->rect[i]->x = x1[i];
            boxes->rect[i]->y = y1[i];
            boxes->rect[i]->w = x2[i] - x1[i] + 1;
            boxes->rect[i]->h = y2[i] - y1[i] + 1;
        }

            /* finish up */
        free(x1);
        free(y1);
        free(x2);
        free(y2);
        return (boxes);
    }
```

```
/*********************************************************************
 *  Copyright (c) 1989, Xerox Corporation.  All rights reserved. *
    Copyright protection claimed includes all forms and matters
    of copyrightable material and information now allowed by
    statutory or judicial law or hereafter granted, including
    without limitation, material generated from the software
    programs which are displayed on the screen such as icons,
    screen display looks, etc.
 *********************************************************************/

/*
 *  boxesA.c:  includes subroutines
 *              --createBoxes():  creates struct, pointers, and RECT arrays
 *              --xformBoxes():  translation and scaling
 *              --printBoxes():   prints formatted boxes
 *              --displayBoxes():  writes outline of each RECT to a pixrect
 *              --writeBoxes():   writes formatted to a file
 *              --readBoxes():    reads formatted from a file
 *              --boxesToCoords():  makes coords struct of UL corners
 */

#include <stdio.h>
#include <llama.h>
#include <imageReps.h>
#include "alpaca.h"
#include "morph.h"
#include "strelGlobals.h"

static char               message[50];


/*
 *  createBoxes():  takes the number of Rects, and returns a BOXES data
 *                   structure, that has all the rects pre-allocated.
 */
BOXES *
createBoxes(numRects)
int           numRects;
{
int           i;
BOXES        *boxes;

        /* make the boxes structure */
    boxes = (BOXES *) calloc(1, sizeof(BOXES));
    if (!boxes)
    {
        printf(" Error in createBoxes: calloc failure for boxes\n");
        return NULL;
    }
    boxes->n = numRects;

        /* make the array of pointers to rects, and then make the
           array of rects */
    boxes->rect = (RECT **) calloc(numRects, sizeof(RECT *));
    for (i = 0; i < numRects; i++)
    {
        boxes->rect[i] = (RECT *) calloc(1, sizeof(RECT));
        if (!boxes->rect[i])
        {
            printf(" Error in createBoxes: calloc failure for rect\n");
```

```
            return NULL;
        }
    }

    return (boxes);
}


/*
 *  xformBoxes()
 */
BOXES *
xformBoxes(boxes, shiftX, shiftY, scale)
BOXES         *boxes;
int            shiftX, shiftY, scale;
{
int            i, numRects;
BOXES         *boxesOut, *createBoxes();

    if (!boxes)
    {
        printf(" Error in xformBoxes: no BOXES structure\n");
        return NULL;
    }

    numRects = boxes->n;
    boxesOut = createBoxes(numRects);
    if (!boxesOut)
    {
        printf(" Error in xformBoxes: boxesOut not created\n");
        return NULL;
    }

        /* shift the origin and then scale */
    for (i = 0; i < numRects; i++)
    {
        boxesOut->rect[i]->x = Max(0, boxes->rect[i]->x + shiftX);
        boxesOut->rect[i]->y = Max(0, boxes->rect[i]->y + shiftY);
        boxesOut->rect[i]->x *= scale;
        boxesOut->rect[i]->y *= scale;
        boxesOut->rect[i]->w = boxes->rect[i]->w * scale;
        boxesOut->rect[i]->h = boxes->rect[i]->h * scale;
    }

    return (boxesOut);
}
/*
 *  printBoxes()
 */
printBoxes(boxes)
BOXES         *boxes;
{
int            numRects, i;

    if (!boxes)
    {
        printf(" Error in printBoxes(): no BOXES data structure\n");
        return;
```

```
    }

    numRects = boxes->n;
    printf(" Number of rectangles = %d\n", numRects);
    for (i = 0; i < numRects; i++)
        printf("    (%d,%d,%d,%d)\n", boxes->rect[i]->x, boxes->rect[i]->y,
                boxes->rect[i]->w, boxes->rect[i]->h);
}


/*
 *  displayBoxes(): writes rectangle outline for each RECT onto a pixrect.
 */
displayBoxes(pixr, boxes)
Pixrect         *pixr;
BOXES           *boxes;
{
int             i, numRects, x1, y1, x2, y2;
static char     procName[] = "displayBoxes";

    if (!isPrDefined(pixr, procName))
        return;

    if (!boxes)
    {
        printf(" Error in displayBoxes(): BOXES structure not defined\n");
        return;
    }

    numRects = boxes->n;
    clearPr(pixr);
    for (i = 0; i < numRects; i++)
    {
        x1 = boxes->rect[i]->x;
        y1 = boxes->rect[i]->y;
        x2 = x1 + boxes->rect[i]->w - 1;
        y2 = y1 + boxes->rect[i]->h - 1;
        pr_vector(pixr, x1, y1, x2, y1, PIX_SET, 1);
        pr_vector(pixr, x2, y1, x2, y2, PIX_SET, 1);
        pr_vector(pixr, x2, y2, x1, y2, PIX_SET, 1);
        pr_vector(pixr, x1, y2, x1, y1, PIX_SET, 1);
    }
}


/*
 *  writeBoxes():  formatted write of a BOXES structure to named file
 */
writeBoxes(filename, boxes)
char            *filename;
BOXES           *boxes;
{
int             n, i, x, y, w, h;
FILE            *fp;

    if (!boxes)
    {
        printf(" Error in writeBoxes: no BOXES data structure\n");
        return 1;
    }
```

```
    fp = fopen(filename, "w");
    if (!fp)
    {
        printf(" Error in writeBoxes: failure to open %s\n", filename);
        return 1;
    }

    n = boxes->n;
    fprintf(fp, " Number of boxes: %d\n", n);
    for (i = 0; i < n; i++)
    {
        fprintf(fp, "   Box %d:\n", i + 1);
        x = boxes->rect[i]->x;
        y = boxes->rect[i]->y;
        w = boxes->rect[i]->w;
        h = boxes->rect[i]->h;
        fprintf(fp, "     (%d,%d,%d,%d)\n", x, y, w, h);
    }

    fclose(fp);
}


/*
 *  readBoxes():  formatted read of a BOXES structure from named file;
 *                returns the structure.
 */
BOXES *
readBoxes(filename)
char        *filename;
{
int          n, i, x, y, w, h, tmp;
FILE        *fp;
BOXES       *boxes, *createBoxes();

    fp = fopen(filename, "r");
    if (!fp)
    {
        printf(" Error in readBoxes: failure to open %s\n", filename);
        return NULL;
    }

    fscanf(fp, " Number of boxes: %d\n", &n);
    boxes = createBoxes(n);
    for (i = 0; i < n; i++)
    {
        fscanf(fp, "   Box %d:\n", &tmp);
        fscanf(fp, "     (%d,%d,%d,%d)\n", &x, &y, &w, &h);
        boxes->rect[i]->x = x;
        boxes->rect[i]->y = y;
        boxes->rect[i]->w = w;
        boxes->rect[i]->h = h;
    }

    fclose(fp);

    return (boxes);
}
```

```
/*
 *  boxesToCoords():  returns the UL corners of each rect, in
 *                       a COORDS data structure.
 */
COORDS *
boxesToCoords(boxes)
BOXES       *boxes;
{
int          i, n;
COORDS      *coords, *createCoords();

    if (!boxes)
    {
        printf(" Error in boxesToCoords: no BOXES data structure\n");
        return NULL;
    }

    n = boxes->n;
    coords = createCoords(n);
    for (i = 0; i < n; i++)
    {
        coords->x[i] = boxes->rect[i]->x;
        coords->y[i] = boxes->rect[i]->y;
    }

    return coords;
}

/*
 *  tile.c--includes subroutines
 *                  createTile()
 *                  displayTile()
 *                  destroyTile()
 *
 *                  rectOfPixrect()
 */

#include <stdio.h>
#include <llama.h>
#include <imageReps.h>
#include "alpaca.h"
#include "morph.h"

static char   message[80];


/*
 *  createTile()
 */
PRTILE *
createTile(pixr, nx, ny)
Pixrect       *pixr;
int            nx, ny;
{
int            i, j, w, h, x, y;
PRTILE        *prtile;
Pixrect     ***tile;
static char    procName[] = "createTile";
```

```
if (!isPrDefined(pixr, procName))
    return NULL;

tile = (Pixrect ***) calloc(ny, sizeof(Pixrect **));
if (!tile)
{
    printf(" Error in createTile: calloc failure for row ptrs\n");
    return NULL;
}

for (i = 0; i < nx; i++)
{
    tile[i] = (Pixrect **) calloc(nx, sizeof(Pixrect *));
    if (!tile[i])
    {
        printf(" Error in createTile: calloc failure for ptrs in row\n");
        return NULL;
    }
}
    w = pixr->pr_size.x / nx;   /* width of each tile */
    h = pixr->pr_size.y / ny;   /* height of each tile */
    for (i = 0; i < ny; i++)
    {
        y = i * h;
        for (j = 0; j < nx; j++)
        {
            x = j * w;
            tile[i][j] = mem_create(w, h, 1);
            if (!tile[i][j])
            {
                printf(" Error in createTile: mem_create failure for tile\n");
                return NULL;
            }
            pr_rop(tile[i][j], 0, 0, w, h, PIX_SRC, pixr, x, y);
        }
    }

    prtile = (PRTILE *) calloc(1, sizeof(PRTILE));
    prtile->nx = nx;
    prtile->ny = ny;
    prtile->w = w;
    prtile->h = h;
    prtile->tile = tile;

    return (prtile);
}


/*
 *  displayTile()
 */
displayTile(pixr, prtile)
Pixrect         *pixr;
PRTILE          *prtile;
{
int              nx, ny, w, h, x, y, i, j;
static char      procName[] = "displayTile";
```

```
if (!isPrDefined(pixr, procName))
    return 1;

if (!prtile)
{
    printf(" Error in displayTile: PRTILE structure not defined\n");
    return 1;
}

nx = prtile->nx;
ny = prtile->ny;
w = prtile->w;
h = prtile->h;

if ((nx * w > pixr->pr_size.x) || (ny * h > pixr->pr_size.y))
{
    printf(" Error in displayTile: destination pr too small for tiles\n");
    return 1;
}
    clearPr(pixr);

    for (i = 0; i < ny; i++)
    {
        y = i * h;
        for (j = 0; j < nx; j++)
        {
            x = j * w;
            pr_rop(pixr, x, y, w, h, PIX_SRC, prtile->tile[i][j], 0, 0);
            opPrPw(pw6, pixr, COPY);
        }
    }

    return 0;
}


/*
 *  destroyTile()
 */
PRTILE *
destroyTile(prtile)
PRTILE      *prtile;
{
int           nx, ny, i, j;
Pixrect     ***tile;

    if (!prtile)
    {
        printf(" Error in destroyTile:  PRTILE structure not defined\n");
        return NULL;
    }

    nx = prtile->nx;
    ny = prtile->ny;
    tile = prtile->tile;
    for (i = 0; i < ny; i++)
    {
        for (j = 0; j < nx; j++)
```

```
            pr_close(tile[i][j]);
        free(tile[i]);
        tile[i] = NULL;
    }
    free(tile);
    free(prtile);

    return NULL;
}


/*
 *  rectOfPixrect():  returns the rect part of a pixrect, if valid; else NULL.
 */
Pixrect *
rectOfPixrect(pixr, rect)
Pixrect         *pixr;
RECT            *rect;
{
int              w, h;
Pixrect         *pixrOut;
static char     procName[] = "rectOfPixrect";

    if (!isPrDefined(pixr, procName))
        return NULL;

    if (!rect)
    {
        printf(" Error in rectOfPixrect: rect not defined\n");
        return NULL;
    }

    w = pixr->pr_size.x;
    h = pixr->pr_size.y;
    if ((rect->x + rect->w > w) || (rect->y + rect->h) > h)
    {
        printf(" Error in rectOfPixrect: rect not valid size\n");
        return NULL;
    }

    pixrOut = mem_create(rect->w, rect->h, 1);
    if (!pixrOut)
    {
        printf(" Error in rectOfPixrect: pixrOut not created\n");
        return NULL;
    }

    pr_rop(pixrOut, 0, 0, rect->w, rect->h, PIX_SRC, pixr, rect->x, rect->y);
    return pixrOut;
}
```

What is claimed is:

1. In a method, performed in a digital processor, for separating textured and solid regions, if any, in a binary input image from other regions, if any, the improvement comprising the steps of:

subjecting the input image to a first set of operations that irreversibly maps the textured and solid regions to solid regions in a resulting image, and reversibly maps features containing ON pixels in the other regions to proportionately thicker features in the resulting image; and subjecting the resulting image to a second set of operations that maps the solid regions to solid regions in a further resulting image and maps the proportionately thickened features in a manner that they are substantially absent from the further resulting image;

whereupon the further resulting image contains solid regions corresponding to the textured and solid regions of the input image.

2. The improvement of claim 1 wherein at least some of said first and second sets of operations are performed in a programmed digital computer.

3. The improvement of claim 1 wherein the resulting image is smaller than the input binary image.

4. The improvement of claim 1, and further comprising the steps of:

determining the number of solid regions in the further resulting image; and in the event of determining the number of solid regions to be greater than a predetermined maximum, removing the smallest of the solid regions.

5. The improvement of claim 4 wherein said step of removing the smallest of the solid regions comprises the steps of:

initializing a structuring element size;

determining the remaining number of solid regions and exiting if the number of remaining solid regions is below the predetermined maximum;

increasing the structuring element size;

opening the image with the structuring element as currently sized; and repeating said determining, increasing, and opening steps.

6. The improvement of claim 1, and further comprising the step of:

filling holes, if any, within the solid regions of the further resulting image.

7. The improvement of claim 6 wherein said step of filling holes within the solid regions of the further resulting image comprises filling each eight-connected region of ON pixels to the smallest possible enclosing rectangle.

8. The improvement of claim 6 wherein said step of filling holes within the solid regions comprises filling each four-connected region of ON pixels to the smallest possible enclosing rectangle.

9. The improvement of claim 1 wherein:

said first set of operations includes, in the order stated at least one reduction operation with a low threshold level and a close operation using a solid structuring element; and said second set of operations includes, in the order stated, at least one reduction operation with a high threshold level and an open operation using a solid structuring element.

10. The improvement of claim 1 wherein:

at least one of said first and second sets of operations entails reducing the image size; and the improvement further comprises the step of expanding the further resulting image to form a mask at the same scale as the input image.

11. The improvement of claim 10, and further comprising the steps of logically combining the mask and the original binary image.

12. The improvement of claim 1, and further comprising the step of extracting information regarding the boundaries surrounding the solid regions in the further resulting image.

13. The improvement of claim 1 wherein the further resulting image is smaller than the resulting image.

14. The improvement of claim 1 wherein said first set of operations comprises at least one reduction operation with a low threshold level.

15. The improvement of claim 1 wherein said first set of operations comprises at least one subsampling operation.

16. The improvement of claim 1 wherein said second set of operations comprises at least one reduction operation with a high threshold level.

17. The improvement of claim 1 wherein said second set of operations comprises at least one subsampling operation.

18. The improvement of claim 1 wherein:

said first set of operations includes at least one reduction operation with a low threshold level; and said second set of operations includes at least one reduction operation with a high threshold level.

19. The improvement of claim 1 wherein said first set of operations comprises the steps of:

dilating the input image using a solid structuring element; and subsampling the dilated version of the input image to form a reduced image.

20. The improvement of claim 1 wherein said second set of operations comprises the steps of:

eroding the resulting image using a solid structuring element; and subsampling the eroded version of the resulting image to form a reduced image.

21. The improvement of claim 1 wherein:

both of said first and second sets of operations entail reducing the image size; and the improvement further comprises the step of expanding the further resulting image to form a mask at the same scale as the input image.

22. The improvement of claim 21, and further comprising the steps of logically combining the mask and the original binary image.

23. In a method, performed in a digital processor, for separating textured and solid regions, if any, in a binary input image from other regions, if any, the improvement comprising the steps of:

subjecting the input image to a first set of operations that eliminates OFF pixels that are near ON pixels to produce a resulting image with solid regions corresponding to textured and solid regions in the input image; and subjecting the resulting image to a second set of operations that eliminates ON pixels that are near OFF pixels to produce a further resulting image with solid regions corresponding to textured and solid regions in the input image and regions substantially devoid of ON pixels corresponding to other regions in the input image;

whereupon textured and solid regions in the input image are selectively converted to solid ON pixels and ON pixels within other regions in the input image are selectively eliminated.

24. The improvement of claim 23 wherein said first set of operations comprises:

at least one reduction operation with a low threshold level; and a close operation using a solid structuring element.

25. The improvement of claim 23 wherein said first set of operations comprises the steps of:

dilating the input image using a solid structuring element; and subsampling the dilated version of the input image to form a reduced image.

26. The improvement of claim 23 wherein said second set of operations comprises:

at least one reduction operation with a high threshold level; and an open operation using a solid structuring element.

27. The improvement of claim 23 wherein said second set of operations comprises the steps of:

eroding the resulting image using a solid structuring element; and subsampling the eroded version of the resulting image to form a reduced image.

28. The improvement of claim 23 wherein the resulting image is smaller than the input image.

29. The improvement of claim 23 wherein the further resulting image is smaller than the resulting image.

30. The improvement of claim 23 wherein said first set of operations comprises at least one reduction operation with a low threshold level.

31. The improvement of claim 23 wherein said first set of operations comprises at least one subsampling operation.

32. The improvement of claim 23 wherein said second set of operations comprises at least one reduction operation with a high threshold level.

33. The improvement of claim 23 wherein said second set of operations comprises at least one subsampling operation.

34. The improvement of claim 23 wherein:

said first set of operations includes at least one reduction operation with a low threshold level; and said second set of operations includes at least one reduction operation with a high threshold level.

35. The improvement of claim 23 wherein:

at least one of said first and second sets of operations entails reducing the image size; and the improvement further comprises the step of expanding the further resulting image to form a mask at the same scale as the input image.

36. The improvement of claim 35, and further comprising the steps of logically combining the mask and the input image.

37. The improvement of claim 23, and further comprising the step of extracting information regarding the boundaries surrounding the solid regions is the further resulting image.

38. In a method for separating textured and solid regions, if any, in a binary input image from other regions, if any, the improvement comprising the steps of:

subjecting the input image to a first transformation that leaves the solid regions solid, converts the textured regions to solid regions, and thickens features in the other regions; and subjecting the resulting image to a second transformation that eliminates ON pixels in the other regions without substantially affecting the solid regions.

39. The improvement of claim 38 wherein said first-mentioned and second-mentioned subjecting steps together comprise the following steps, carried out in the order stated:

performing at least one reduction operation with a low threshold level;

performing a close operation using a solid structuring element;

performing at least one reduction operation with a high threshold level; and performing an open operation using a solid structuring element.

40. The improvement of claim 23 wherein said first-mentioned and second-mentioned subjecting steps together comprise the following steps, carried out in the order stated:

dilating the input image using a solid structuring element;

subsampling the dilated image to form a reduced image;

eroding the image using a solid structuring element; and subsampling the eroded image to form a reduced image.

41. In a method, performed in a digital processor, for separating textured and solid regions, if any, in a binary input image from other regions, if any, the improvement comprising the steps of:

subjecting the input image to a first set of operations that irreversibly maps the textured and solid regions to solid regions in a resulting image of reduced size, and reversibly maps features containing ON pixels in the other regions to proportionately thicker features in the resulting image; and subjecting the resulting image to a second set of operations that maps the solid regions to solid regions in a further resulting image of further reduced size and maps the proportionately thickened features in a manner that they are substantially absent from the further resulting image;

whereupon the further resulting image contains solid regions corresponding to the textured and solid regions of the input image.

42. In a method, performed in a digital processor, for separating textured and solid regions, if any, in a binary input image from other regions, if any, the improvement comprising the steps of:

subjecting the input image to a first set of operations that eliminates OFF pixels that are near ON pixels to produce a resulting image of reduced size with solid regions corresponding to textured and solid regions in the input image; and subjecting the resulting image to a second set of operations that eliminates ON pixels that are near OFF pixels to produce a further resulting image of further reduced size with solid regions corresponding to textured and solid regions in the input image and regions substantially devoid of ON pixels corresponding to other regions in the input image;

whereupon textured and solid regions in the input image are selectively converted to solid ON pixels and ON pixels within other regions in the input image are selectively eliminated.

* * * * *

UNITED STATES PATENT AND TRADEMARK OFFICE

CERTIFICATE OF CORRECTION

PATENT NO. : 5,065,437

DATED : November 12, 1991

INVENTOR(S) : Dan S. Bloomberg

It is certified that error appears in the above-identified patent and that said Letters Patent is hereby corrected as shown below:

Lines 1-30 of column 221 and 222 are out of order, and should have been printed immediately following columns 217 and 218.

A copyright notice identical to that at the top of columns 295 and 296 should have been printed in columns 279 and 280, and in columns 303 and 304.

Signed and Sealed this

Thirteenth Day of July, 1993

*Attest:*

Michael K. Kirk

MICHAEL K. KIRK

*Attesting Officer* *Acting Commissioner of Patents and Trademarks*